US011122240B2

(12) United States Patent
Peters et al.

(10) Patent No.: US 11,122,240 B2
(45) Date of Patent: Sep. 14, 2021

(54) ENHANCED VIDEO CONFERENCE MANAGEMENT

(71) Applicant: Michael H Peters, Washington, DC (US)

(72) Inventors: Michael H Peters, Washington, DC (US); Alexander M. Stufflebeam, Indianapolis, IN (US)

(73) Assignee: Michael H Peters, Washington, DC (US)

( * ) Notice: Subject to any disclaimer, the term of this patent is extended or adjusted under 35 U.S.C. 154(b) by 0 days.

(21) Appl. No.: 17/037,324

(22) Filed: Sep. 29, 2020

(65) Prior Publication Data

US 2021/0176429 A1    Jun. 10, 2021

Related U.S. Application Data

(63) Continuation-in-part of application No. 16/993,010, filed on Aug. 13, 2020, which is a continuation of
(Continued)

(51) Int. Cl.
*H04N 7/15* (2006.01)
*G06K 9/00* (2006.01)

(52) U.S. Cl.
CPC ......... *H04N 7/152* (2013.01); *G06K 9/00718* (2013.01)

(58) Field of Classification Search
CPC .................................. H04N 7/15; G06K 9/00
(Continued)

(56) References Cited

U.S. PATENT DOCUMENTS

| 5,528,289 A | 6/1996 | Cortjens et al. |
| 6,894,714 B2 | 5/2005 | Gutta et al. |

(Continued)

FOREIGN PATENT DOCUMENTS

EP    2509006    10/2012

OTHER PUBLICATIONS

MoodMe Homepage, reprinted from https://www.mood-me.com on Sep. 1, 2020.
(Continued)

*Primary Examiner* — Melur Ramakrishnaiah
(74) *Attorney, Agent, or Firm* — Fish & Richardson P.C.

(57) ABSTRACT

Methods, systems, and apparatus, including computer-readable media storing executable instructions, for enhanced video conference management. In some implementations, a participant score for each participant in a set of multiple participants in the communication session. Each of the participant scores is based on at least one of facial image analysis or facial video analysis performed using image data or video data captured for the corresponding participant during the communication session. Each of the participant scores is indicative of an emotional or cognitive state of the corresponding participant. The participant scores are used to generate an aggregate representation of the emotional or cognitive states of the set of multiple participants. During the communication session, output data is comprising the aggregate representation of the emotional or cognitive states of the set of multiple participants is provided for display.

20 Claims, 24 Drawing Sheets

Related U.S. Application Data application No. 16/516,731, filed on Jul. 19, 2019, now Pat. No. 10,757,367, which is a continuation of application No. 16/128,137, filed on Sep. 11, 2018, now Pat. No. 10,382,722.

(60) Provisional application No. 63/072,936, filed on Aug. 31, 2020, provisional application No. 63/075,809, filed on Sep. 8, 2020, provisional application No. 62/556,672, filed on Sep. 11, 2017.

(58) Field of Classification Search
USPC .......................................... 348/14.01–14.16
See application file for complete search history.

(56) References Cited

U.S. PATENT DOCUMENTS

| | | |
|---|---|---|
| 7,953,219 B2 | 5/2011 | Freedman |
| 8,754,926 B1 | 6/2014 | Gossweiler et al. |
| 9,646,198 B2 | 5/2017 | Cunico et al. |
| 9,648,061 B2 | 5/2017 | Cunico et al. |
| 9,848,170 B2* | 12/2017 | Paradkar ............... G06K 9/44 |
| 10,096,319 B1 | 10/2018 | Jin |
| 10,235,562 B2 | 3/2019 | Shaburov et al. |
| 10,255,488 B1 | 4/2019 | Shaburov et al. |
| 10,257,465 B2 | 4/2019 | Tangeland |
| 10,382,722 B1 | 8/2019 | Peters |
| 10,440,325 B1 | 10/2019 | Boxwell |
| 10,496,947 B1 | 12/2019 | Shaburov |
| 10,524,715 B2 | 1/2020 | Sahin |
| 10,599,917 B1 | 3/2020 | Shaburov |
| 10,757,367 B1 | 8/2020 | Peters |
| 2005/0229508 A1 | 10/2005 | Cervone |
| 2006/0244818 A1 | 11/2006 | Majors et al. |
| 2009/0015659 A1 | 1/2009 | Choi |
| 2009/0204906 A1 | 8/2009 | Irving |
| 2011/0295392 A1 | 12/2011 | Cunnington et al. |
| 2012/0002001 A1 | 1/2012 | Prentice |
| 2012/0147123 A1 | 6/2012 | Lian et al. |
| 2012/0218373 A1 | 8/2012 | N'guessan |
| 2012/0331387 A1* | 12/2012 | Lemmey ............... G06F 1/1694 715/727 |
| 2014/0022370 A1 | 1/2014 | Sohn et al. |
| 2014/0112556 A1 | 4/2014 | Kalinli-Akbacak |
| 2014/0160224 A1 | 6/2014 | Herger |
| 2014/0223462 A1 | 8/2014 | Aimone et al. |
| 2014/0354759 A1 | 12/2014 | Cmnfill et al. |
| 2015/0127346 A1 | 5/2015 | Gruenstein et al. |
| 2016/0073054 A1* | 3/2016 | Balasaygun ........ H04L 12/1813 348/14.08 |
| 2016/0080819 A1 | 3/2016 | Moran |
| 2016/0360150 A1 | 12/2016 | Onno et al. |
| 2016/0381095 A1 | 12/2016 | Louchheim |
| 2016/0381097 A1* | 12/2016 | Bank ...................... G06Q 10/06 709/204 |
| 2017/0127021 A1 | 5/2017 | Frank |
| 2017/0161683 A1 | 6/2017 | Allan et al. |
| 2017/0177928 A1 | 6/2017 | Cunico et al. |
| 2017/0201717 A1 | 7/2017 | Paradkar |
| 2017/0323153 A1 | 11/2017 | Gil |
| 2018/0101760 A1 | 4/2018 | Nelson |
| 2018/0122368 A1 | 5/2018 | Costello |
| 2018/0124243 A1 | 5/2018 | Zimmerman |
| 2018/0176508 A1 | 6/2018 | Pell |
| 2018/0192000 A1 | 7/2018 | Mercredi |
| 2018/0351756 A1* | 12/2018 | Dave ...................... H04N 7/15 |
| 2019/0156112 A1 | 5/2019 | Shaburov et al. |
| 2019/0354334 A1 | 11/2019 | Billinghurst |
| 2020/0358627 A1 | 11/2020 | Vogel et al. |
| 2021/0076002 A1 | 3/2021 | Peters |
| 2021/0120209 A1 | 4/2021 | Peters |
| 2021/0176428 A1 | 6/2021 | Peters |
| 2021/0185276 A1 | 6/2021 | Peters |

OTHER PUBLICATIONS

Kane, John, "Intelligence Augmentation: The Catalyst for the Future of Work," Cogito, reprinted from https://www.cogitocorp.com/intelligence-augmentation-the-catalyst-for-the-future-of-work/ 1 on Sep. 16, 2020.

Preetipadma, "How Emotional Analytics can Help Business Brands," Artificial Intelligence Latest News, Jul. 14, 2020.

Miriam Cross, "Worried? Angry? Where Machines Excel in Detecting Customer Emotions," American Banker, Jun. 30, 2020.

"Microsoft Files Patent to Record and Score Meetings on Body Language," BBC New, Nov. 30, 2020, reprinted from https://www.bbc.com/news/technology-55133141 on Dec. 4, 2020.

Mohamed Ez-zaouia, et al., "EMODA: a Tutor Oriented Multimodal and Contextual Emotional Dashboard", Mar. 2017, reprinted from https://www.researchgate.net/publication/314106181_EMODA_a_tutor_oriented_multimodal_and_contextual_emotional_dashboard.

"Facial Coding", Wikipedia, Aug. 2, 2018.

Huang, Y., et al., "GIS-Based Emotional Computing: A Review of Quantitative Approaches to Measure the Emotion Layer of Human-Environment Relationships", *ISPRS Int. J. Geo-Inf.* 2020, 9, 551, Sep. 15, 2020.

Annemiek van Dijke and Jacques van Lankveld, "Videoconferencing Psychotherapy in an App Environment for Trauma-Related Psychopathology", Jul. 11, 2019, IntechOpen, reprinted from https://www.intechopen.com/books/psychological-trauma/videoconferencing-psychotherapy-in-an-app-environment-for-trauma-related-psychopathology.

"MoodMe Belgium Sprl's Notice of Motion and Motion to Dismiss and Memorandum of Points and Authorities in Support of Motion to Dismiss," filed in *Architekton Resources, LLC d/b/a Illuminate Technologies v. MoodMe Belgium SPRL*, Case No. 3:20-cv-6306 (N.D. Cal), Dec. 7, 2020.

Affectiva Media Analytics Products, Jun. 6, 2017, reprinted from https://web.archive.org/web/20170606170400/www.affectiva.com/what/products/.

"Facial Action Coding System", Wikipedia, Dec. 7, 2020, reprinted from https://en.wikipedia.com/wiki/Facial_Action_Coding_System.

"Facial Expression Analysis", iMotions Software Solution, Mar. 10, 2020, reprinted from https://imotions.com/biosensor/fea-facial-expression-analysis/.

A. Menyc, et al., "Real-time integration of emotion analysis into homecare platforms", IEEE, Jul. 23, 2019, reprinted from https://ieeexplore.ieee.org/abstract/document/8857484.

Uğur Ayvaz, et al., "Use of Facial Emotion Recognition in E-Learning Systems", *Information Technologies and Learning Tools*, 2017, vol. 60, No. 4.

"Complaint for: (1) Patent Infringement (2) Misappropriation of Trade Secrets under the Defend Trade Secrets Act (DTSA) 18 U.S.C. § 1836," filed in *Architekton Resources, LLC d/b/a Illuminate Technologies v. MoodMe Belgium SPRL*, Case No. 3:20-cv-6306 (N.D. Cal), Sep. 4, 2020.

"Affdex for Market Research", Affectiva Media Analytics, Mar. 30, 2020, reprinted from https://web.archive.org/web/20200330145121/https://www.affectiva.com/product/affdex-for-market-research/ Dec. 8, 2020.

Sidney D'Mello, et al., "AutoTutor Detects and Responds to Learners Affective and Cognitive States", Jan. 2008, reprinted from http://www.audentia-gestion.fr/MIT/08.dmello-etal-autotutor.pdf.

A. Kallipolitis, et al., "Emotion Analysis in Hospital Bedside Infotainment Platforms Using Speeded up Robust Features," IFIP International Federation for Information Processing 2019, Published by Springer Nature Switzerland AG 2019, J. MacIntyre et al. (Eds.).

Sharon Richardson, "Affective computing in the modern workplace", *Business Information Review*, 2020, vol. 37(2) 78-85.

Jenna Amatulli, "Zoom Can Track Who's Not Paying Attention in Your Video Call. Here's How," Huffpost, Mar. 25, 2020.

Karl Bode, "Working From Home? Zoom Tells Your Boss If You're Not Paying Attention", Vice.com, Mar. 16, 2020.

(56) References Cited

OTHER PUBLICATIONS

Chickerur, Satyadhyan, and Joshi, Kartik, "3D Face Model Dataset: Automatic Detection of Facial Expressions and Emotions for Educational Environments," British Journal of Educational Technology, vol. 46, No. 5, 2015, 1028-1037.

Miller, Frederick A., and Katz, Judith H., "4 Keys to Accelerating Collaboration," OD Practitioner, vol. 46, No. 1, 2014.

Meier, A., et al., "A Rating Scheme for Assessing the Quality of Computer-Supported Collaboration Processes," Computer-Supported Collaborative Learning (2007), 2:63-86.

Goman, Carol Kinsey, "Body Language: 10 Simple and Powerful Tips," Sales and Service Excellence, Mar. 2013.

Al Shaqsi, Jamil, and Wang, Wenjia, "Estimating the Predominant No. Of Clusters in a Dataset," Intelligent Data Analysis 17 (2013)603-626.

Meilă, Marina, and Heckerman, David, "An Experimental Comparison of Model-Based Clustering Methods," Machine Learning, 42, 9-29, 2001.

Anaya, Antonio R., and Boticario, Jesús G., "A Data Mining Approach to Reveal Representative Collaboration Indicators in Open Collaboration Frameworks," Educational Data Mining, 2009.

Schneider, Bertrand, and Pea, Roy, "Real-Time Mutual Gaze Perception Enhances Collaborative Learning and Collaboration Quality," Computer-Supported Collaborative Learning, accepted Sep. 17, 2013.

Hara, N., et al., "An Emerging View of Scientific Collaboration: Scientists' Perspectives on Collaboration and Factors that Impact Collaboration," Journal of the American Society for Information Science and Technology, 54(10):952-965, 2003.

Tobin White, "Student Participation in Math Discourse with Networked Handhelds," Computer-Supported Collaborative Learning, revised Jun. 29, 2005, accepted Jun. 30, 2006.

Jacques Lonchamp, Supporting Synchronous Collaborative Learning: a Generic, Multi-Dimensional Model, Computer-Supported Learnings, © International Society of the Learning Sciences, Inc., Springer Science + Business Media, Inc. 2006.

Porcaro, David, and Carrier, Carol, "Ten Guiding Principles for Designing Online Modules that Involve International Collaborations," International Journal of Education and Development Using Information and Communication Technology (IJEDICT), 2014, vol. 10, Issue 2, pp. 142-150.

Andres, H.P., and Shipps, B.P., "Team Learning in Technology-Mediated Distributed Teams," Journal of Information Systems Education, vol. 21(2), Summer 2010.

U.S. Non Final Office Action in U.S. Appl. No. 16/950,888, dated Jan. 26, 2021, 24 pages.

U.S. Non Final Office Action in U.S. Appl. No. 16/993,010, dated Feb. 23, 2021. 26 pages.

U.S. Non Final Office Action in U.S. Appl. No. 17/136,607, dated Feb. 4, 2021, 18 pages.

U.S. Non Final Office Action in U.S. Appl. No. 17/186,977, dated May 13, 2021, 19 pages.

* cited by examiner

Pie-Chart Speaking Time Meter

ENHANCED VIDEO CONFERENCE MANAGEMENT

CROSS-REFERENCE TO RELATED APPLICATIONS

This application is a continuation-in-part of U.S. patent application Ser. No. 16/993,010, filed Aug. 13, 2020, which is a continuation of U.S. patent application Ser. No. 16/516,731, filed Jul. 19, 2019, now U.S. Pat. No. 10,757,367, issued on Aug. 25, 2020, which is a continuation of U.S. patent application Ser. No. 16/128,137, filed Sep. 11, 2018, now U.S. Pat. No. 10,382,722, issued Aug. 13, 2019, which claims the benefit of U.S. Provisional Patent Application Ser. No. 62/556,672, filed Sep. 11, 2017. This application also claims the benefit of U.S. Provisional Patent Application No. 63/075,809, filed on Sep. 8, 2020, and U.S. Provisional Patent Application No. 63/072,936, filed on Aug. 31, 2020. The entire contents of the prior applications are incorporated by reference.

BACKGROUND

The present specification relates to managing video conferences. As communications networks have become more reliable, video conferences have become increasingly popular.

SUMMARY

In some implementations, a computer system can detect the emotional or cognitive states of participants in a communication session and provide feedback about participants during the communication session. The communication session can be a class, a lecture, a web-based seminar, a video conference, or other type of communication session. The communication session can involve participants located remotely from each other, participants located in a same shared space, or may include both types of participants. Using image data or video data showing the participants, the system can measure different emotions (e.g., happiness, sadness, anger, etc.) as well as cognitive attributes (e.g., engagement, attention, stress, etc.) for the participants. The system then aggregates the information about the emotional or cognitive states of the participants and provides the information to show how a group of participants are feeling and interacting during the communication session.

The system's ability to gauge and indicate the emotional and cognitive state of the participants as a group can be very valuable to a teacher, lecturer, entertainer, or other type of presenter. The system can provide measures that show how an audience overall is reacting to or responding in a communication session. Many communication sessions include dozens or even hundreds of participants. With a large audience, the presenter cannot reasonable read the emotional cues from each member of the audience. Detecting these cues is even more difficult with remote, device-based, interactions rather than in-person interactions. To assist a presenter and enhance the communication session, the system can provide tools with emotional intelligence, reading verbal and non-verbal signals to inform the presenter of the state of the audience. By aggregating the information about the emotions, engagement, and other attributes of members of the audience, the system can provide a presenter or other user with information about the overall state of the audience which the presenter otherwise would not have. For example, the system can be used to assist teachers, especially as distance learning and remote educational interactions become more common. The system can provide feedback, during instruction, about the current emotions and engagement of the students in the class, allowing the teacher determine how well the instruction is being received and to better customize and tailor the instruction to meet students' needs.

In some implementations, a system can manage and enhance multi-party video conferences to improve performance of the conference and increase collaboration. The techniques can be implemented using one or more computers, e.g., server systems, and/or application(s) operating on various devices in a conference. In general, the system can monitor media streams from different endpoint devices connected to the conference, and enhance the video conference in various ways. As discussed further below, the enhancements can alter the manner in which media streams are transferred over a network, which can reduce bandwidth usage and increase efficiency of the conference. The manner in which the various endpoints in a conference present the conference can also be adjusted. For example, the system can provide an automated moderator module that can actively make changes to the way media streams are transmitted and presented, based on collaboration factor scores determined through real-time analysis of the video streams. The system can also provide feedback regarding participation based on principles of neuroscience, and can adjust parameters of the video conference session based on those factors. The moderator system can operate in different modes to actively alter or enhance a video conference session directly, or to provide recommendations to one or more devices so that another device or a user can make changes.

Video conferencing comprises the technologies for the reception and transmission of audio and video signals by devices (e.g., endpoints) of users at different locations, for communication in real-time, simulating a collaborative, proximate setting. The principal drive behind the evolution of video conferencing technology has been the need to facilitate collaboration of two or more people or organizations to work together to realize shared goals and to achieve objectives. Teams that work collaboratively can obtain greater resources, recognition and reward when facing competition for finite resources.

For example, mobile collaboration systems combine the use of video, audio, and on-screen drawing capabilities using the latest generation hand-held electronic devices broadcasting over secure networks, enabling multi-party conferencing in real-time, independent of location. Mobile collaboration systems are frequently being used in industries such as manufacturing, energy, healthcare, insurance, government and public safety. Live, visual interaction removes traditional restrictions of distance and time, often in locations previously unreachable, such as a manufacturing plant floor a continent away.

Video conferencing has also been called "visual collaboration" and is a type of groupware or collaborative software which is designed to help people involved in a common task to achieve their goals. The use of collaborative software in the school or workspace creates a collaborative working environment. Collaborative software or groupware can to transform the way participants share information, documents, rich media, etc. in order to enable more effective team collaboration. Video conferencing technology can be used in conjunction with mobile devices, desktop web cams, and other systems to enable low-cost face-to-face business meetings without leaving the desk, especially for businesses with widespread offices.

Although video conferencing has frequently proven immensely valuable, research has shown that participants must work harder to actively participate as well as accurately interpret information delivered during a conference than they would if they attended face-to-face, particularly due to misunderstandings and miscommunication that are unintentionally interjected in the depersonalized video conference setting.

When collaborative groups are formed in order to achieve an objective by way of video conferencing, participants within the group may tend to be uncomfortable, uneasy, even have anxiety from the outset and particularly throughout the meeting due to misunderstandings and feelings stemming from barriers influenced and created by negative neurological hormones. Moreover, remote video conferencing is plagued by obstacles of disinterest, fatigue, domineering people, and distractions and each person's remote environment and personal distractions and feelings. Whereas, in a venue where everyone is physically present, the tendencies to be distracted, mute the audio for separate conversations, use other electronic devices, or to dominate the conversation or hide are greatly reduced due to physical presence of other participants.

To address the challenges presented by typical video conferencing systems, the systems discussed herein include capabilities to detect different conditions during a video conference and take a variety of video conference management actions to improve the video conference session. Some of the conditions that are detected can be attributes of participants as observed through the media streams in the conference. For example, the system can use image recognition and gesture recognition to identify different facial expressions. The system can also evaluate audio, for example assessing intonation, recognizing speech, and detecting keywords that correspond to different moods. Other factors, such as level of engagement or participation, can be inferred from measuring duration and frequency of speaking, as well as eye gaze direction and head position analysis. These and other elements can be used to determine scores for different collaboration factors, which the video conferencing system can then use to alter the way the video conference is managed.

The system can perform a number of video conference management actions based on the collaboration factors determined from media streams. For example, the system can alter the way media streams are transmitted, for example, to add or remove media streams or to mute or unmute audio. In some instances, the size or resolution of video data is changed. In other instances, bandwidth of the conference is reduced by increasing a compression level, changing a compression codec, reducing a frame rate, or stopping transmission a media stream. The system can change various other parameters, including the number of media streams presented to different endpoints, changing an arrangement or layout with which media streams are presented, addition of or updating of status indicators, and so on. These changes can improve efficiency of the video conferencing system and improve collaboration among the participants.

As discussed herein, the video conferencing platform can use utilizes facial expression recognition technology, audio analysis technology, and timing systems, as well as neuroscience predictions, in order to facilitate the release of positive hormones, encouraging positive behavior in order to overcome barriers to successful collaboration. As a result, the technology can help create a collaborative environment where users can encourage one another to greater participation by users generally and less domination by specific users that detract from collaboration.

In one general aspect, a method of managing a video conference session involving multiple endpoint devices, the method comprising: receiving, by one or more computers, a media stream from each of multiple endpoint devices over a communication network; managing, by the one or more computers, a video conference session among the endpoint devices such that at least one or more of the media streams are transmitted over the communication network for display by the endpoint devices; measuring, by the one or more computers, a plurality of audio and/or video characteristics from the media stream from a particular endpoint device of the multiple endpoint devices; determining, by the one or more computers, based on the audio and/or video characteristics, a collaboration factor score for the particular endpoint device for each of a plurality of collaboration factors; selecting, by the one or more computers, from among a plurality of video conference management actions based on the collaboration factor scores for the media stream for the particular endpoint; and altering, by the one or more computers, the video conference of the multiple endpoints by performing the selected video conference management action.

In some implementations, the selected video conference management action comprises changing a size or resolution for the media stream for the particular endpoint; and wherein altering the management of the video conference session comprises changing a size or resolution at which the media stream for the particular endpoint is transmitted, or changing a size or resolution at which the media stream for the particular endpoint is presented by one or more of the multiple endpoints.

In some implementations, the selected video conference management action comprises reducing bandwidth of transmission of the media stream for the particular endpoint; and altering the management of the video conference session comprises reducing bandwidth of transmission of the media stream for the particular endpoint by increasing a compression level, changing a compression codec, reducing a frame rate, or stopping transmission of the media stream for the particular endpoint to one or more other endpoints.

In some implementations, the selected video conference management action comprises altering an audio volume level for the media stream for the particular endpoint; and altering the management of the video conference session comprises altering an audio volume level for the media stream for the particular endpoint by instructing a different volume level for the audio, muting the audio, or omitting the audio from the media stream for the particular endpoint transmitted to one or more other endpoints.

In some implementations, the method includes classifying, by the one or more computers, the media stream for the particular endpoint device based on the collaboration factor scores. The video conference management action is selected based on the classification of the media stream for the particular endpoint device.

In some implementations, classifying the media stream for the particular endpoint device comprises providing, to a trained machine learning classifier, the collaboration factor scores as inputs and receiving, as output of the trained machine learning classifier, one or more outputs indicative of likelihoods for one or more of a plurality of predetermined classifications, wherein the trained machine learning classifier comprises at least one of a neural network, a decision tree, a support vector machine, a logistic regression model, or a maximum entropy classifier.

In some implementations, classifying the media stream comprises assigning a classification from among a plurality of predetermined classifications each having an associated combination of collaboration factor scores or ranges, wherein the collaboration factors are indicative of different neurological and/or emotional attributes.

In some implementations, classifying the media stream comprises: determining a distance between (i) a set of collaboration factor scores for the particular endpoint, and (ii) each of multiple different combinations of collaboration factor scores or ranges that are each associated with a different classification; and selecting, as a classification for the media stream of the particular endpoint, the classification associated with the combination of collaboration factor scores or ranges having the lowest distance from the set of collaboration factor scores for the particular endpoint.

In some implementations, determining the scores for the plurality of collaboration factors comprises determining a score for each of a plurality of different neurological and/or emotional dimensions.

In some implementations, measuring the plurality of audio and/or video characteristics from the media stream from the particular endpoint device comprises identifying characteristics using speech recognition, facial expression recognition, gesture recognition, intonation analysis, eye gaze position analysis, head position analysis, and/or pattern analysis.

In some implementations, the method includes combining the scores for the collaboration factors into a composite score; and outputting, during the video conference session to one or more of the endpoint devices, data providing a representation of a participant corresponding to the particular endpoint, a representation of the composite score, and an output media stream from at least one of the endpoint devices.

In some implementations, the representation of the composite score comprises a symbol that changes in color according to a degree of quality and level of participation of a participant whose voice or image is indicated by the media stream for the particular endpoint, wherein the degree of quality and level of participation is indicated relative to degrees of quality and level of participation determined for participants corresponding to other endpoints involved in the video conference.

In some implementations, the method includes accessing data indicating multiple predetermined thresholds for the degree of quality and level of participation; and setting the color of the symbol based on the degree of quality and level of participation relative to the multiple predetermined thresholds, the one or more computers being configured to indicate a shade of red if the degree of quality and level of participation is determined to be in excess of a first predetermined threshold, a shade of orange if the measurement is determined to be between the first predetermined threshold and a second predetermined threshold, and a shade of green if the measurement is determined be below the second predetermined threshold.

In some implementations, the method includes: determining a group composite score based on collaboration factor scores determined from each of the media streams of the endpoint devices, the group composite score being indicative of a current level of collaboration and participation among participants in the video conference; and providing the group composite score to one or more of the endpoints over the communication network or using the group composite score to select the video conference management action.

In some implementations, measuring the plurality of audio and/or video characteristics from the media stream from the particular endpoint device comprises using facial expression recognition to determine estimate levels of at least one of attention, enthusiasm, happiness, sadness, stress, boredom, dominance, fear, anger, or deception.

In some implementations, measuring the plurality of audio and/or video characteristics from the media stream from the particular endpoint device comprises at least one of: determining a duration of speaking or participation time; detecting utterance of one or more keywords from a set of predetermined keywords; or identifying an intonation pattern.

In some implementations, the method includes: determining a composite score for each of the multiple endpoints based on the respective media streams for the endpoints, the composite scores indicating respective levels of participation or collaboration in the video conference; determining and outputting, in real-time during the video conference session, a representation of instructions to improve one or more of the composite scores indicating the lowest levels of participation or collaboration in the video conference; and periodically recalculating the composite scores for the multiple endpoints and altering the instructions based on the recalculated composite scores.

In some implementations, the one or more computers are configured to switch between enhancing the video conference in multiple different modes. The modes can include a passive public mode in which the one or more computers provide an output media stream display indicator for each of the multiple endpoints to each endpoint in the video conference. The modes can include a passive private mode in which the one or more computers (i) provide feedback based on composite scores for individual endpoints and/or for the overall collection of endpoints to a limited set of one or more devices having a predetermined permission level, and (ii) provide suggestions of moderator actions only to the limited set of one or more devices having a predetermined permission level. The modes can include an active mode in which the one or more computers introduce direct integrated audio and visual indicators and messages through the output media stream of one or more conference participants.

In another general aspect, a method of indicating in real-time the level and quality of participation of one or more participants within a multi-party video conference session by monitoring one or more party characteristics by way of audio and facial recognition is provided. Generally, the method comprises: in a preprocessor phase, measuring, with a processor, at least one facial and/or audio characteristic of an input media stream received from at least one conference party participant of a plurality of conference participants; (b) calculating, with the processor, a raw trait score from the at least one characteristic of the input media stream relating to neuro-emotional collaboration factors such as: stress, enthusiasm, contribution, and/or happiness, etc.; (c) in a moderator phase, combining the raw trait scores into an overall participant composite score and/or an overall group composite score; and (d) outputting in real-time, with the processor, an integrated representation of the at least one conference party participant and the overall participant composite score and/or an overall group composite score, in combination, with an output media stream for at least one of the conference participants and/or a meeting organizer.

In some implementations, the preprocessor phase further comprises: the level and quality of participation of the conference participant is measured, by the processor, by way of facial recognition, by selecting or selecting in combination from the group of characteristics related to eye contact and facial expression indicating levels of attention, stress, boredom, dominance, fear, anger, and/or deception.

In some implementations, the preprocessor phase further comprises: the level and quality of participation of the conference participant is measured, by the process, by way of audio recognition, by selecting or in selecting in combination from the group of characteristics related to speaking/participation time, keyword recognition, and intonation.

In some implementations, the integrated representation includes a symbol indicative of the conference participant that changes in color according to the relative degree of quality and level of participation based on the measurement value as compared to the other plurality of participants.

In some implementations of the application, the symbol would indicate a shade of the color red if the measurement is determined to be in excess of a predetermined threshold, a shade of the color orange if the measurement is determined to be within an average predetermined threshold, or a shade of the color green if the measurement is determined be below a predetermined threshold.

In some implementations, a method performed by one or more computing devices comprises: during a communication session, obtaining, by the one or more computing devices, a participant score for each participant in a set of multiple participants in the communication session, wherein each of the participant scores is based on at least one of facial image analysis or facial video analysis performed using image data or video data captured for the corresponding participant during the communication session, wherein each of the participant scores is indicative of an emotional or cognitive state of the corresponding participant; using, by the one or more computing devices, the participant scores to generate an aggregate representation of the emotional or cognitive states of the set of multiple participants; and providing, by the one or more computing devices, output data during the communication session for display, the output data comprising the aggregate representation of the emotional or cognitive states of the set of multiple participants.

In some implementations, the one or more computing devices comprise a server system. At least some of the multiple participants participate in the communication session using respective endpoint devices, the endpoint devices each providing image data or video data over a communication network to the server system. The server system obtains the participant scores by performing at least one of image facial image analysis or facial video analysis on the image data or video data received from the endpoint devices over the communication network.

In some implementations, at least some of the multiple participants participate in the communication session using respective endpoint devices. Obtaining the participant scores comprises receiving, over a communication network, participant scores that the respective endpoint devices determined by each end point device performing at least one of facial image analysis or facial video analysis using image data or video data captured by the endpoint device.

In some implementations, the one or more computing devices comprise an endpoint device for a person participating in the communication session. Obtaining the participant score, using the participant scores to generate the aggregate representation, and providing the output data for display are performed by the endpoint device, the aggregate representation being displayed at the endpoint device.

In some implementations, the aggregate representation characterizes or indicates the emotional states or levels of engagement among the set of multiple participants using at least one of a score, a graph, a chart, a table, an animation, a symbol, or text.

In some implementations, the method comprises, during the communication session, repeatedly (i) obtaining updated participant scores for the participants as additional image data or video data captured for the respective participants during the communication session, (ii) generating an updated aggregate representation of the emotional states or levels of engagement of the set of multiple participants based on the updated participant scores, and (iii) providing updated output data indicative of the updated aggregate representation.

In some implementations, the participant scores are varied during the communication session based on captured image data or video data such that the aggregate representation provides a substantially real-time indicator of current emotion or engagement among the set of multiple participants.

In some implementations, the output data is provided for display by an endpoint device of a speaker or presenter for the communication session.

In some implementations, the output data is provided for display by an endpoint device of a teacher, and wherein the set of multiple participants is a set of students.

In some implementations, the set of participants comprises remote participants that are located remotely from each other during the communication session, each of the remote participants having image data or video data captured by a corresponding endpoint device.

In some implementations, the set of participants comprises local participants that are located in a same room as each other during the communication session.

In some implementations, the aggregate representation indicates a level of emotion or engagement determined based on participant scores for at least ten different participants in the communication session.

In some implementations, the aggregate representation indicates a level of emotion or engagement determined based on participant scores for at least one hundred different participants in the communication session.

In some implementations, the aggregate representation indicates a level of emotion or engagement determined based on participant scores for at least one thousand different participants in the communication session.

In some implementations, generating the aggregate representation comprises generating an overall measure of engagement for the set of multiple participants.

In some implementations, the method includes: tracking changes in emotion or engagement of the set of multiple participants over time during the communication session; and providing during the communication session an indication of a change in the emotion or engagement of the set of multiple participants over time.

In some implementations, the method includes: determining that a condition has occurred based on the participant scores or the aggregate representation; and providing, for display, an indication that the condition has occurred.

In some implementations, the method includes grouping the participants in the set of multiple participants into different groups based on the participant scores. The aggregate representation comprises an indication of characteristics of the different groups.

In some implementations, the method includes: determining, based on the participant scores or the aggregate representation, a recommendation for improving a level of engagement or emotion of the participants in the set of multiple participants; and providing data causing an indication of the determined recommendation to be presentation.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
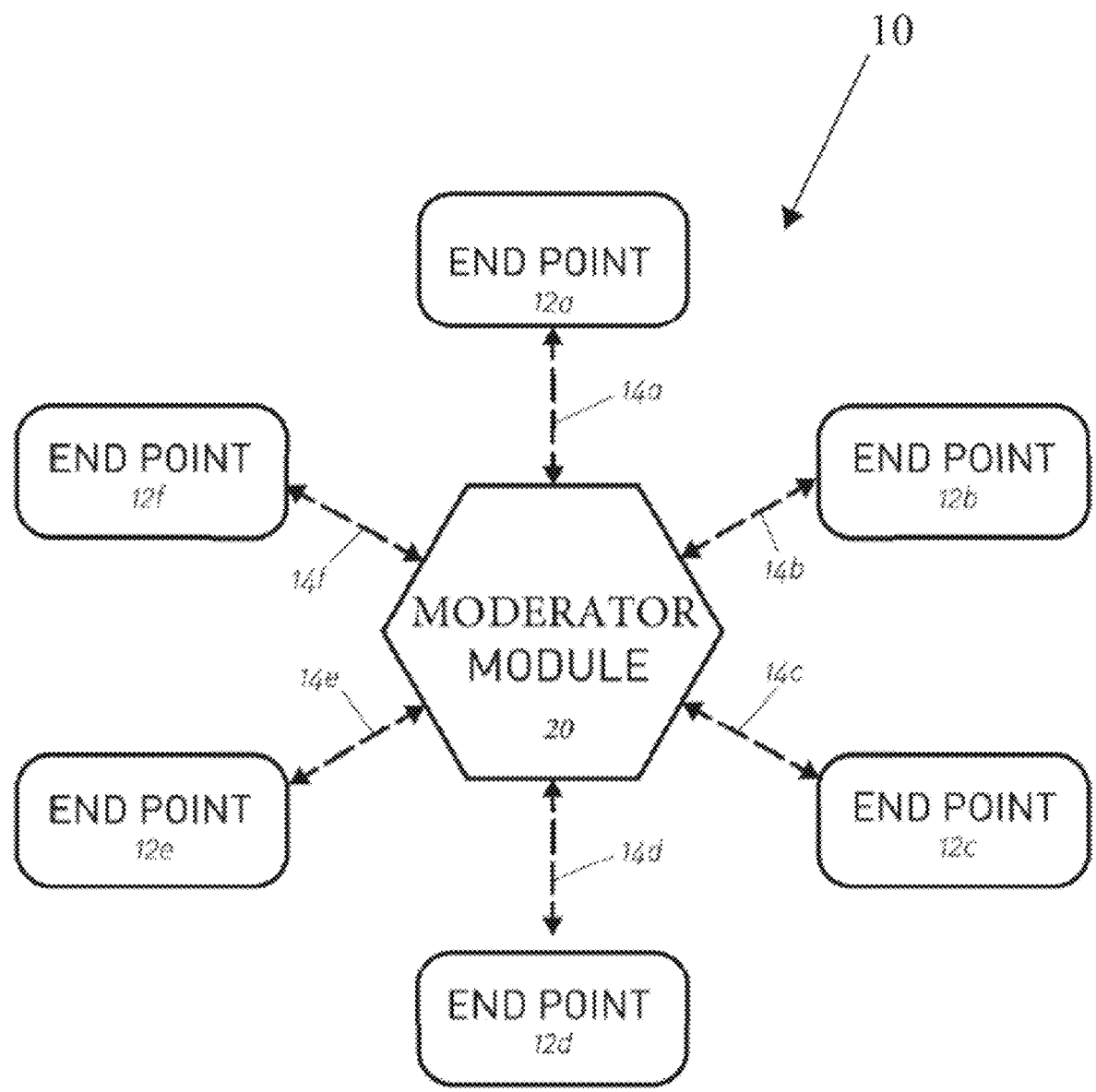
FIG. 1 is an example of a video conference moderator in communication with multiple endpoint media streams.

Various embodiments will be described in detail with reference to the drawings, wherein like reference numerals represent similar steps throughout the several views. Reference to various embodiments does not limit the scope of the claims attached hereto. Additionally, any examples set forth in this specification are not intended to be limiting and merely set forth some of the many possible implementations for the appended claims.

The present invention focuses on a video conference management system, including a moderator system indicating in real-time the level and quality of participation of one or more participants within a multi-party video conference session by monitoring one or more characteristics observable through a media stream in order to stimulate collaboration and active engagement during the video conference. The moderator emphasizes mitigating and overcoming barriers created by providing feedback and/or interjecting actions which facilitate group collaboration.

Moreover, the present application platform utilizes facial expression recognition and audio analysis technology as well as inferences based in neuroscience to prompt for efficient collaboration in a video conference setting. Beneficially, the techniques may facilitate the release of positive hormones, promoting positive behavior of each participant in order to overcome negative hormone barriers to successful collaboration.

In an example implementation, the participation of each endpoint conference participant is actively reviewed in real time by way of facial and audio recognition technology. A moderator module calculates a measurement value based on at least one characteristic evaluated by facial and audio recognition of at least one of the endpoint conference participants. The measurement value(s) can be used to represent—in real time—the quality and extent the participants have participated. Therefore, providing active feedback of the level and quality of the one or more conference participants, based on one or more monitored characteristics. Optionally, if certain thresholds are achieved or maintained, the system may trigger certain actions in order to facilitate engagement amongst the conference participants.

In some implementations, the video conference moderator system monitors, processes, and determines the level and quality of participation of each participant based on factors such as speaking time and the emotional elements of the participants based on facial expression recognition and audio feature recognition. In addition to monitoring speaking time of each participant, the video conference moderator may utilize facial recognition and other technology to dynamically monitor and track the emotional status and response of each participant in order to help measure and determine the level and quality of participation, which is output, in real time, as a representation (e.g., symbol, score, or other indicator) to a meeting organizer or person of authority and/or one or more of the conference participants. The representation may integrated with (e.g., overlaid on or inserted into) a media stream or a representation of an endpoint or the corresponding participant (e.g., a name, icon, image, etc. for the participant).

FIG. 1 illustrates an example of a video conference moderator system 10 incorporating a dynamic integrated representation of each participant. The moderator system 10 includes a moderator module 20 in communication with multiple conference participant endpoints 12a-f via communications path 14a-f. Each of the endpoints 12a-f communicates a source of audio and/or video and transmits a resulting media stream to the moderator module 20. The moderator module 20 receives the media stream from each of the endpoints 12a-f and outputs a combined and/or selected media stream output to the endpoints 12a-f. The endpoints 12a-f can be any appropriate type of communication device, such as a phone, a tablet computer, a laptop computer, a desktop computer, a navigation system, a media player, an entertainment device, and so on.

Figure 2A:
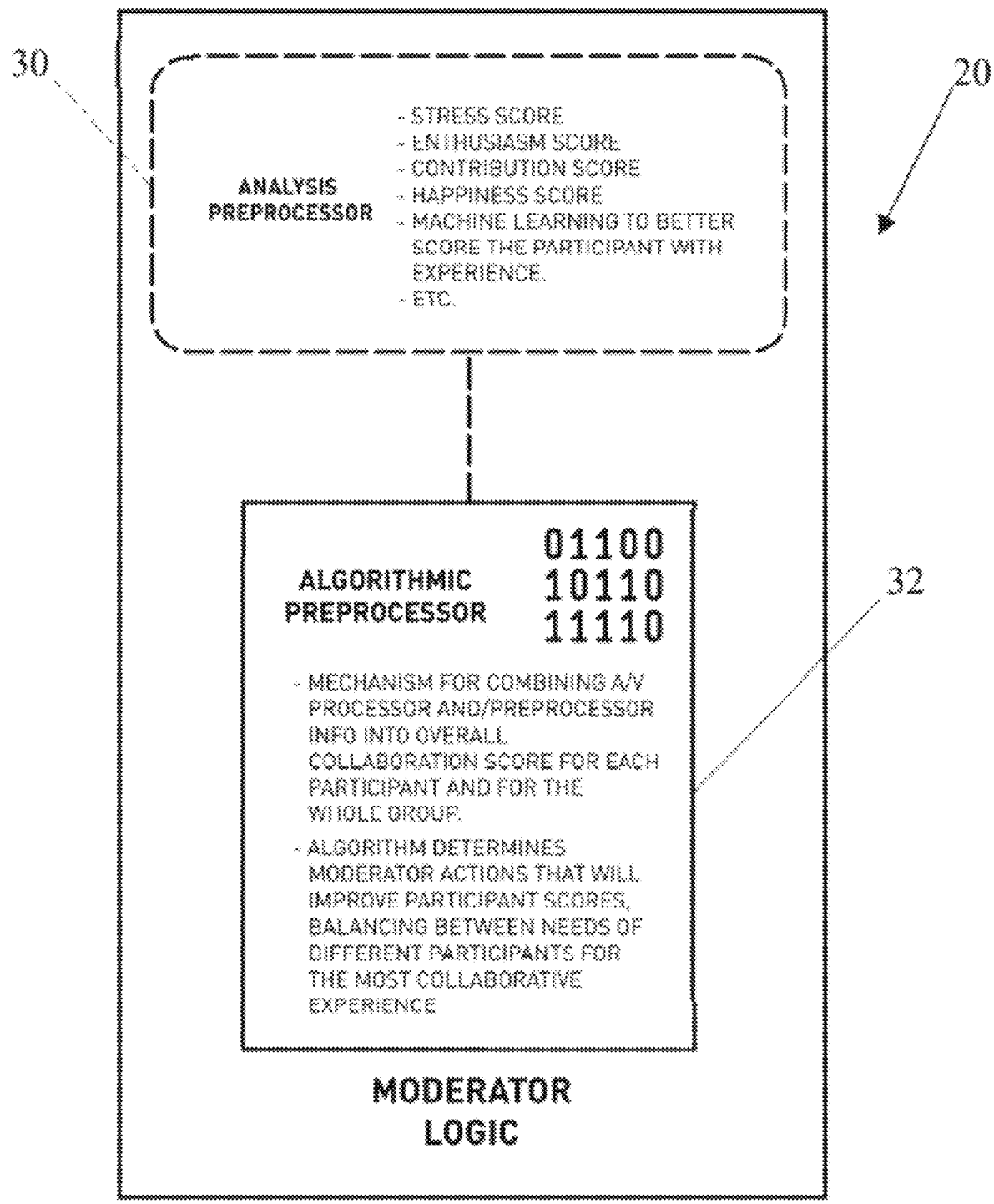
FIG. 2A is a block diagram illustrating an example moderator module.

In an example implementation shown in FIG. 2A, the moderator module 20 includes (i) an analysis preprocessor 30 which receives, analyzes, and determines raw scores (e.g., collaboration factor scores) based on monitored characteristics, and (ii) moderator logic 32 for combining raw scores into an overall collaborative or composite score and/or determine what action should take place to improve conference participant scores, balancing between needs of different participants for the most collaborative experience.

Figure 3:
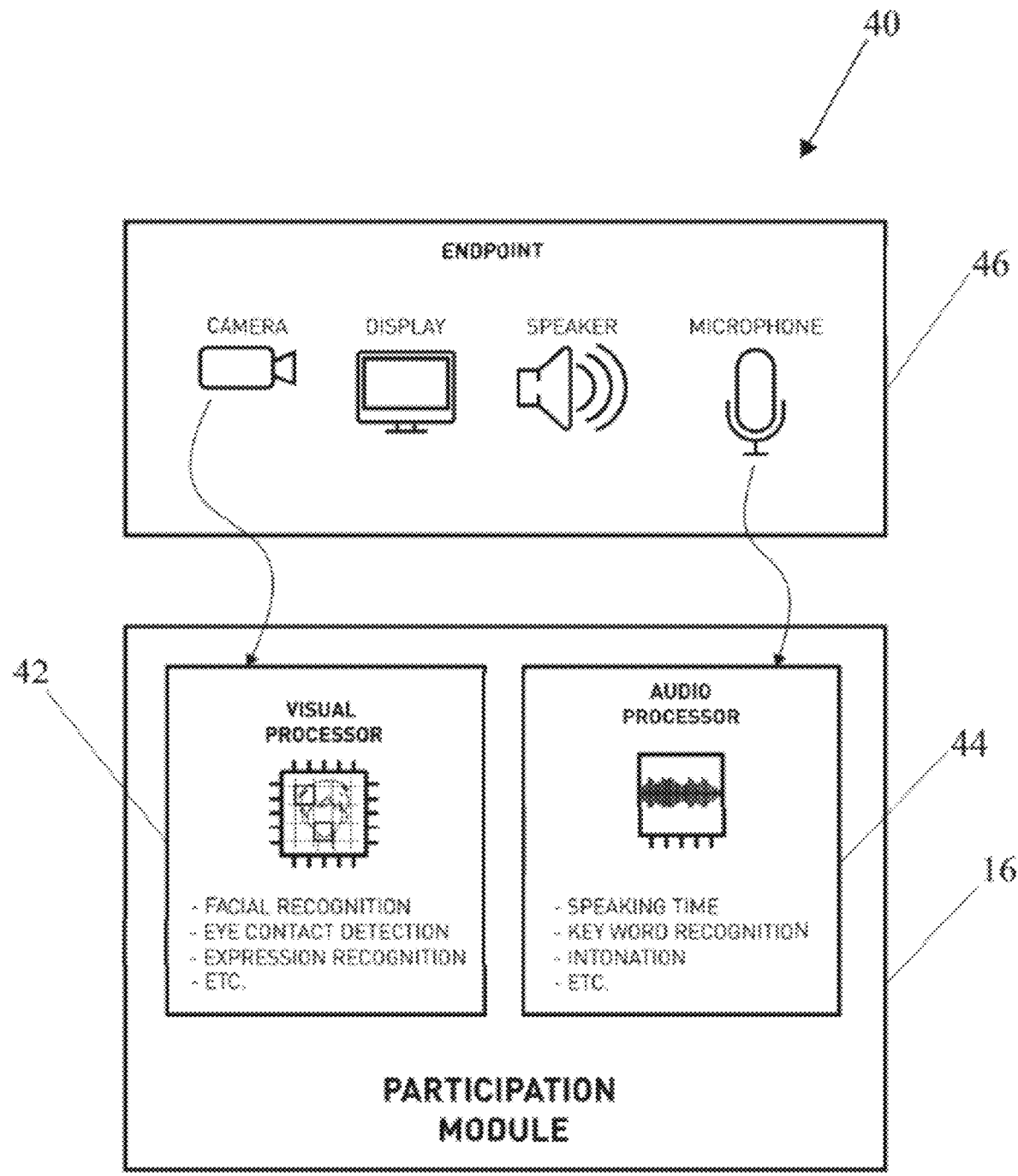
FIG. 3 is a block diagram illustrating an example participation module.

In some implementations of the video conference moderator system 10, the analysis preprocessor 30 can be separate from the moderator module 20, and the functions can be performed by one or more participation modules 40 (See FIG. 3). The participation modules 40 are configured to carry out the functions of the analysis preprocessor 30 utilizing one or more processors 42, 44. For example, the functions of image recognition, audio analysis, pattern recognition, and other functions may be distributed among the endpoints 12a-f so that each endpoint generates scores for its own video feed. This may provide for more accurate analysis, as each endpoint may have access to a richer dataset, greater historical information, and more device-specific and user-specific information than the moderator module 20.

Figure 2B:
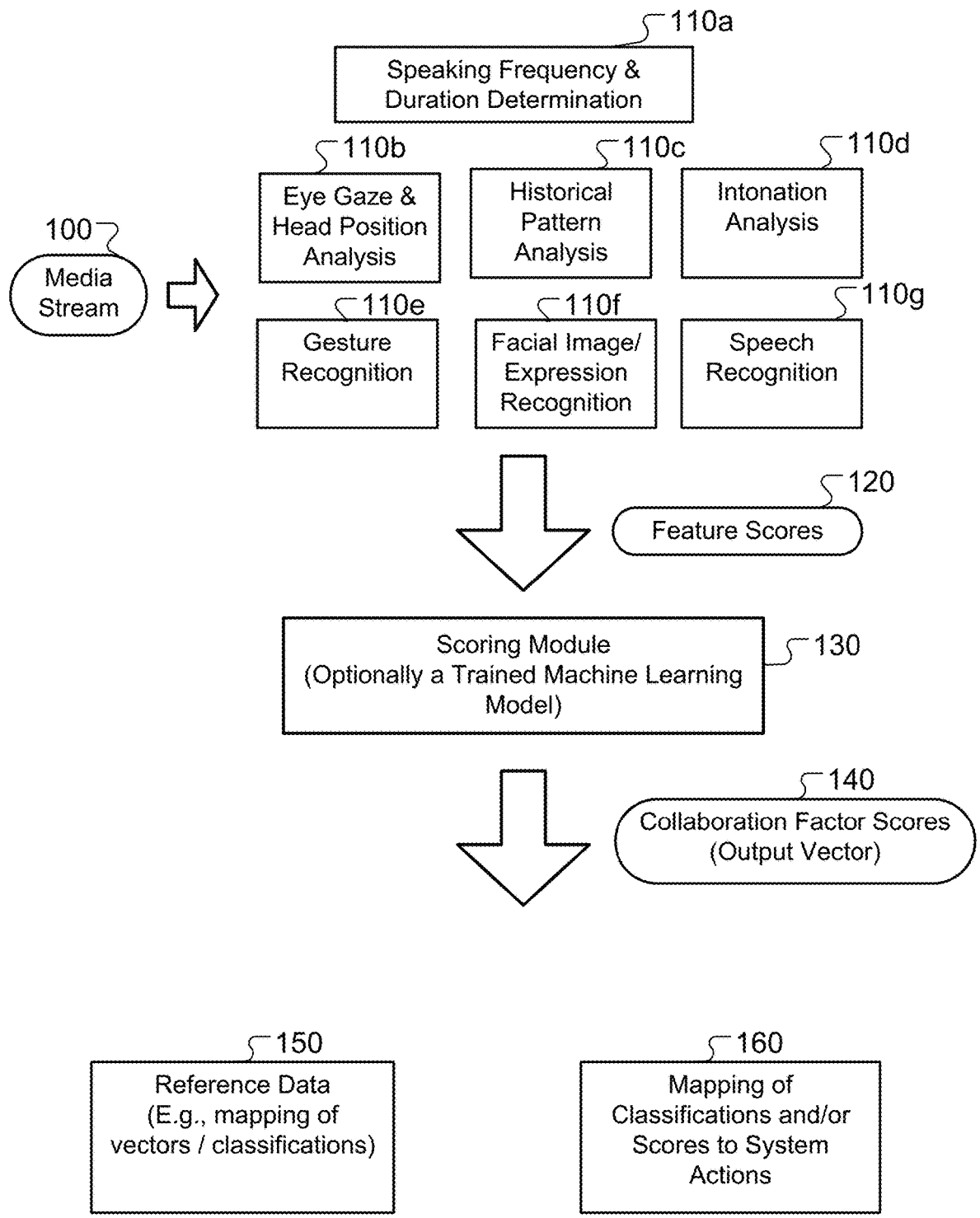
FIG. 2B is a block diagram illustrating an example of operations of the moderator module.

FIG. 2B illustrates an example of processing that can be performed by the moderator module 20. The moderator module 20 receives a media stream 100, which may include audio and/or video data, from a particular endpoint (e.g., representing audio and/or video uploaded by the endpoint, including the speech and/or image of the participant at the endpoint). The moderator module 20 then processes the video stream 100 using a number of different analysis techniques to assess the conditions of collaboration in the video conference and determine what management actions to take.

The moderator module 20 can use a number of analysis modules 110a-g to determine characteristics of the media stream. For example, these modules 110a-g can each determine feature scores 120 that reflect different attributes describing the media stream. For example, module 110a can determine a frequency and duration that the participant is speaking. Similarly, the module 110a can determine a frequency and duration that the participant is listening. The module 110b determines eye gaze direction of the participant and head position of the participant, allowing the module to determine a level of engagement of the participant at different times during the video conference. This information, with the information about when the user is speaking, can be used by the modules 110a, 110b to determine periods when the participant is actively listening (e.g., while looking toward the display showing the conference) and periods when the user is distracted and looking elsewhere. The module 110c performs pattern analysis to compare patterns of user speech and movement with prior patterns. The patterns used for comparison can be those of other participants in the current conference, patterns of the same participant in the same conference (e.g., to show whether and to what extent a user's attention and mood are changing), or general reference patterns known to represent certain attributes. The module 110d assesses intonation of speech of the participant, which can be indicative of different emotional states. The module 110a recognizes gestures and indicates when certain predetermined gestures are detected. The module 110f performs facial image or expression recognition, for example, indicating when a certain expression (such as a smile, frown, eyebrow raise, etc.) is detected. The module 110g performs speech recognition to determine words spoken by the participant. Optionally, the module 110g can determine whether any of a predetermined set of keywords have been spoken, and indicate the occurrence of those words as feature scores.

The feature scores 120 indicate the various temporal, acoustic, and image-based properties that the modules 110a-110g detect. The feature scores 120 are then used by one or more scoring modules 130 to determine collaboration factor scores 140 for each of multiple collaboration factors representing how well the participant has been participating or is disposed to participate in the future. In some implementations, the collaboration factors may represent how well a media stream is being transmitted or presented, such as an amount of network bandwidth used, a frequency or duration that a participant is speaking, a background noise level for audio or video data, a percentage of time a participant is looking toward the displayed video conference, etc. In some implementations, the collaboration factors may represent different emotional attributes, e.g., with a different score for levels of each of attention, enthusiasm, happiness, sadness, stress, boredom, dominance, fear, anger, or deception.

In some implementations, a single scoring module 130 determines each of the collaboration factor scores 140. In other implementations, multiple scoring modules 130 are used, for example, with each scoring module 130 determining a collaboration factor score for a different aspect or dimension of collaboration. The collaboration factor scores 140 may be expressed in a variety of ways, but one option is to for each score to be a value between 0 and 1 representing a level for a different aspect being assessed. The combination of scores can be expressed as a vector of values, e.g., [0.2, 0.4, 0.8, 0.5, 0.9, . . . ]. For example, one value may represent the degree to which the participant pictured in the media stream is inferred to be angry, another value may represent the degree to which the participant is inferred to be happy, and so on.

The scoring module 130 can optionally be a trained machine learning model which has been trained, based on a set of training data examples, to predict collaboration factor scores from feature score inputs. For example, the scoring module may include a neural network, a decision tree, a support vector machine, a logistic regression model, or other machine learning model.

As described above, the different collaboration factor scores 140 can be combined into a composite score representing an overall level of participation, engagement, and collaborative potential for the participant. This may be done using a function, a weighted average, a trained machine learning model, or another appropriate technique.

The collaboration factor scores 140 output by the scoring module 130, optionally expressed as a vector, can be compared with reference data (e.g., reference vectors) representing combinations of collaboration factor scores (or combinations of ranges of collaboration factor scores) that are associated with different classifications. For example, one combination of scores may represent a condition that promotes collaboration, while another combination of scores may represent a condition that detracts from collaboration. The moderator module 20 can store and then later access reference data 150 that sets forth predetermined combinations of collaboration factor scores or ranges and corresponding classifications. The moderator module 20 can also determine the similarity between the vector of collaboration factor scores 140 for the current participant at the current time relative to the different reference vectors, e.g., by determining cosine distances between the current vector and each reference vector. The moderator module 20 may then determine the reference vector that is closest to the current vector of collaboration factor scores 140, and select the classification associated with that reference vector in the reference data 150 as a classification for the current participant.

The moderator module 20 can also store and access mapping data 160 that indicates video conference management actions to be performed, either directly by the moderator module 20 or suggested for a user (e.g., a meeting organizer) to perform. For example, the mapping data 160 can indicate classifications and corresponding actions that the moderator module 20 can take to improve the video conference session when the corresponding classification is present. The actions may affect the current endpoint and the corresponding participant. In addition, or as an alternative, the actions may affect and may be based on the scores and classifications of other participants in the video conference. Thus, an action that affects one endpoint or participant may taken in response to evaluating the various scores or classifications for one or more, or even all, of the other endpoints and participants.

The moderator module 20 can perform a number of actions to alter the transmission and/or presentation of the video conference at the various endpoints 12a-f. The actions can enhance the quality of the conference and provide a variety of improvements to the functioning of the system. For example, the moderator module 20 can adjust audio properties for the different endpoints 12a-f. Depending on the collaboration factor scores and/or classification determined, the moderator module 20 can alter the transmission of data and/or presentation of the video conference at the endpoints 12a-f. For example, the moderator module 20 can add or remove a media stream from being provided, change a number or layout of media streams presented, change a size or resolution of a video stream, change a volume level or mute audio of one or more participants, designate a particular participant as speaker or presenter, set period or time limits that a particular participant can be a speaker or presenter to the group, and so on. The moderator module 20 can also improve efficiency of conferencing by, for example, reducing a bit rate of a media stream, changing a codec of a media stream, changing a frame rate of a media stream, and so on. As discussed further below, the moderator module 20 can additionally or alternatively add a score, indicator, symbol, or other visible or audible feature that represents the composite collaboration score for individual participants or for the group of participants as a whole.

In some implementations, the functions shown for FIG. 2B are performed for each endpoint 12a-f in the videoconference. The functions discussed can also be performed repeatedly, for example, on an ongoing basis at a particular interval, such as every second, every 5 seconds, every minute, etc. This can allow the moderator module 20 to adapt to changing circumstances in the videoconference. The moderator module 20 can re-classify different endpoints 12a-f and their video streams to take different actions, thus dynamically altering how video and audio information is transmitted and presented for the endpoints 12a-f.

As shown in FIG. 3, each participation module 40 is configured to provide at least an input interface 46 configured to receive media by way of video and/or audio of each requisite one or more conference participants endpoints 12a-f. Typically, the participation modules 40 are configured to operate on each participant endpoints 12a-f existing computer hardware and/or processing means including the utilization of input and output interfaces, for example a video camera or webcam, video displays, microphones, and/or audio speakers.

Figure 4:
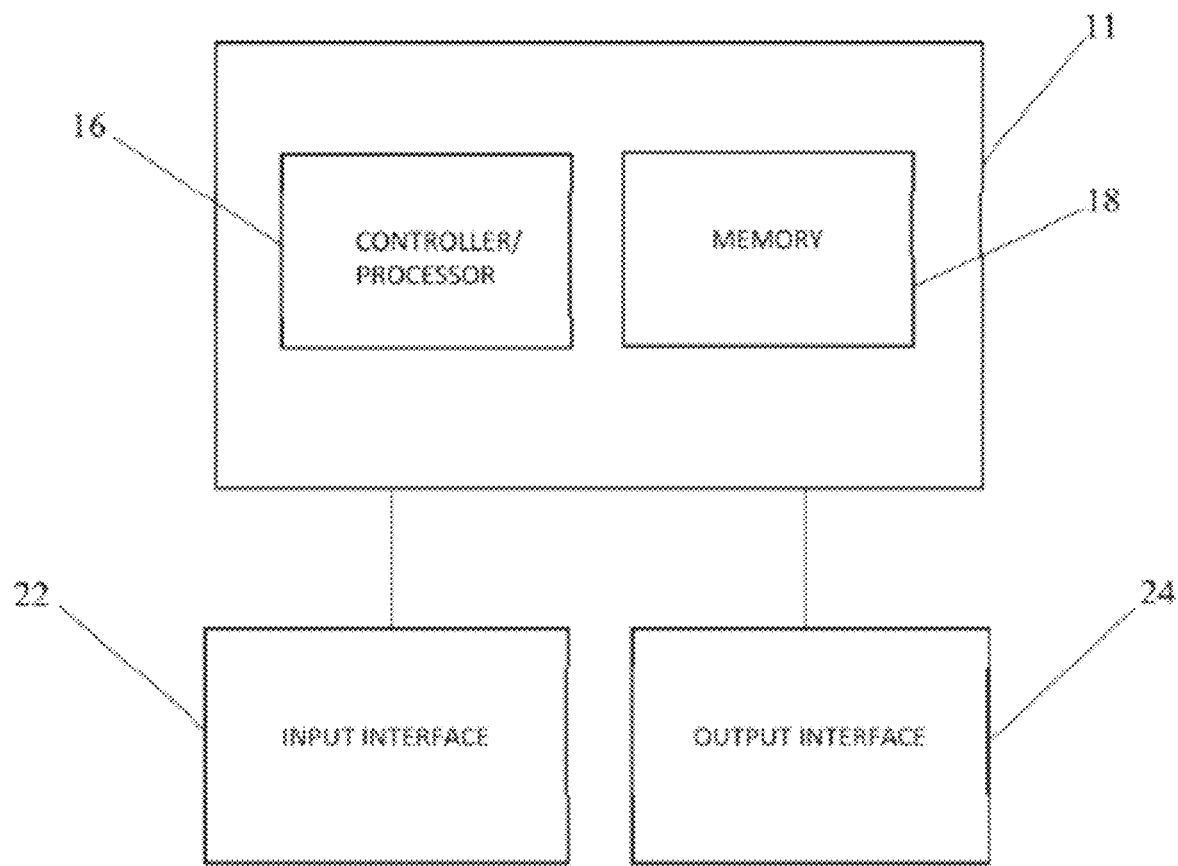
FIG. 4 is a block diagram illustrating a computer processing system in components in accordance with an element of the invention.

FIG. 4 is an example computer hardware and processing means that may be utilized for supporting operation of the processing of one or more of the calculations throughout the video conference moderator system 10 such as the moderator module 20 and/or each of the one or more independent participation modules in components. Generally, the processing components may comprise one or more processors 16, a memory 18, and a communication interface, including an input interface 22 and an output interface 24. The input interface 22 configured to receive one or more media stream content comprised of audio and/or visual characteristics from one or more conference participant endpoints 12a-f. The one or more processors 16 are generally configured to calculate at least one measurement value indicative of a participation level based on one or more characteristics from the media stream at any given moment or over a period of time. The output interface 24 transmits at least one integrated representation of the measurement value to one or more conference participant endpoints 12a-f, which will be described in more detail below.

Referring to FIG. 2 and FIG. 3, the analysis preprocessor 30 is operably configured to receive and measure raw scores (e.g., collaboration factor scores) of monitored characteristics throughout a video/audio conference call via the input media streams. The score value indicative of a level of participation or other characteristic may be calculated by the processor 16 or other processing means for each of the conference participant endpoints 12a-f.

In some implementations of the video conference moderator system 10, the analysis processor 30 is configured to derive a raw score for each participant endpoint 12a-f for each displayed characteristic relating to each participant's visual and audio media stream input 46. Specifically, a score is derived for one or more of the following traits: stress, enthusiasm, contribution, and/or happiness among others based on visual and audio cues detected throughout the media stream input 46 at any given time or over time. The raw measurement scores for each characteristic of each conference participant are detected by way of facial expression recognition and/or audio recognition technology based on principles of neuroscience.

For example, throughout the analysis processor 30, the audio input media stream is analyzed by audio recognition technology in order to detect individual speaking/participation time, keyword recognition, and intonation and tone which indicate certain characteristics of each participants collaborative status. Moreover, individually or in aggregate with the audio recognition technology, the facial recognition technology is configured to monitor and detect varying facial expression at any given moment or over a period of time, which indicate participant's emotional status relating to attentiveness, contentment, patience, stress, boredom, dominance, fear, anger, and/or deception throughout the duration of the conference call. These characteristics are analyzed to provide one or more of the raw trait scores relating to the participants traits: stress level, enthusiasm, contribution, and happiness, among others.

In some implementations, the monitored characteristics may either negatively or positively impact the trait scores of each participant. For example, a negative impact of one or more of the raw trait score may be based on an endpoint conference participant who is exhibiting negative emotions such as stress, boredom, dominance, fear, deception, and/or even anger. Oppositely, a positive impact of one or more of the raw trait score may be based on a conference participant who is exhibiting positive, collaborative emotions such as facial expression related to characteristics of attentiveness, genuine, contentment, pleasure, and patience when others are speaking.

The time period utilized in the above calculations may be any predetermined amount of time, a percentage of the total conference time, or the total conference time. Moreover, derivation of the raw score traits may be a measure of the relative raw score traits of a particular conference participant compared with the other conference participant endpoints.

The analysis processor 30 may be configured to actively and intelligently learn how to best and most effectively score each participant throughout the conference call and over a series of conference calls with the same participants.

Figure 7:
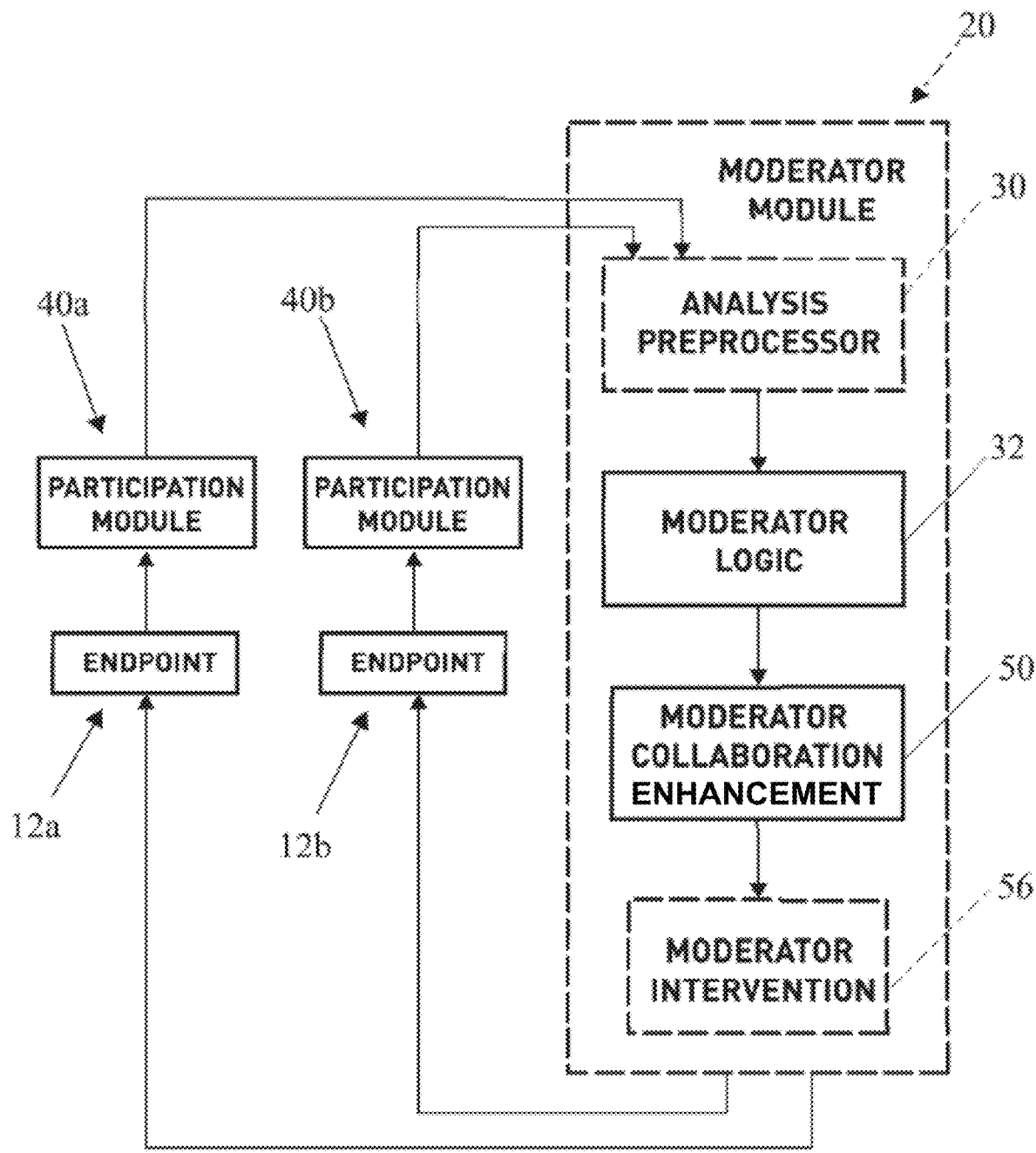
FIG. 7 illustrates a flow chart of one implementation of a method employed by the application.
Figure 8:
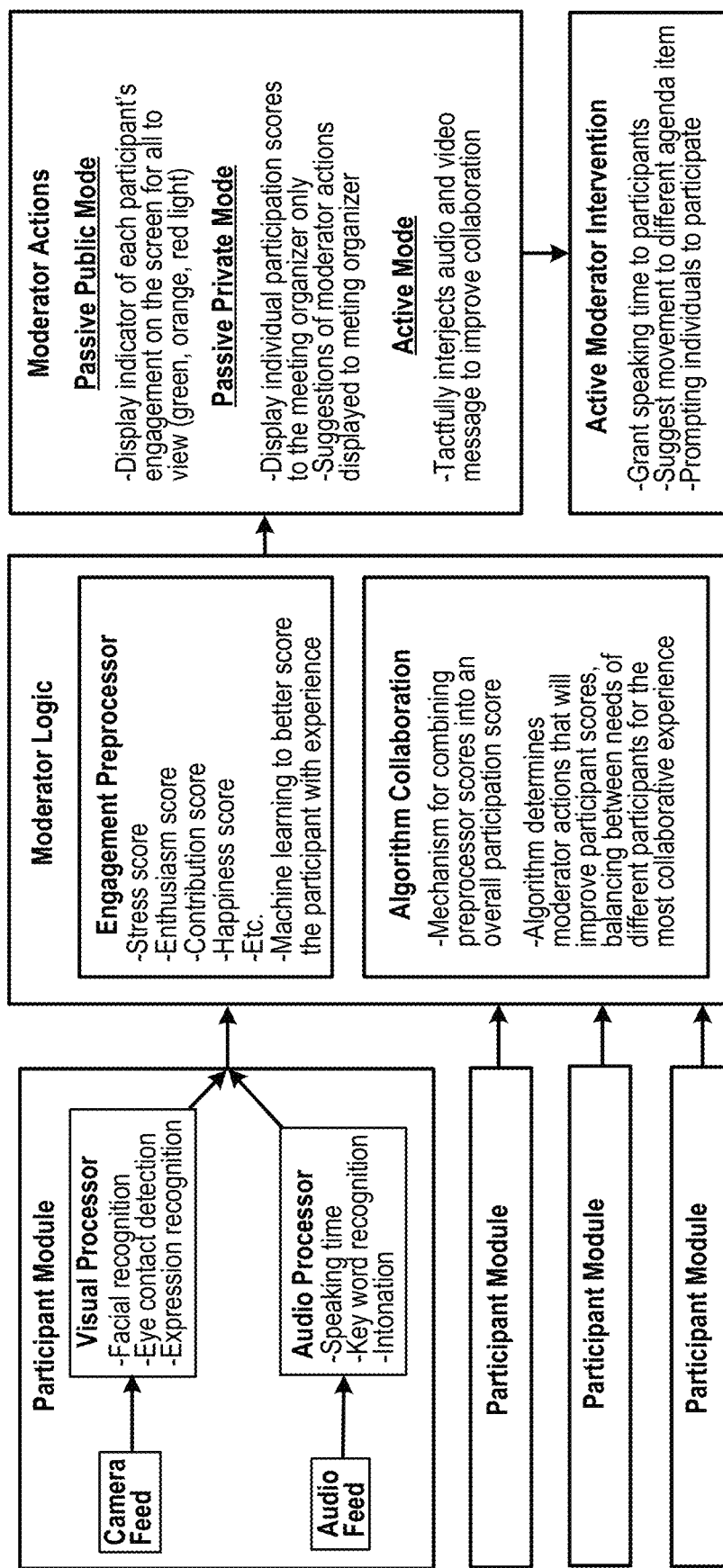
FIG. 8 illustrates an overview flowchart of another implementation of a method employed by the current application.

Now referring to FIG. 2, FIG. 7, and FIG. 8, the moderator logic 32 is operably configured to combine the raw scores derived in the analysis preprocessor 30 into an overall participant composite score and/or an overall group composite score. Moreover, the moderator logic 32 may be configured to determine and provide instructions on what action should take place to improve the conference participant composite scores, balancing between the needs of different participants for the most collaborative experience.

In some implementations, the moderator logic 32 combines the raw trait scores derived in the analysis processor 32 above relating to stress, enthusiasm, contribution, and happiness of each participant into an overall participant composite score and group composite score. The composite score may be a selective combination of one or more of the raw trait scores. Each raw trait score may be equally or differently weighted depending on the overall group composite score and/or scenario. Varying equations/algorithms calculating the outcome value of the one or more composite scores can be envisioned, including but not limited to clustering, neural networks, and nonlinear models. Rather than an equation, the score may also be implemented as a direct sum quantity for each individual participant.

Figure 5:
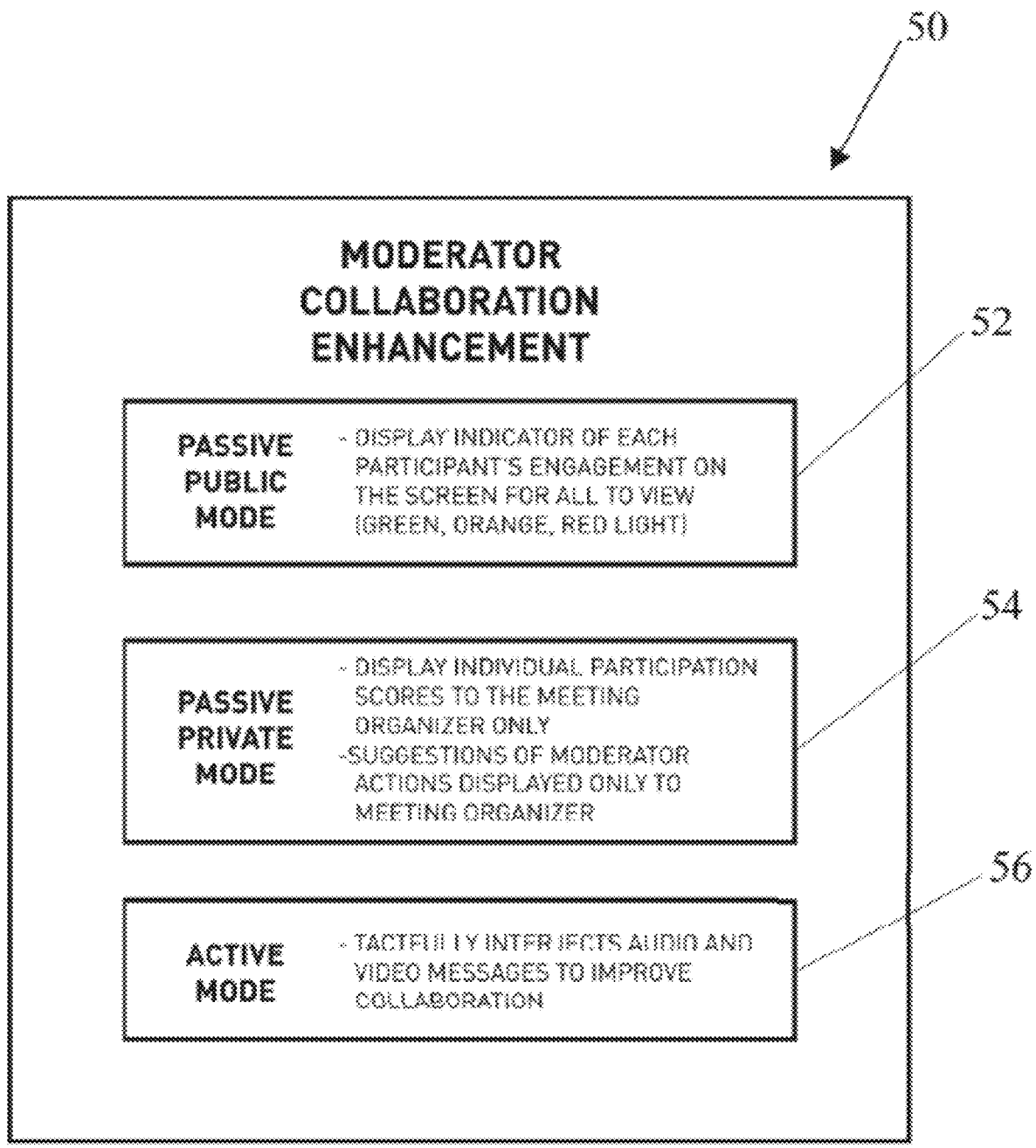
FIG. 5 is a block diagram illustrating a plurality of example moderator modes for enhancing collaboration.
Figure 6:
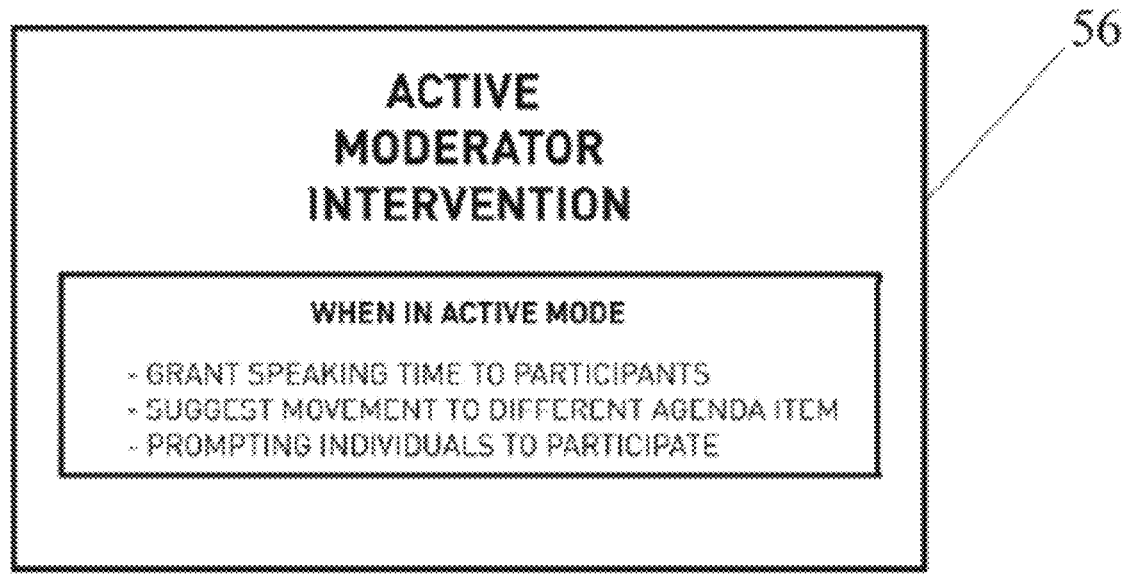
FIG. 6 is a block diagram illustrating the active moderator mode of the implementation of FIG. 5.

The moderator logic 32 may also include the function of determining and providing instructions regarding what action or course of action should take place in order to improve the conference participant composite scores, with emphasis on balancing the needs between the different participants in order to facilitate the most collaborative experience. Referring to FIG. 5, FIG. 7, and FIG. 8. In some implementations of the invention, the moderator logic 32 may provide one or more moderator collaboration enhancement modes 50 ('MCE modes'), each designed to interact with conference participant endpoints 12a-/in order to encourage proactive collaboration amongst the participants based off the participant composite scores and/or the overall group composite score. The MCE modes may be selected from the following group: Passive Public Mode 52, Passive Private Mode 54, and/or Active Mode 56. Each mode actively provides the group organizer different ways of providing direct feedback and/or actions to prompt and facilitate collaboration.

More specifically, the Passive Public Mode 52 provides an integrated output media stream display indicator of each participant's engagement publishing to the group each participants composite score and/or the group's overall composite score. In some implementations of the invention, the indicator is an integrated representation using a multi-color coded dynamic participation level and quality indicator of each conference participant endpoint 12a-f. The indicator conveys the participation level of the participant endpoints 12a-f through the output video stream of the respective participant endpoints 12a-f. In the illustrated implementation, the integrated representation dynamic participation level and quality indicator changes in color according to the relative degree of the quality and level of participation based on the participant composite score as compared to the other plurality of participants or compared with a predetermined quantity or threshold. For example, the indicator may indicate a shade of the color red if the composite score is determined to be in excess of a predetermined threshold based on the quality and level of participation, a shade of the color orange if the composite score is determined to be within an average predetermined threshold, or a shade of the color green if the composite score is determined be below a predetermined threshold. Thus, providing each of the conference participant endpoints 12a-f with a dynamic indicator exposing each participant's quality and level of participation. Therefore, individually, collectively, and via social influence/pressure encouraging the group to efficiently collaborate.

The MCE modes 50 may also include a Passive Private Mode 54 which limits feedback based on the participant composite scores and/or overall group composite scores only to the group/meeting organizers who have permission. Moreover, the Passive Private Mode 54 may also provide suggestions of moderator actions directed and displayed only to the group/meeting organizer in order to introduce actions that promote a positive outcome towards group collaboration-improving individual participant composite scores and overall group composite scores.

The MCE modes 50 may also further comprise an Active Mode 56 which tactfully interjects and/or subtly introduces direct integrated audio and visual indicators and messages through the output video stream of one or more conference participants, which are configured to improve collaboration individually and as a group.

The operations of the moderator module 20 can enhance collaboration by recognizing and signaling negative conditions or states that hinder collaboration. In many cases, these conditions are conditions of the participants of the video conference that can be detected in the media streams provided to the moderator module 20. Collaborative group members typically come from different backgrounds, embrace alternative beliefs, and view the world much differently from one another; namely, have different views and interests on how or even if an objective should be effected or achieved. Collectively, this provides a diverse and sometimes hostile collaborative video conferencing environment, which is not ideal for an efficient group analysis and resolution of an objective that everyone can cooperatively agree on.

In many situations, stress hormones such as norepinephrine, cortisol, and adrenaline inhibit group members from participating and successfully collaborating towards a common objective. Stress hormones increase blood flow to skeletal muscles, intensifies breathing and heart rate, dilates pupils, and elevates blood pressure. The moderator module 20 may detect these physiological changes, for example, though analysis of video data provided during the video conference. There are positive implications of these hormones in protecting and energizing humans. But as they relate to resolving issues with regard to collaboration, these are generally chemicals that will hinder the positive outcomes. These hormones create resistance to resolving difficulties, making decision, compromising, and arriving at mutually productive conclusions, or even building relationship bonds.

On the other hand, dopamine, oxytocin, serotonin, endorphins, and anandamide are major hormones associated with success, contentment, pleasure, and bonding. These can encourage group participation, individual buy in, and collaboration, which promotes efficiently working as a group to achieve a common objective. The brain and glands are very resistant in releasing these potent drugs, since the reward system would not be functional or effective if "rewards" were granted arbitrarily or continually.

Current video conference platforms do not facilitate the release of positive hormones while mitigating the release of negative hormones. The techniques employed by the moderator module 20 can manage a video conference to encourage a collaborative, efficient work setting, for example, by improving the efficiency of collaborating, overcoming resistance towards participation and collaboration, and overcoming barriers created by the release of negative neurological hormones.

The video conference moderator module 20 utilizes both tangible technology and the science of neurology to secure necessary chemical assistance of oxytocin, dopamine, and serotonin, while subduing adrenaline, cortisol, and other negative neurological hormones throughout a video conference call. The platform is configured to promote positive thought patterns and outcomes, to help overcome negative emotional states among the video conference group collaborators by mitigating and overcoming barriers created by negative neurological hormones while encouraging the release of positive hormones throughout the meeting.

FIG. 7 illustrates a flow chart of an implementation of the video conferencing moderator system 10. The participation module 40 monitors, measures and analyzes one or more characteristic of an input media stream by way of facial and audio recognition technology from at least one conference participant endpoint of a plurality of conference participants endpoints 12a. The analysis preprocessor 30 calculates/derives a raw trait score from the characteristic of the media stream including but not limited to one or more of the following traits: stress, enthusiasm, contribution, and happiness. The moderator logic 32 combines the raw trait scores derived in the analysis processor 30 relating to stress, enthusiasm, contribution, and happiness of each participant into an overall participant composite score and group composite score. Thereafter, the moderator logic 32 outputs an integrated moderator collaboration enhancement action 50 based on at least one of the conference participant endpoints 12 composite score via the output media stream.

The integrated moderator collaboration enhancement action 50 may be displayed by one or more of the endpoints 12a-f. The moderator module 10 may be a video conferencing bridge or an audio conferencing bridge, either of which may be referred to as a multipoint conferencing unit (MCUs).

The memory 18 may be any known type of volatile memory or non-volatile memory. The memory 18 may store computer executable instructions. The processor 16 may execute computer executable instructions. The computer executable instructions may be included in the computer code. The computer code may be stored in the memory 18. The computer code may be logic encoded in one or more tangible media or one or more non-transitory tangible media for execution by the processor 16.

The computer code may be logic encoded in one or more tangible media or one or more non-transitory tangible media for execution by the processor 16. Logic encoded in one or more tangible media for execution may be defined as instructions that are executable by the processor 16 and that are provided on the computer-readable storage media, memories, or a combination thereof.

Instructions for instructing a network device may be stored on any logic. As used herein, "logic" includes but is not limited to hardware, firmware, software in execution on a machine, and/or combinations of each to perform a function(s) or an action(s), and/or to cause a function or action from another logic, method, and/or system. Logic may include, for example, a software controlled microprocessor, an ASIC, an analog circuit, a digital circuit, a programmed logic device, and a memory device containing instructions.

The instructions may be stored on any computer readable medium. A computer readable medium may include, but is not limited to, a hard disk, an application-specific integrated circuit (ASIC), a compact disk CD, other optical medium, a random access memory (RAM), a read-only memory (ROM), a memory chip or card, a memory stick, and other media from which a computer, a processor or other electronic device can read.

The one or more processors 16 may include a general processor, digital signal processor, application-specific integrated circuit, field programmable gate array, analog circuit, digital circuit, server processor, combinations thereof, or other now known or later developed processors. The processor 16 may be a single device or combinations of devices, such as associated with a network or distributed processing. Any of various processing strategies may be used, such as multi-processing, multi-tasking, parallel processing, remote processing, centralized processing or the like. The processor 16 may be responsive to or operable to execute instructions stored as part of software, hardware, integrated circuits, firmware, microcode or the like. The functions, acts, methods or tasks illustrated in the figures or described herein may be performed by the processor 16 executing instructions stored in the memory 18. The functions, acts, methods or tasks are independent of the particular type of instructions set, storage media, processor or processing strategy and may be performed by software, hardware, integrated circuits, firmware, micro-code and the like, operating alone or in combination. The instructions are for implementing the processes, techniques, methods, or acts described herein.

The input/output interface(s) may include any operable connection. An operable connection may be one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other or through one or more intermediate entities (e.g., processor, operating system, logic, software). Logical and/or physical communication channels may be used to create an operable connection.

The communication paths 14a-f may be any protocol or physical connection that is used to couple a server to a computer. The communication paths 14a-/may utilize Ethernet, wireless, transmission control protocol (TCP), internet protocol (IP), or multiprotocol label switching (MPLS) technologies.

The endpoints 12a-f may include a processor, a memory, and a communication interface according to the examples discussed above. In addition, the endpoints 12a-f include a display and at least one input device. The display may be a cathode ray tube (CRT) monitor, a liquid crystal display (LCD) panel, or another type of display. The input device may include a camera, a microphone, a keyboard, and/or a mouse. The endpoints 12a-f are capable of producing a media stream, including video and/or audio, that originates with the camera and/or microphone and is compressed and encoded by the processor or codecs. The endpoints 12a-f may also include one or more speakers.

In addition to or instead of the techniques discussed above, an embodiment of the system can include endpoints or participant devices that communicate with one or more servers to perform analysis of participants' emotions, engagement, participation, attention, and so on, and deliver indications of the analysis results, e.g., in real-time along with video conference data or other communication session data and/or through other channels, such as in reports, dashboards, visualizations (e.g., charts, graphs, etc.). The system can include various different topologies or arrangements as discussed further below.

The system provides many versatile tools for emotion analysis and feedback in a variety of communication sessions, involving remote interactions (e.g., video conferences), local interactions (e.g., meetings in a single room, instruction in a classroom, etc.), and hybrid interactions (e.g., a lecture with some participants in a lecture hall and other participants participating remotely by video). The system can use emotion to assess many conditions beyond collaboration among participants. For example, in the a classroom setting, the video analysis and emotion processing can be used to determine who is paying attention or is engaged with the lesson material.

The system can be used in many different settings, including in videoconferences, meetings, classrooms, telehealth interactions, and much more. The system can provide many different types of insights about the emotions and unspoken state of participants in a communication session. For example, the system can assist users to know if they are dominating the time in a communication session or if others aren't participating as they could. The system can provide on-screen mood feedback about participants, which can be especially helpful in settings such as classroom instruction or in meetings. For example, the system can detect and indicate to users conditions such as: a person having an unspoken question; a person feeling confused; a level of enthusiasm not expressed verbally; distraction; boredom; contentment, and so on. Many of these conditions are possible for a person to recognize in other people in a live environment but are extremely difficult for a person to detect in a remote-interaction environment such as a videoconference.

The system provides may features and outputs to evaluate and improve interactions. For example, the system can provide feedback to a meeting host about the level of interest among participants, so the host can know if she is hosting the meeting in an interesting way. This includes the ability to score the audience response to different portions of a communication session, to determine which techniques, content, topics, etc. provide the best engagement, attention, and other results. As another example, the system can be used to assess an instructor's performance, e.g., with respect to objective measures of audience response or later outcomes, or relative to other instructors. This can help identify and provide evidence for identifying who is a top-notch engager and what techniques or characteristics they employ make them effective. Similarly, the analysis performed by the system can be used to evaluate content and topics, such as to indicate if a presenter's topic is exciting, aggravating, or too complex. The system can provide information about a wide range of basic and complex emotions, so a presenter can be informed if, for example, a participant is concerned or appreciative. These and other features help make remote interactions feel real, providing feedback about non-verbal signals that many people would not recognize themselves through the limited information provided through video conferences and other remote interactions. In general, feedback about emotion, engagement, attention, participation, and other analyzed aspects can be provided to a person in a certain role (e.g., such as a teacher, presenter, or moderator) or to some or all participants (e.g., to all participants in a video conference, or to participants that have elected to enable the emotional monitoring feature).

As discussed above, a system can evaluate media showing individuals to estimate the emotions and other characteristics of the individuals over time during a communication session. The communication session can involve a two-way or multi-way communication, such as a video conference among participants. The communication session can involve primarily one-way communication session, such as a presentation by a teacher, professor, or other speaker to an audience, where a single speaker dominates the communication. In either situation, video feeds for participants can be received and analyzed by the system. In the case of a presentation by a teacher or other presenter, video feed(s) showing the audience during a session can be provided using devices for individual audience members (e.g., a phone, laptop, desk-mounted camera, etc.) or using devices that can capture video for multiple members of a group (e.g., cameras mounted in a classroom, conference room, theater, or other space). Thus, the system can be used whether a video feed is provided for each individual in an audience or whether a video feed shows some or all of the audience as a group.

The monitoring of emotion and feedback about emotion can be performed during remote interactions, shared-space interactions, or hybrid interactions having both local and remote participants (e.g., a presentation to local audience with additional participants joining remotely). Examples of remote interactions include various forms of video conferencing, such as video calls, video meetings, remote meetings, streamed lectures, online events (e.g., a webinar, a webcast, a web seminar, etc.), and so on. Examples of shared-space interactions include in-class instruction in school, meetings in a conference room, meetings. Other examples interactions are described further below.

Once the system determines the emotional states and emotional reactions of participants in a communication session, the system can provide feedback during the communication session or later. For example, the system can be used in videoconferencing to provide real-time indicators of the current emotional states, reactions, and other characteristics of participants in a video conference. In some cases, the indicators can be icons, symbols, messages, scores (e.g., numbers, ratings, level along a scale, etc.), user interface characteristics (e.g., changes to formatting or layout, sizes or coloring of user interface elements, etc.), charts, graphs, etc. An indicator can be provided in association with a user interface (UI) element representing a person (e.g., the person's name, image or icon, and/or video feed), for example, by overlaying the indicator onto the UI element or placing the indicator adjacent to the UI element or within an area corresponding to the UI element. The indicators can be provided automatically by the system, for example, provided all the time whenever the feature is active, or provided selectively in response to the system detecting a certain condition (e.g., an emotion score indicating at least a threshold level of intensity, or a confidence score for the emotion being above a threshold). The indicators may also be provided on-demand, for example, in response to a request from a user for one or more indicators to be provided.

The indicators can indicate a person's emotion(s) or another characteristic (e.g., engagement, participation, interest, collaboration, etc.). The indicators can indicate levels of different emotions, e.g., anger, fear, disgust, happiness, sadness, surprise, and/or contempt. These basic emotions are often expressed in a similar manner for many different people and can often be determined from individual face images or a few different face images (e.g., a short video segment). The system can use combinations of basic emotions, and the progression of detected emotions over time, to detect and indicate more complex emotions, mental or psychological states, and moods. Different combinations of emotions can be indicative of feelings such as boredom, confusion, jealousy, anxiety, annoyance, stress, and so on. Additional examples include surprise, shock, interest, and curiosity. For example, a single instance of a facial expression may signal a moderate level of fear and a moderate level of surprise. By repeatedly (e.g., periodically or continually) monitoring the emotion levels as the communication session proceeds, the system can determine how the user's emotions progresses. Changes in the emotion levels or maintaining certain emotion levels over time can signal various different psychological or emotional conditions. The system can also detect micro-expressions, such as brief facial movements that signal a person's reactions, and use these to identify the state of the person.

The system can provide many outputs to users that provide measures of emotion and engagement, whether done during a communication session (e.g., with real-time, on-screen feedback) or afterward (e.g., in a report, provided after the session has ended, describing emotional states and reactions in communication session). In some cases, the system can be used to analyze recordings of at least portions of video conferences (e.g., with recorded video from one or more participants) to analyze one or more recording(s) of the session in an "offline" or delayed manner and to provide analysis results.

The system can maintain profiles that represent different complex emotions or mental states, where each profile indicates a corresponding combination of emotion scores and potentially a pattern in which the scores change are maintained over time. The system compares the series of emotion data (e.g., a time series of emotion score vectors, occurrence or sequence of micro-expressions detected, etc.) with the profiles to determine whether and to what degree each person matches the profile. The system can then provide output to the members of a video conference or other communication session based on the results. For example, a person in a video conference may be provided a user interface that includes indicators showing the emotional states or engagement (e.g., collaboration score, participation score, etc.) of one or more of the other participants. The system may provide a persistent indicator on a user interface, such as a user element that remains in view with a user's video feed and shows changes in a participants emotional state as it changes throughout a video conference. In some cases, one or more indicators may be provides selectively, for example, showing emotion feedback data only when certain conditions occur, such as detection of a certain micro-expression, an emotion score reaching a threshold, a combination of emotional attribute scores reaching corresponding thresholds, detecting when a certain condition occurs (e.g., a participant becomes bored, angry, has low engagement, becomes confused, etc.), and so on.

As more and more communication is done remotely through video calls and other remote interactions, assisting others to determine the emotional state of others also becomes more important. According to some estimates, around 70% of human communication is non-verbal, such as in the form of body language and facial expressions. Non-verbal communication can be difficult or impossible to detect through many remote communication platforms. For example, if a presentation is being shown, in many cases the presentation slides are shown often without a view of other participants. Also, video conference platforms often show most participants in small, thumbnail-size views, with only the current speaker shown in a larger view. The thumbnail views are not always shown on screen at the same time, perhaps showing only 5 out of 20 different participants at a time. Naturally, participants will not be able to gauge the facial expressions and body language of others that they cannot see. Even when video of others is shown, the small size of common thumbnail views makes it difficult for users to gauge emotions. In addition, the complexity of multiple-person "gallery" views (e.g., showing a grid or row of views of different participants, often 5, 10, or more) also makes it difficult for people to accurately gauge emotions from them, as a person often cannot focus on many people at once. Screen size is also a limiting factor, and video feeds are limited to the size of the person's display. This is can be very problematic as the number of participants increases, as there is only a limited amount of screen space with which to display video of participants. As the number of participants increases, the screen space needs to be shared among a greater number of views, resulting in smaller and smaller sizes of participant's video feeds or the need to omit some video feeds entirely. In cases where a video feed includes multiple people, the size of faces within the video feed is often quite small, resulting in even smaller viewing sizes for participants' faces, especially when multi-person video feeds are shown in thumbnail views.

For these and other reasons, much of the non-verbal communication that would be available in shared-setting, in-person communication is lost in remote communications, even with video feeds being provided between participants. Nevertheless, the techniques discussed herein provide ways to restore a significant amount of the information to participants in a video conference or other remote interaction. In addition, the analysis of the system can often provide feedback and insights that improves the quality of in-person interactions (e.g., classroom instruction, in-person meetings, doctor-patient interactions, and so on).

The system provides many insights into the engagement and collaboration of individuals, which is particularly important as teleworking and distance learning have become commonplace. Remote interactions through video conferencing are now common for companies, governments, schools, healthcare delivery (e.g., telehealth/telemedicine), and more. The analysis tools of the system can indicate how well students, colleagues, and other types of participants are engaged and how they are responding during a meeting.

Example Applications

The system can be used to provide feedback about emotion, engagement, collaboration, attention, participation, and many other aspects of communication. The system can provide these in many different areas, including education, business, healthcare/telehealth, government, and more.

The system can be used to provide emotional feedback during calls to assist in collaboration. As a call progresses, the system evaluates the emotions of the participants during the call. The system can then provide indicators of the current emotional states of the different participants at the current point in the call, as well as potentially measures of emotional states for groups within the call or for the entire group of participants as a whole. This can include providing scores, symbols, charts, graphs, and other indicators of one or more emotions, overall mood, or other emotional attributes. The system can also provide indicators of levels of engagement, participation, collaboration, and other factors for individuals, groups, or for the entire set of participants.

The indicators provided by the system can often show emotion levels and patterns that show which individual(s) need to be drawn into the conversation for better collaboration, which individuals need to speak less (e.g., because they dominate the speaking time or are having a negative effect on the emotions and collaboration of others), which individuals have unspoken feelings or concerns and needs to air their feelings, or which individuals currently have an unspoken question that is not being shared. In many cases, indicating emotion levels for one or more emotions, or indicating overall emotion levels, can allow participants to identify these conditions. In some implementations, the system may detect patterns that are representative of these conditions and the system can provide output to the participants in a video conference of the condition detected. For example, the system may provide a message for output on a video conference user interface next to a person's name, image, or video feed that indicates a condition detected based on the emotion and collaboration analysis, e.g., "Alice should have a larger role in the conversation," "Joe needs to speak less, he has twice as much speaking time as anyone else," "John has concerns he to discuss," "Sarah has a question," and so on.

The system can detect conditions in a conference, for individuals or the conference as a whole, by classifying patterns. These patterns can include factors such as emotion displayed by participants, actions performed by participants, conference statistics (e.g., speaking time distribution, length of speaking segments, etc.), and more.

Pattern detection can be used, along with various other techniques, to identify micro expressions or "micro-tells" that can signal emotional states and complex conditions beyond basic emotions. People reveal feelings and thoughts through brief, involuntary movements or actions, often without intending or even being aware they are making the expressions. People often flash the signals briefly (e.g., in facial movement that may last for only a fraction of a second) and then hide them. Nevertheless, the detection of these micro-expressions can be strong signals of the person's reaction to the content in the video conference and the person's current state. The micro-expressions can also signal items such as confusion, surprise, curiosity, interest, and other feelings that are more complex than basic emotions. The system can examine audio and video data for each participant, and determine when a profile, pattern, or trigger associated with a particular micro-expression occurs. This can include looking at progressions of facial changes over a series of frames, examining correlation of interjections and uttered responses with the face movements, and so on. When the micro-expression is detected, the system can provide feedback or adjust the communication session. For example, the system can store data that describes patterns or profiles that specify characteristics (e.g., ranges or types of facial expressions, facial movements, eye and head movements and position, body movements, voice inflection, sounds uttered, etc.) that represent the occurrence of a micro-expression or of an emotional state or emotional response. When the incoming data for a participant matches or is sufficiently similar to one of the reference profiles, then the system can take an action corresponding to the reference profile, such as to provide a certain kind of feedback to the user making the expression and/or to others, or to make a change to the conference.

The triggers for feedback or action in adjusting a video conference can be assessed at the individual level (e.g., for individual participants in the conference), or at the group level (e.g., based on the aggregate data collected for the set of all participants). For example, if a decrease in the aggregate or overall engagement is detected, the system can determine that it is time to take a break (e.g., pause the conference) or change topics. The system may cause the determined conditions and associated actions to be displayed, and in some cases may initiate the action (e.g., display to participants, "Conference to be paused for a 5 minute break in 2 minutes," along with a 2-minute countdown timer, and then automatically pause the conference and resume after the break).

The system can be used to determine the effects of actions of participants in a communication session. For example, the system can monitor the engagement of participants with respect to who is speaking (and/or other factors such as the specific topic, slides, or content being discussed). The system may determine that when a certain person starts talking, some people lose interest but one particular person pays attention. The system may determine that when voice stress gets to a certain level, people start paying attention, or it may determine that the people involved stop paying attention. This monitoring enables the system to measure a speaker's impact on specific participants and on the group as a whole. This information can be provided to participants, or to a presenter, moderator, or other person, in order to improve business conferences, remote learning, in-person education, and more.

The system can perform various actions based on the emotions and participant responses that it detects. For example, the system can prompt intervention in the meeting, prompt a speaker to change topics or change content, and so on. As another example, in an instructional setting, the system may detect that a person became confused at a certain time (e.g., corresponding to a certain topic, slide, or other portion of the instruction), and this can be indicated to the instructor. The feedback can be provided during the lesson (e.g., so the teacher can address the topic further and even address the specific student's needs) and/or in a summary or report after the session has ended, indicating where the instructor should review and instruct further, either for the specific person that was confused or for the class generally.

As noted above, the techniques for emotional monitoring and feedback are useful in settings that are not pure video conference interactions. For example, the system can be used to monitor video of one or more students in class or one or more participants in a business meeting, whether or not the presenter is local or remote. Even when the presenter and audience are in the same room, cameras set up in the room or cameras from each individual's device (e.g., phone, laptop, etc.) can provide the video data that the system uses to monitor emotion and provide feedback. Thus the system can be used in network-based remote communications, shared-space events, and many other settings.

The system can cross-reference emotion data with tracked speaking time to more fully analyze collaboration. The system can use a timer or log to determine which participants are speaking at different times. This can be done by assessing the speech content and speech energy level in the audio data provided by different participants, and logging the start and stop times for the speech of each participant. Other cues, such as mouth movement indicative of speaking, can be detected by the system and used to indicate the speech times for each user. With this tracked speech information, the system can determine the cumulative duration of speech for each participant in the communication so far, as well as other measures, such as the proportion that each participant has spoken. With the tracked speech times, the system can determine and analyze the distribution of speaking time duration (e.g., total speaking time over the session for each participant) across the set of participants. The characteristics of the distribution among the participants affects the effectiveness of collaboration. As a result, characteristics of the speaking time distribution may can be indicative of the effectiveness of collaboration that is occurring. In some cases, the system can detect that the distribution is unbalanced or indicative of problematic conditions (e.g., poor collaboration, dysfunctional communication, low engagement, etc.), and the system may detect that changes need to be made to adjust the speaking distribution.

The system can use emotion data in combination with the speaking time data to better determine the level of collaboration and whether intervention is needed. For example, a lopsided distribution with one person dominating the conversation may generally be bad for collaboration. However, if measures of engagement and interest are high, and positive emotion levels are present (e.g., high happiness, low fear and anger), then the system may determine that there is no need for intervention. On the other hand, if the unbalanced distribution occurs in connection with poor emotion scores (e.g., low engagement, or high levels of fear, anger, contempt, or disgust), the system may determine that intervention is needed, or even that earlier or stronger intervention is needed.

At times, the speaking time distribution needs to be controlled through actions by the system. These actions may be to increase or decrease speaking time allotted for a communication session, to encourage certain participants to speak or discourage some from speaking, and so on.

The speaking time data can be provided to individuals during an communication session to facilitate collaboration in real time during the session. For example, individual participants may be shown their own duration of speaking time in the session or an indication of how much of the session they have been the speaker. Participants may be shown the distribution of speaking times or an indication of relative speaking times of the participants. As another example, participants can be shown a classification for the speaking times in the session, e.g., balanced, unbalanced, etc.

Speaking time data can also be used after a communication session has ended to evaluate the performance of one or more people in the communication session or the effectiveness of the session overall. In some cases, records for a communication session can be provided to a party not participating in the communication session, such as a manager who may use the data to evaluate how well an employee performed in a meeting. For example, a worker's interactions with clients in a meeting can have speaking times monitored, and a manager for the worker can be shown the speaking time distribution and/or insights derived from the speaking time distribution (e.g., a measure of the level of collaboration, a classification of the communication session, etc.).

In some implementations, the system can change the amount of time allotted to speakers, or adjust the total meeting time (e.g., when to end the meeting or whether to extend the meeting) based on an algorithm to optimize a particular metric. For example, to allot speaking time to individuals, the system can assess the effects that speaking by an individual has on the engagement and emotion of other people. The system provides dynamic feedback, both showing how a person's actions (e.g., speech in a conference) affect others on the video conference, and showing the speaker how they are affecting others. For example, if one person speaks and engagement scores of others go up (or if positive emotion increases and/or negative emotion decreases), the system can extend the time allocated to that person. If a person speaks and engagement scores go down (or if positive emotion decreases and/or negative emotion increases), the system can decrease the speaking time allocation for that person. The system can also adjust the total meeting time. The system can assess the overall mood and collaboration scores of the participants to cut short meetings with low overall collaboration or to extend meetings that have high collaboration. As a result, the system can end some meetings early or extend others based on how engaged the participants are.

In some implementations, the system can help a presenter by providing emotion and/or engagement feedback in the moment to facilitate better teaching and presentations. The system can monitor the emotions and engagement of participants during a presentation and provide indicators of the emotions and engagement (e.g., attention, interest, etc.) during the presentation. This enables the presenter to see, in real time or substantially in real time, measures of how the audience is responding to the current section of the presentation (e.g., the current topic discussed, the current slide shown, etc.). This helps the presenter to adapt the presentation to improve engagement of the audience.

To provide this feedback, the communication session does not require two-way video communication. For example, in a classroom setting, cameras may capture video feeds showing faces of students, and the system can show the teacher indicators for individual students (e.g., their levels of different emotions, engagement, interest, and so on) and for the class as a whole. The students do not need to see video of the instructor for their emotional feedback to be useful to the instructor. In addition, the instructor's user interface does not need to show the video feeds of the students, but nevertheless may still show individual emotional feedback (e.g., with scores or indicators next to a student's name or static face image).

The system can give aggregate measures of emotions and other attributes (e.g., engagement, interest, etc.) for an audience as a whole, such as a group of different individuals each remotely participating and/or for a group of individuals that are participating locally in the same room as the presenter. The system can show the proportions of different emotions, for example, showing which emotions are dominant at different times, emphasizing which emotions re most relevant at different times during the presentation, and so on.

The features that facilitate feedback to a presenter are particularly helpful for teachers, especially as distance learning and remote educational interactions become more common. The system can provide feedback, during instruction, about the current emotion and engagement of the students in the class. This allows the teacher to customize and tailor their teaching to meet student needs. The techniques are useful in education at all levels, such as in grade school, middle school, high school, college, and more. The same techniques are also applicable for corporate educators, lecturers, job training, presenters at conferences, entertainers, and many other types of performers, so that they can determine how audiences are affected by and are responding to interaction. Emotion analysis, including micro-expressions, can indicate to teachers the reactions of students, including which students are confused, which students have questions, and so on. This information can be output to a teacher's device, for example, overlaid or incorporated into a video feed showing a class, with the emotional states of different students indicated near their faces. The same information can be provided in remote learning (e.g., electronic learning or e-learning) scenarios, where the emotional states and engagement of individuals are provided in association with each remote participant's video feed. In addition to or instead of providing feedback about emotion, engagement, and reactions of individuals, the system can provide feedback for the class or group of participants. For example, the system can provide an aggregate measure for the group, such as average emotion ratings or an average engagement score. These techniques are applicable to remote or virtual communication as well as to in-person settings. For example, for in-person, shared-space interactions, the cameras that capture video of participants can be user devices (e.g., each user's phone, laptop, etc.), or can be cameras mounted in the room. Thus, the system can be configured to receive and process video data from a dedicated camera for each person, or video data from one or multiple room mounted cameras.

In some implementations, a presenter can be assessed based on the participation and responses of their audience. For example, may be scored or graded based on the participation of their classes. This is applicable to both virtual instruction and in-person instruction. Using the emotional analysis of class members at different times, the system analyzes the reactions of participants to assess elements of instruction (e.g., topics, slides or other content, teachers, teaching techniques, etc.) to determine whether they provide good or bad outcomes. The outcomes can be direct responses in the conference, such as increased engagement measured by the system, or reduced stress and fear and increased happiness and interest. In some cases, outcomes after the instruction or conference can be measured also, such as student actions subsequent to the monitored instruction, including test results of the students, work completion rates of the students, students' ability to follow directions, etc.

The analysis of the system can help teachers and others identify elements that are effective and those that are not. This can be used to provide feedback about which teachers are most effective, which content and teaching styles are most effective, and so on. The analysis helps the system identify the combinations of factors that result in effective learning (e.g., according to measures such as knowledge retention, problem solving, building curiosity, or other measures), so the system can profile these and recommend them to others. Similarly, the system can use the responses to identify topics, content, and styles that result in negative outcomes, such as poor learning, and inform teachers and others in order to avoid them. When the system detects that a situation correlated with poor outcomes occurs, the system can provide recommendations in the moment to change the situation (e.g., recommendation to change tone, change topic, use an image rather than text content, etc.) and/or analysis and recommendations after the fact to improve future lessons (e.g., feedback about how to teach the lesson more effectively in the future).

In addition to the emotion and engagement measures used, the system can evaluate the impact of other factors such as time of day, when students are engaged and what engages them. The system may determine, for example, that students generally or in a particular class or are 20% more engaged when slide has a photo on it.

To evaluate a lesson or other presentation and to assess whether a portion of the presentation working well or not, the system measures emotion, engagement, participation, and other factors throughout the presentation. In many cases, the main metric is the level of engagement of the participants.

The system can be used to identify negative effects of elements of interactions, e.g., certain topics, instructors, content presented, and so on. The system may identify, for example, that a particular teacher or topic is angering a certain group of people, or that the teacher or topic results in differential engagement among different groups in the class. The system may also identify that some elements (e.g., content, actions, or teaching styles) may prevent one group of participants from learning. System can determine how different groups relate to material. Could also assess contextual factors, such as how students in different part of the room, if there is background noise, motion in a remote participant setting.

The system can have various predetermined criteria with which to grade teachers, lectures, specific content or topics, and other elements. For example, a good response from participants, resulting in a high grading, may be one that shows high engagement and high positive emotion. On the other hand, a poor response may be characterized by detection of negative emotions (e.g., disgust, anger, and contempt), and would result in a low grade for the teacher, content, or other element being assessed. Micro-expression analysis can be used in assigning scores or grades to teachers, content, and other elements.

The analysis provided by the system can be used to measure participation and collaboration in meetings, to show how effort and credit for work completed should be apportioned. For example, the system can be used to monitoring group project participation among students at school, whether done using remote interactions or in-person interactions. In many group projects, only a few of the people in the group do most of the work. Using video conference data or a video-enabled conference room, the system measure who is contributing and participating. The system can determine and provide quantitative data about who did the work and who is contributing. Participation and engagement can be part of the grade for the project, rather than the result alone. The system can assess factors such as speaking time, engagement, emotion expressed, effects on others' emotions (e.g., to assess not just whether a person is speaking but how that speech impacts others) and so on.

In some cases, the emotion and engagement analysis results of the system can quantify which students are paying attention during the lectures. This information can be valuable for a university of other school, and can be used to assign scores for class participation.

The system can be used to measuring effectiveness of different sales pitches and techniques in video conference sales calls. In a similar way that the system can measure teaching effectiveness, the system can also measure and provide feedback about sales pitches and other business interactions. This applies to both remote videoconference interactions as well as an in-office setting where video can be captured. The system can assess the reactions of a client or potential client to determine what techniques are engaging them and having a positive effect. In addition, the system can be used for training purposes, to show a person how their emotions are expressed and perceived by others, as well as the effect on others. For example, the system can measure a salesperson's emotion as well as the client's emotions. In many cases, the emotion and presence that the salesperson brings makes a difference in the interactions, and the system gives tools to measure and provide feedback about it. The feedback can show what went well and what needs to be improved.

In some implementations, the emotion, engagement, and reaction data can be linked to outcomes of interest, which may or may not occur during the communication session. For example, in the business setting, the system can correlate the emotion results to actual sales records, to identify which patterns, styles, and emotion profiles lead to the best results. Similarly, in education, emotion data and other analysis results can be correlated with outcomes such as test scores, work completion, and so on, so the system can determine which techniques and instructional elements not only engage students, but lead to good objective outcomes.

In some implementations, the system can used to measure performance of individuals in a communication session. For example, the system can measuring effectiveness of a manager (or meeting facilitator) regarding how well they facilitate participation and collaboration among groups. The system can assess the qualities of good managers or meeting facilitators that result in collaboration from others. In some cases, the system ties the performance of individuals to outcomes beyond effects on participants during the communication session. For example, the actions of managers or facilitators in meetings, and the emotional responses they produce can be correlated with employee performance, sales, task completion, employee retention, and other measures. The system can then inform individuals which aspects (e.g., topics, meeting durations, meeting sizes or participants per meeting, frequency of meetings, type/range/intensity of presenter emotions, speaking time distributions, etc.) lead to the best outcomes. These can be determined in general or more specifically for a particular company or organization, team, or individual, based on the tracked responses and outcomes.

In some implementations, the system can measure employee performance via participation in group sessions, whether virtual or in-person. The emotion analysis of the system can allow tracking of how emotionally and collaboratively individuals are participating. This can help give feedback to individuals, including in performance reviews.

In each of the examples herein, the system can provide reports and summary information about individuals and a session as a whole, allowing individuals and organizations to improve and learn from each interaction.

Example Network & System Infrastructure

The system can use any of various topologies or arrangements to provide the emotional monitoring and feedback. Examples include (1) performing emotion analysis at the device where the emotion feedback will be displayed (e.g., based on received video streams), (2) performing emotion analysis at a server system, (3) performing emotion analysis at the device that generates video for a participant (e.g., done at the source of video capture, for video being uploaded to a server or other device), or (4) a combination of processing between two or more of the video source, the server, and the video destination. As used herein, "emotion analysis" refers broadly to assessment of basic emotions, detection of complex emotions, detecting micro-expressions indicative of emotions or reactions, scoring engagement (e.g., including collaboration, participation, and so on), and other aspects of a person's cognitive (e.g., mental) or emotional state from face images, facial video, audio (e.g., speech and other utterances), and so on. Indeed, any of the analysis of face images, face video, audio, and other data discussed herein may be performed using any of the different topologies discussed. The system can change which arrangement is used from one session to another, and/or from time to time within a single meeting or session. For example, users may be able to specify one of the different configurations that is preferred. As another example, there can be an option to dynamically distribute the emotion analysis load among the video data sender's device, the server, and the video data recipient's device.

In most remote scenarios, like video conferencing, telehealth, and distance learning, there is generally only one person in the video feed at a time, so only one face to analyze per video stream. In some cases, however, a single video stream may include images of multiple people. In this case, the system can detect, analyze, and track the emotions and reactions of each individual separately based on the different faces in the video stream.

In any of the different arrangements discussed, the system can be used for live analysis during a communication session and post-processing analysis (e.g., based on recorded data after the communication session has ended). Facilitating collaboration in real time is important, and can help signal conditions such as "this person has a question" in the moment, so the presenter or participants can address it before the issue becomes stale. In addition, there may be deeper and better analysis available in post-processing if the video is recorded. In some cases, rather than recording video, data extracted from the video is recorded instead. For example, the system can calculate during the communication session and store, for each participant, data such as: a time series of vectors having scores for emotional or cognitive attributes for the participant over the course of the communication session (e.g., a vector of scores determined at an interval, such as each second, every 5 seconds, every 30 seconds, each minute, etc.); time-stamped data indicating the detected occurrence of gestures, specific facial expressions, micro-expressions, vocal properties, speech recognition results, etc.; extracted features from images or video, such as scores for the facial action coding system; and so on.

As a first example, in some implementations, the emotion analysis takes place at the client device where the analysis results will be displayed. A device receiving video streams showing other participants can perform the analysis to be displayed by the device. For example, a teacher's computer may be provided video information showing different students, and the teacher's computer may locally perform analysis on the incoming video streams of students. This approach generally requires a device with significant computing power, especially as the number of participants (and thus the number of concurrent video streams to process) increases. There are a significant number of operations that a receiver-side analysis system may need to perform, including detecting and locating faces in image data, comparing faces to a face database to determine the participant identity (e.g., name) corresponding to the identified face, and then perform the emotion analysis on the received stream. The receiver-side approach can also be duplicative if multiple recipients are each separately performing analysis on the same sets of feeds.

In addition, the receiving side approach is often dependent on the video conferencing platform to pass along high-quality data for analysis. In some cases, the video conferencing platform may not send the video of all participants, especially if there are many participants. Even if the videoconferencing platform provides many different video feeds showing participants' faces, the broadcast may be in low resolution or may provide only a few faces or video streams at a time. Accordingly, implementing this approach may have features to track and profile individual users and participants, based on face recognition and/or text names or other on-screen identifiers used in the video conference, to accurately track the emotions and reactions of each individual and link the video feeds to the correct participant identities, even if the video feeds are shown intermittently, or in different layouts or placements onscreen at different types.

One advantage of performing emotion analysis at the receiving device or destination endpoint is that it facilitates use in a toolbar, web browser extension, or other third-party add-on software that is platform agnostic. By analyzing received video streams, and even focusing on analyzing video data actually shown on screen, little or no support is required from the video conference platform provider, and the client-side software may be able to operate with video conference data streams and interfaces of many different platform providers. In this cases tracking participant identities becomes particularly important. For example, the video conference platform may not give any advance notice of changes to the on-screen layout of participant video feeds, and the positions of video feeds may switch quickly. The client-side software can be configured to detect this, for example, due to factors such as face recognition, text identifiers, icons other symbols representing users, detecting sudden large changes to background or face characteristics (e.g., indicative of switching one person's video feed for another), etc. Thus, when the screen layout changes, a platform-independent solution can again map out who is represented by which on-screen images or video feeds.

The need for client software to align face images with participant identities is much easier to meet if the software is integrated with or works with data from the videoconference platform provider. The platform has information about which video streams correspond to which participant identities (e.g., as users sign in to use the platform), and the platform can provide this information in a format readable to the client software.

In some implementations, the system varies the frequency of facial analysis when analyzing multiple faces in real-time in order to manage processor utilization, e.g., to limit computational demands to the level of processing power available. Ideally, the system would every face for every frame of video. However, this becomes very processor intensive with many people (e.g., a dozen, a hundred, or more) people on a call, with video streamed at 30 fps. One way to address the potentially high processing demand is to check at a reduced frequency that is determined based on processor load, or factors such as available processing capability, number of participant video streams, etc. For example, the system may vary analysis between analyzing a face in a range from every quarter of a second to every 2 seconds. Of course other ranges may be used in different implementations. In a conference with only 3 people, a higher frequency in the range can be used, and as more participants join the call, the frequency is lowered to maintain reasonable processor load (e.g., to a target level of processor utilization, or to not exceed a certain maximum threshold of processor utilization, device temperature, or other metric). In effect, the system monitors the processing load and available capacity and optimizes the performance, varying the analysis frame rate depending on load, which is often directly correlated to the number of participants. In some cases, a user setting can additionally or alternatively be used to set the frequency of video frame analysis. For example, the system can provide a setting that the user can adjust, and the analysis frequency may or may not also be dependent on the hardware capacity of the machine. The user may specify that they want to conserve battery life, or are experiencing problems or slowdowns, or set a processing target, and the system can adjust the processing accordingly. The user may manually set a processing rate or quality level in some cases.

As a second example, participants may provide their video data streams to a server, such as a cloud computing system, and the emotion analysis can be performed by the server. Performing the analysis at a cloud-computing level can allow better distribution of computing load, especially when powerful computation resources are available at the server. For example, the server system may be a server of a video conferencing platform (e.g., ZOOM, SKYPE, MICROSOFT TEAMS, GOOGLE HANGOUTS MEET, CISCO WEBEX, etc.). The emotion analysis results that the server generates for the various participants' video streams are then aggregated and sent to participants, e.g., as part of or in association with the audio and video data for the video conference. This way, each participant can receive the analysis results for the other participants, with the processing-intensive analysis being done by the server.

In many cases, by the time a server receives a video feed, the video has been encrypted. As a result, the server system may need to have appropriate capabilities to decrypt the video feeds for analysis. Server-based or cloud-computing-based analysis provides the highest processing capability, but often the video is compressed and so may provide slightly lower quality video data and thus lower quality analysis results compared to processing of raw uncompressed video.

As a third example, emotion processing can be performed in a distributed manner, with individual participants' devices performing the emotion analysis for their outgoing video streams. Essentially, this provides a distributed model of processing, where each endpoint processes its own outgoing video feed for emotion, micro-tells, etc., then the results are sent to a central server or to other endpoints for use. For example, a user logs into a conference on a laptop which captures video of his face and provides the video to the video conferencing platform to be sent to other participants. The user's laptop also performs emotion analysis (e.g., face analysis, micro-expression detection, collaboration and engagement assessment, etc.) and other analysis discussed herein and provides the emotion analysis results along with the uploaded video stream. This has the benefit of allowing emotion analysis based on the highest-quality video data (e.g., uncompressed and full-resolution video data). The server system or video conference platform aggregates the emotion processing results from each of the participants and distributes emotion indicators along with the conference video feeds. Thus, each participants device provides the video feed and emotion processing results for its own user, and receives the video feed and emotion processing results for each of the other users.

Performing emotion analysis on each participant device, on the outgoing media stream to be to the server, can provide a number of advantages. For example, being closest to the video capture, the video source device can use the highest quality video data. By the time data is sent to the server, the video has probably been compressed and detail is lost. For example, video may be smoothed which can diminish the accuracy of signals of various facial expressions. In some cases, the frame rate of transmitted video may also be lower than what is available at the source, and the local high-frame-rate video can allow for more accurate detection of micro-expressions. In short, by performing emotion analysis at the device where video is captured, the software can have access to the highest resolution video feed, before downscaling, compression, frame rate reduction, encryption, and other processes remove information. Local, on-device analysis also preserves privacy, and allows emotion analysis results to be provided even if the video feed itself is not provided. This topology can provide the most secure enforcement of user privacy settings, because the user's video can actually be blocked from transmission, while the emotion analysis results can still be provided.

Some emotion analysis processing, such as micro-expression detection, is relatively processor intensive. In general, the amount of computational load depends on the desired level of frequency of analysis and accuracy of results. The system can dynamically adjust the processing parameters to account for the processing limits of participant's devices. For example, an endpoint's processing power may be insufficient for the highest-level of analysis, but the system can tune the analysis process so that the process still works with the available level of processing power, even if the analysis is less accurate or assesses a smaller set of emotions or attributes. For example, instead of analyzing video frames at 30 frames per second (fps), the client software can analyze video data at 10 fps (e.g., using only ever third frame for 30 fps capture). As another example the system could forgo the micro-expression analysis on certain device types (e.g., mobile phones), so that either the micro-expression analysis is performed by the server based on compressed video or is omitted altogether.

With the analysis done in the distributed way (with participants' device performing analysis on their own outgoing media streams), the incremental burden of adding another participant to the video conference is minimal. Each new participant's device can perform some or all of the emotion analysis for its own video feed, and that work does not need to be re-done by the other participants who benefit from the results. Each client device runs analysis only one video stream, its own, which limits the amount of computation needed to be done by the client device. Further, the client device does not need to receive video streams of other participants to receive emotion data for those participants. For example, even if a client device receives video for an individual only intermittently (e.g., only when a person is speaking), the system nevertheless has consistent emotion analysis data streamed for the person by the person's device. The server system or video conference platform used can coordinate and aggregate the emotion data as it processes the video streams uploaded by the various devices.

Another benefit is that by providing the emotion scores or other analysis results instead of full video streams, the amount of data transmitted to each client is lowered. A speaker can get real-time audience feedback based on analysis of an audience of 1000 people that doesn't require 1000 video transmissions to the speaker's computer for analysis.

The techniques of using server-based emotion analysis and/or distributed local emotion analysis system allow efficient processing with large numbers of participants, for example, 10, 100, or 1000 people, or more, each of whom have their emotions, engagement, responses, and so on concurrently monitored by the system in an ongoing manner throughout a communication session. To allow scalability and support large numbers of people, the analysis of users' video and audio can be performed in a distributed manner at the source of the video capture, e.g., at phones or laptop devices of individual participants, or at a computer system for a conference room for analysis of video data captured at the conference room.

Other arrangements can also be used. For example, the system can share emotion processing between client devices and the server. In some cases, the system can vary which portions of the processing are done at the server and at the client devices (e.g., at the source where video is captured and/or at the destination where the video is to be displayed) based on the network characteristics (e.g., bandwidth/throughput, latency, stability, etc.), processing capability, and so on.

The system can analyzing emotional data at the source and transmit that data in lieu of video data in cases where confidentiality or bandwidth prohibit transmission of full video data. This can be done selectively based on processing capacity, bandwidth, etc.

One important feature of the system is the ability to gather engagement and emotional data for people that are not currently visible on a conference call participant's screen. As an example, a class of 100 students may all have their video cameras on. The teacher will only be able to see a few of those faces at a time, but the system can capture the emotion/attention analytics on all 100 students and give that feedback to the teacher, even based on the data for participants that the teacher cannot see she or he can't see. The feedback can be provided for individuals or in aggregate as discussed above.

The system can be used in fully remote interactions, fully local or in-person settings, and for mixed or hybrid settings where there are both local participants in one area and others participating remotely. To capture video feeds of people in a local area, such as a classroom, lecture hall, conference room, etc., cameras can be mounted on walls, ceilings, furniture, etc. to capture individual participants or groups of participants.

The analysis by the system can be shared between participants' devices (e.g., client devices, endpoint devices, or network "edge" devices) and the server system or video conferencing platform that is used. For example, participant's devices may generate certain scores, such as basic emotion scores (e.g., a seven-value vector with a score for each of the 7 basic emotions), while leaving to the server more computationally intensive processes such as micro-expression detection and the analysis of whether sequences of the emotion score vectors and other data represent different conditions, such as complex emotions or reactions, or triggers for action or recommendations by the system. In some cases, the emotion scores and other analysis results may be aggregated by the server system and passed to a destination device, and the destination device can perform further processing or create further scores based on the scores received.

The emotion analysis can be used even when participants' devices do not transmit video to a central server. For example, during a web meeting or other online event, a presentation may be displayed and video of participants may not be shown or even provided to the server system. Nevertheless, participants' devices can capture video of their users and perform local emotion analysis and send the analysis results to a server system, e.g., a central hub facilitating the meeting. In this case, privacy is enhanced because a user's video is never transmitted to any other device, and bandwidth is reduced because the captured video does not need to be uploaded to a server or to other participant devices. Even so, the emotion data can be tracked and provided because each participant's device can generate and provide the analysis results to a server, which in turn distributes the aggregated analysis results for presentation at the one or more devices involved in the communication session.

An example is use of the system in a lecture by a professor, for example, either in an online, e-learning university setting, or in an auditorium, or a combination of both. While the professor is teaching, the system can provide sends just the engagement scores to the professor's device (e.g., aggregated or averaged scores and/or scores for individual participants) to give the teacher a read of the audience. The system can preserve privacy and not transmit or store video from participant devices. The video can be captured at the client and used to determine the engagement score, but may not be transmitted to the server. The professor may want to know how people are responding to the material, and can receive the emotion, engagement, and reaction data that the server provides. Even though the video of participants may not be transmitted to or displayed at the professor's computer, the analysis can still be performed at the individual devices of participants or by the server. The analysis results can show how the participants are responding to the lecture, e.g., overall engagement level, average levels of emotion across the participants, distribution of participants in different classifications or categories (e.g., classifications for high engagement, moderate engagement, and low engagement), how engagement and emotion levels compare to prior lectures involving the same or different people, etc.

In some implementations, the system is configured to perform analysis of emotion, engagement, reactions, and so on of recordings of interactions, e.g., video files of one or more devices involved in a communication session. The system can analyze the video data after the fact, e.g., in an "offline" or delayed manner, and provide reports about the engagement levels, emotion levels, and so on.

The system can be configured to save analysis results and provide reports for monitored communication sessions and/ or for analysis of recorded sessions. For example, the system can provide information about patterns detected, such as when the speech of a particular person tended to increase or decrease a particular score (e.g. for a particular emotion, collaboration, engagement, etc.). The system can also provide information about conditions detected over the course of the recorded interaction, such as participant Dave being confused at position 23:12 (e.g., 23 minutes, 12 seconds) into the interaction, and participant Sue appearing to be bored from 32:22 to 35:54. Many other statistics and charts can be provided, such as a speaking time metrics for individuals or groups, a histogram of speaking time, a chart or graph of speaking time among different participants over time, average emotion or engagement metrics for individuals or groups, charts with distributions of different emotions or emotion combinations, graphs showing the progression or change of emotions, engagement, or other measures over time (for individuals and/or for the combined set of participants), and so on.

Any and all of the different system architectures discussed herein can include features to enforce privacy and user control of the operation of the system. The end user can be provided an override control or setting to turn emotion analysis off. For privacy and control by the user, there may be a user interface control or setting so the participant can turn off emotion analysis, even if processing is being done at a different device (e.g., a server or a remote recipient device).

For example, any data gathering or analysis that the system performs may be disabled or turned off by the user. For example, the system can give the option for a user to authorize different options for processing the user's face or video data, e.g., authorizing none, one, or more than one of transmission, recording, and analysis of the data. For example, users may select from options for video data to be: (i) transmitted, recorded, and analyzed; (ii) transmitted and analyzed, but not recorded; (iii) transmitted and recorded, but not analyzed; (iv) analyzed but not transmitted or recorded; and so on. In some cases, a person running a communication session (e.g., a teacher, employer, etc.) may have to ask participants to turn on or enable emotion analysis when desired, but preserving control and privacy of users is an important step.

In some implementations, facial recognition and emotional analytics are combined to create a coherent analytics record for a particular participant when their image appears intermittently. When there is a large number of participants in a conference, not all are shown at the same time. For example, some people may be shown only when they are speaking, or only up to a maximum number are shown at a time. When video feeds disappear from view and then reappear (whether in thumbnail view or a larger view), the system can match the video feed to an identity to ensure that the system does not treat the video feed as showing a new person. The system can recognized the participant's face in the video stream to determine that it shows the same person as before, allowing the system to continue the scoring and record for that person during the session. The system can also use speech recognition to identify or verify when a person is speaking. As a result, the system can maintain a continuous log of a participant's interactions and emotion. With this data, the system can get each individual's speaking time analytics, and get a collaboration score spanning interactions over the total length of the call. Voice analysis can be used whether a participant joins using video or using audio only.

In some implementations, the system can learn the correspondence of people and their video feeds dynamically, without advance information or predetermined face/identity mappings. For example, a system may generate identities for each video feed for each communication session, even if the system does not recognize user login information or names. The system can create a database of voices and faces as information is gathered during one or more sessions. In some cases, the system can provide a control for a user to enter a name, select a name from a drop down, confirm a name, and so on. The options provided for a user to select can be from the set of people the user has had calls with before. As another example, the system can link to calendar data to identify participants to a call.

In the case where the system is integrated with the video conferencing platform, the system can use data acquired from many meetings involving a participant, even meeting involving different individuals or companies. As a result, the system can develop norms/baselines for individuals, to personalize the system's analysis and customize the behavior of the system and improve accuracy. The system can look for and identify details about a person's reactions, behaviors, expressions, and so on and adjust over time. The results can be stored as a personalization profile for each user, to use the history of interactions for a user to do better analysis for that person.

Example Processing Techniques

As discussed above, emotion analysis can include recognizing the emotions of a person, for example, by looking at the face of the person. Basic emotions can often be derived from a single image of a person, e.g., a single frame, and can indicate whether a person is happy, sad, angry and so on. The system can produce a vector having a score for each of various different emotions. For example, for the seven basic emotions, each can be scored on a scale of 0 to 100 where 100 is the most intense, resulting in a vector with a score of 20 for happiness, 40 for disgust, 15 for anger, and so on. This emotion vector can be determined for each video frame or less frequently as needed to balance processor loading.

Various different techniques can be used to detect emotional or cognitive attributes of an individual from image or video information. In some cases, reference data indicating facial features or characteristics that are indicative of or representative of certain emotions or other attributes are determined and stored for later use. Then, as image or video data comes in for a participant during a communication session, facial images can be compared with the reference data to determine how well the facial expression matches the various reference patterns. In some cases, feature values or characteristics of a facial expression are derived first (such as using scores for the facial action coding system or another framework), and the set of scores determined for a given face image or video snippet is compared with reference score sets for different emotions, engagement levels, attention levels, and so on. The scores for an attribute can be based at least in part on how well the scores for a participant's face image match the reference scores for different characteristics.

As another example, machine learning models can be trained to process feature values for facial characteristics or even raw image data for a face image. To train a machine learning model, the system may acquire various different example images showing different individuals and different emotional or cognitive states. For example, the system can use many examples from video conferences or other interactions to obtain examples of happiness, sadness, high engagement, low engagement, and so on. These can provide a variety of examples of combinations of emotional or cognitive attributes. The examples can then be labeled with scores indicative of the attributes present at the time the face image was captured. For example, a human rater may view the images (and/or video from which they are extracted) to assign scores for different attributes. As another example, a system may ask individuals shown in the images to rate their own emotional or cognitive attributes, potentially even asking them from time to time during video conferences to answer how they are feeling.

With labeled training data, the system can perform supervised learning to train a machine learning model to predict or infer one or more emotional or cognitive attributes based on input data that may include a face image or data that is based on a face image (e.g., feature values derived from an image). The machine learning model may be a neural network, a classifier, a clustering model, a decision tree, a support vector machine, a regression model, or any other appropriate type of machine learning model. Optionally, the model may be trained to use other types of input in addition to or instead of these. Examples of other inputs include voice or speech characteristics, eye position, head position, amount of speaking time in the session, indications of other actions in the communication session (such as the participant submitting a text message or comment in the communication session), and so on.

Machine learning models can be used to perform classification, such as to determine whether a characteristic is present or absent and with what likelihood or confidence, or to determine if a participant has attributes to place them in a certain group or category. As another example, machine learning models can be used to perform regression, such as to provide a numerical score or measure for the intensity, degree, or level of an attribute.

In performing this analysis, video data may be used, e.g., by providing a sequence of image frames or feature values for a sequence of image frames. For example, a machine learning model may receive a series of five image frames to better predict emotional or cognitive states with greater accuracy. As another example, a machine learning model may include a memory or accumulation feature to take into account the progression or changes over time through a series of different input data sets. One way this can be done is with a recurrent neural network, such as one including long short-term memory (LSTM) blocks, which can recognize sequences and patterns in the incoming data and is not limited to inferences based on a single image.

The analysis may be done at any of the devices in the system, as discussed above. For example, the reference data, software code, and trained machine learning models to perform the analysis may be provided to an may be used at a server system or a participant's device. The data, software, and models can be used to generate participant scores at the device where a video stream originates (e.g., the device where the video is captured), at an intermediate device (such as a server system), or at the destination device where a video stream is received or presented (e.g., at a recipient device that receives the video stream over a network from a server system).

As discussed above, the system can be used to detect and identify micro-expressions or micro-tells that indicate a person's reaction or feeling at a certain time. Often these micro-expressions involve a type of action by a participant, such as a facial movement that may last only a fraction of a second. Typically, micro-expressions refer to specific events in the course of a communication session rather than the general state of the person. Micro-expressions can be, but are not required to be, reactions to content of a communication session that the person is participating in.

The system can incorporate micro-expression analysis and use it alongside emotion detection to enhance accuracy. Micro-expressions are much harder for people to fake than simple facial expressions, and the micro-expressions can convey more complex emotions than a single face image. To detect micro expressions, the system can analyze video snippets, e.g., sequences of frames in order to show the progression of face movements and other user movements. This can be done by examining different analysis windows of a video stream, e.g., every half second of a video or each sequence of 15 frames when captured at 30 frames per second. Depending on the implementation, overlapping analysis windows can be used to avoid the analysis window boundaries obscuring an expression, e.g., examining frames 1-10, then examining frames 5-15, then examining frames 15-20, and so on. The system can store profiles or reference data specifying the types of changes that represent different micro-expressions, so that the changes occurring over the frames in each analysis window can be compared to the reference data to see if the characteristics features of the micro-expression are represented in the frames for the analysis window. In some implementations, the system uses a machine learning model, such as an artificial neural network to process video frames (and/or features derived from the frames, such as the measures of differences between successive frames) and classify the sequence as to whether one or more particular micro-expressions are represented in the video frame sequence.

In some implementations, the system uses voice analysis, e.g., loudness, pitch, intonation, speaking speed, prosody, and variation in a person's speaking style to determine emotions and other characteristics, e.g., engagement, interest, etc. In some implementations, the system can detect eye gaze, head position, body position, and other features to better detect emotion, engagement and the other items assessed.

The system can use various machine learning techniques in its processing. For example, trained neural networks can be used in the emotion recognition and micro-expression detection processing. The different use cases herein may additionally have their own machine learning models trained for the particular needs and context of the application. For example, measuring engagement in a university setting is different from measuring employee performance in a business setting, and so different models can be trained to generate the outputs for each of these applications. Types of outputs provided, the types of conditions detected, the types of inputs processed by the models, and more can be different for different use cases.

In general, machine learning is useful whenever there is a need to distinguish data patterns and there are examples to learn from. One particular use is detecting micro-expressions. The system can use a machine learning model that does a kind of time series analysis. For example, a feedforward neural network can be given a quantity of frames (e.g., 15 sequential frames, or 30 frames) to be assessed together, e.g., with the frames and/or feature values derived from the frames stacked into a single input vector. Another approach is to use a recurrent neural network in which the model can be given an incremental series of inputs, for example, with frame data and/or feature values provided frame by frame. The recurrent neural network can process the incoming stream of data and signal once a certain sequence or pattern indicative of a particular micro-expression occurs. For example, whether using a feedforward network or a recurrent network, the model can provide output values that each indicate a likelihood or confidence score for the likelihood of occurrence of a corresponding micro-expression. More generally, models can be configured to detect complex characteristics, slopes, gradients, first-order differences, second-order differences, patterns over time, etc. that correspond to micro-expressions or other features to detect.

In some implementations, the system cross-references emotion data derived from video with voice stress analysis to enhance accuracy. This technique is useful to assess attributes of people who are speaking. If the system detects stress in a speaker's voice, the system gives a way for the user or other participants to respond. Sensing anger and other voice characteristics gives the system a way to respond to help others to facilitate. Voice stress analysis can confirm or corroborate attributes determined from video analysis, as well as to help determine the appropriate level or intensity. For example, video can indicate that face shows disgust, and the tone can indicate that the participant is stressed, which together shows that the current condition or state of the participant is particularly bad. This analysis may be used in or added to any of the scenarios discussed. As an example, voice stress analysis can be particularly useful to determine the state of medical patients and/or medical caregivers (e.g., nurses, doctors, etc.).

The system can look at changes in a person's voice over time. One of the thing that's powerful about micro expressions is consistency across ages and nationalities and gender. There are some commonalities in voice, but there may also be user-specific or location-specific or context-specific nuances. Many other factors like voice do have personal norms, language, regional and other effects. The system can store profile set or database of participant information, which characterizes the typical aspects of an individual's voice, face, expressions, mannerisms, and so on. The system can then recognize that the same person appears again, using the name, reference face data, or the profile itself, and then use the profile to better assess the person's attributes.

Additional Example Applications

In some implementations, the system can be used to monitoring interview to detect lying and gauge sincerity. For example, in a job interview, the system can evaluate a job candidate and score whether are the candidate is telling the truth. The system can give feedback in real time or near real time. In some cases, the system can assess overall demeanor and cultural fit. Typically, this process will use micro-expression detection data. Certain micro expressions, alone or in combination can signal deception, and this can be signaled to the interviewer's device when detected.

The system can be used to coaching public speakers. In many cases, much of a speaker's effectiveness is emotionally driven rather than content driven.

The system can be used to measuring mental health of medical or psychiatric patients. For example a video camera can be used to monitor a patient, either when the patient is alone or during an interaction with medical staff. In some cases, the system may be able to tell better than a human how patients are doing, e.g., whether person is in pain, is a suicide risk, is ready to go home, etc. The system also provides a more objective and standardized measure for assessment, that is more directly comparable across different patients, and for the same patient from one time to another. There is especially value in understanding the emotional state of the medical and psychiatric patients. In some cases, it can be beneficial to monitor the emotional state of the medical personnel as well, to determine if they are stressed or need assistance. The system can provide a tool that a medical worker or social worker could use to aid in detecting the needs and disposition of client.

In some implementations, the system can analyze and record only facial data, not video streams for confidentiality purposes. The system can process video to determine emotions/microtells, but not record the video. The system sees video and analyzes it but only analyzes it and provides the analysis results. This approach may allow monitoring in situations or locations where video data should not be recorded, such as to detect or prevent crimes in restrooms or other private places. The system may indicate that there are frightened or angry people in an area, without needing to reveal or transmit any of the video data.

The system can be used to measuring the effectiveness of call center workers. The system can be used to assess the emotional state of both the caller and the call center worker.

The system can be used to measuring effectiveness of social workers and other caregivers. This can include medical workers—doctors, nurses, etc. Often, they are working with people in stressful situations. This can use a different neural network, with different training data, looking for different types of people or different attributes of people than in other scenarios.

In another example, the system can be used to evaluate prison inmates, measuring their propensity to become violent. In the same manner, the system may be used to monitor and assess prison guards.

In some implementations, the system can be provided as a software application, potentially as a tool independent of the video conference platform being used. The system can enhance videoconferences through neuroscience, emotion detection, micro-expression detection, and other techniques. In some implementations, the application is not be tied to any one videoconference platform, but rather can function as a transparent "pane" that a user can drag over the platform of their choice, and the application can analyze the conversation. The application's insight can focus in two key areas, among others: emotion analysis and participant speaking time management. The software may first locate the faces that are under its window area and proceed to analyze these faces as the conference takes place. The system may provide real-time indicators of the collaboration level, and potentially emotions, of each participant. A user, e.g., a participant in the videoconference, can be able to use this information to effectively moderate the discussion and can be motivated themselves to be a better participant to keep their own collaboration score high. Of course implementation as a client-side application is only one of many potential implementations, and the features and outputs discussed herein can be provided by a server-side implementation, integration with a videoconferencing platform, etc.

In some implementations, upon opening the application, a main resizable pane can appear. The pane can have a minimalistic border and a transparent interior. When resizing the pane, the interior can become translucent so that the user can clearly see the coverage area. As soon as the user is done resizing the pane, the interior can return to being transparent. The application can detect all faces in the application window, e.g., the active speaker as well as thumbnail videos of other participants that are not speaking. The application can process these video streams and perform analysis on the speakers in those video streams, as output for display on the video conference user interface.

The application can start monitoring collaboration by dragging the application window over any region of the screen with faces in it. Data gathering, metrics generation, and data presentation can be designed to function as an overlay to any or all major videoconference systems, e.g., Zoom, Skype for Business, WebEx, GoToMeeting.

The system can track speaking time and provide the user access to a running total of every participant's speaking and listening time. Clock information can be displayed optionally. The speaking clock may visually, or potentially audibly, alert a participant when the participant has been talking more than m/n minutes, where n is the number of participants, and m is the current conference time, thus showing that they are using more than their fair share of time. No alerts can be given until 10 minutes have elapsed since the beginning of monitoring. Speaking and listening time can be tracked in the application. A visualization of each participant's time can be displayed optionally along-side their collaboration indicator.

The system can show collaboration score, or some indicator of the collaboration score, for each participant being analyzed. The collaboration score can be a statistical function of emotion data and speaking time over a rolling time interval. Emotion data can be retrieved from an emotion recognition SDK. Happy and engaged emotions can contribute to a positive collaboration score, while angry or bored emotions can contribute to a low collaboration score. A speaking-to-listening-time ratio that is too high or too low relative to a predetermined threshold or range can detract from the collaboration score, but a ratio inside the predetermined range can contribute to a favorable score. The system can show a color-coded circular light showing up near each participant's video can indicate the participant's score. For example green can be used for a high collaboration score with a scale of grading down to red for low scores. For example, to quickly communicate the collaborative state of each participant, the application can display a small light to indicate that users collaborative state. A green indicator light can represent a good collaboration score, while a red light can indicate a low score.

Visual indicators can be in a consistent relative position to the face of a participant, or at least the video stream or thumbnail they are associated with. Faces may move as the active speaker changes. Faces may be resized or moved by the underlying videoconferencing software, and the application may track this movement to maintain an ongoing record for each participant. For example, next to each participant's video image the application can place the user's collaboration indicator. These indicators can be close enough to make it clear that they are associated with that user without obstructing any parts of the underlying video conference application. These indicators can also need to follow the conference participant they are attached to if the video thumbnail moves. For example, if the active speaker changes, the underlying videoconference software may change the positions of the participants' thumbnail videos. Green Light can need to recognize the change in the underlying application and move the collaboration indicator to follow the image of the correct participant.

The system can track information of participants even if they are not visible at the current time. Participants may speak early in a video conference and then not speak for a significant number of minutes, in which time the underlying video conferencing software may cease showing their thumbnail video. Collaboration scores for participants need to continue being tracked even when their videos are not available. Emotional data may not be available at times when video is not available, but collaboration data can still be inferred from the participant's lack of contribution, by interpolating for the gaps using the video and analysis for periods before and after, etc. Should the hidden participant reappear later, their speaking time and collaboration score can take their previous silence into account. The system can provide the option to show speaking times even for participants whose video thumbnail is not currently visible. One solution is to capture a sample image of each participant at a time when they are visible, and associate speaking time with those sample images when the participant is not visible. Another option is to show a chart, e.g., bar chart, pie chart, etc., showing speaking times for different participants. The system can provide an optional display of speaking time for each participant. One example is a pie chart indicating the ratio of speaking/listening time for each participant. This can be an optional visual that can be turned off. The pie chart follows video as the thumbnails move when the active speaker changes.

Indicators can be positioned and adjusted so that they do not obscure the faces, or even the entire videos, of participants. The indicators should not cover any faces, and indicators may be provided to not dominate or overwhelm the display to dominate or distract from the faces. The system can provide functionality to save and persist call data. The interface can provide functionality to start and stop the analysis, as well as potentially to adjust which indicators are provided. E.g., the system can be customized so a user can adjust how many indicators to show, which metrics to show, the form of the indicators (e.g., numerical value, color-coded indicator, icon, bar chart, pie chart, etc.).

In the case of a client-side-only implementations, the application may not generate any network activity beyond what is used by the video conference platform. The application's resource requirements (CPU, memory), can be tailored to not unnecessarily burden the machine or otherwise detract from the user's experience on a video call.

The application can enhance collaboration by creating a more engaging and productive video conferencing environment. The design can be responsive to changes in the underlying video conference application such as resizing or changing of display modes.

FIGS. 9A-9D illustrate examples of user interfaces for video conferencing and associated indicators. These show examples of ways that indicators of emotion, engagement, participation, behavior, speaking time, and other items can be presented during a video conference. These kinds of indicators and user interfaces can also be provided to a teacher, a presenter in a web-based seminar, or other individual. The indicators of the various user interfaces of FIGS. 9A-9D may optionally be combined in any combination or sub-combination.

Figure 9A:
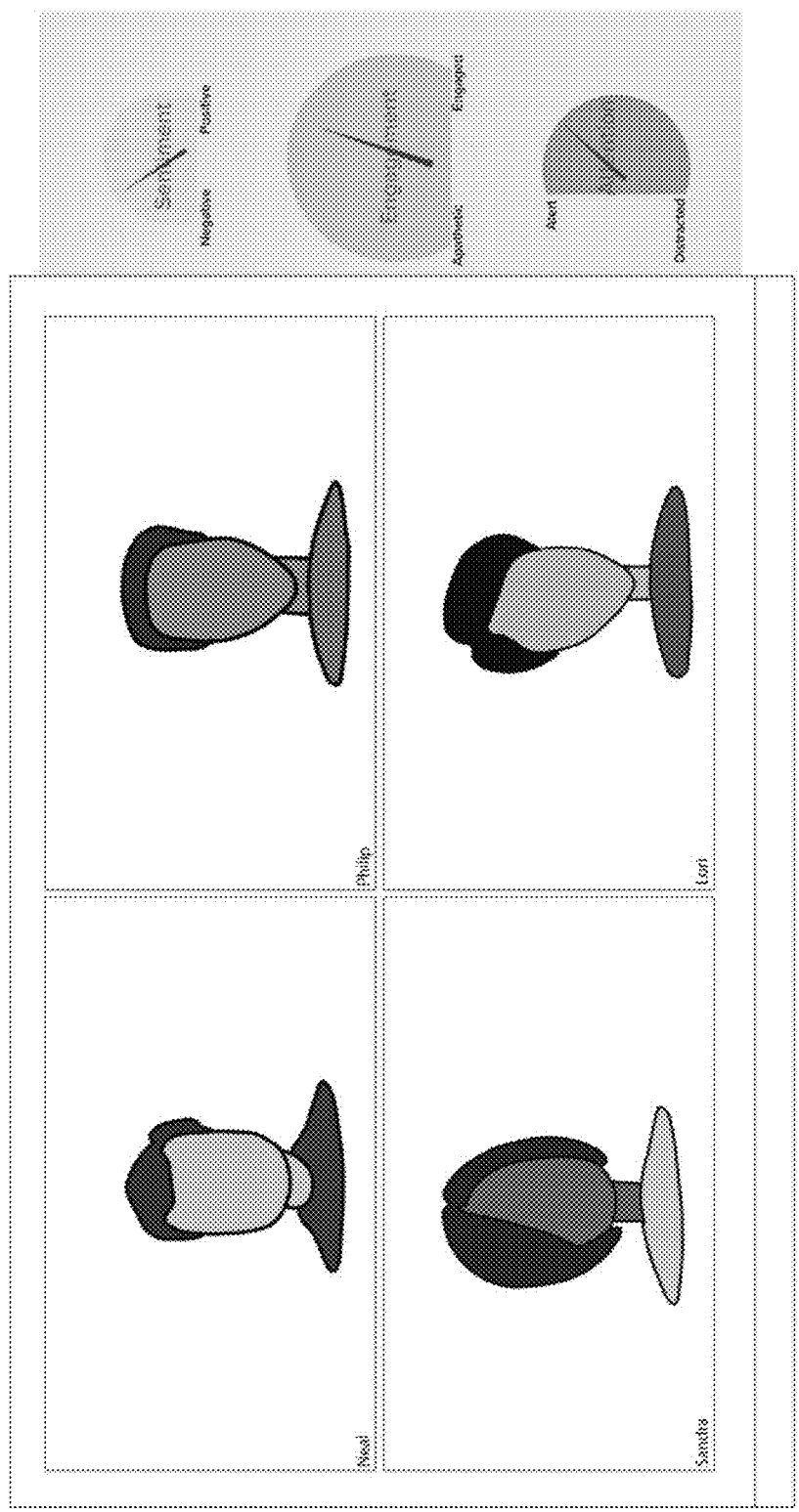
FIGS. 9A-9D illustrate examples of user interfaces for video conferencing and associated indicators.

FIG. 9A shows a basic dashboard view that gives easily readable, real-time feedback to a user about the audience. This can be useful for a presenter, such as a lecturer, a teacher, a presenter at a sales meeting, etc. It can also be useful in group collaboration sessions, e.g., video conferences, meetings, calls, etc. The dashboard gauges show summary metrics in aggregate for all participants, providing quick visual indication of items such as the group's general emotional orientation, their engagement, their sentiment, their alertness, and so on. Participants whose video and/or names are not shown on the screen are still accounted for in the metrics. Metrics may be calculated based on averages, percentiles, or other methodologies. For advanced users, it is possible to place a second shadow needle in each dial, representing a different metric, e.g. the two needles could represent 25th and 75th percentiles of the group.

Figure 9B:
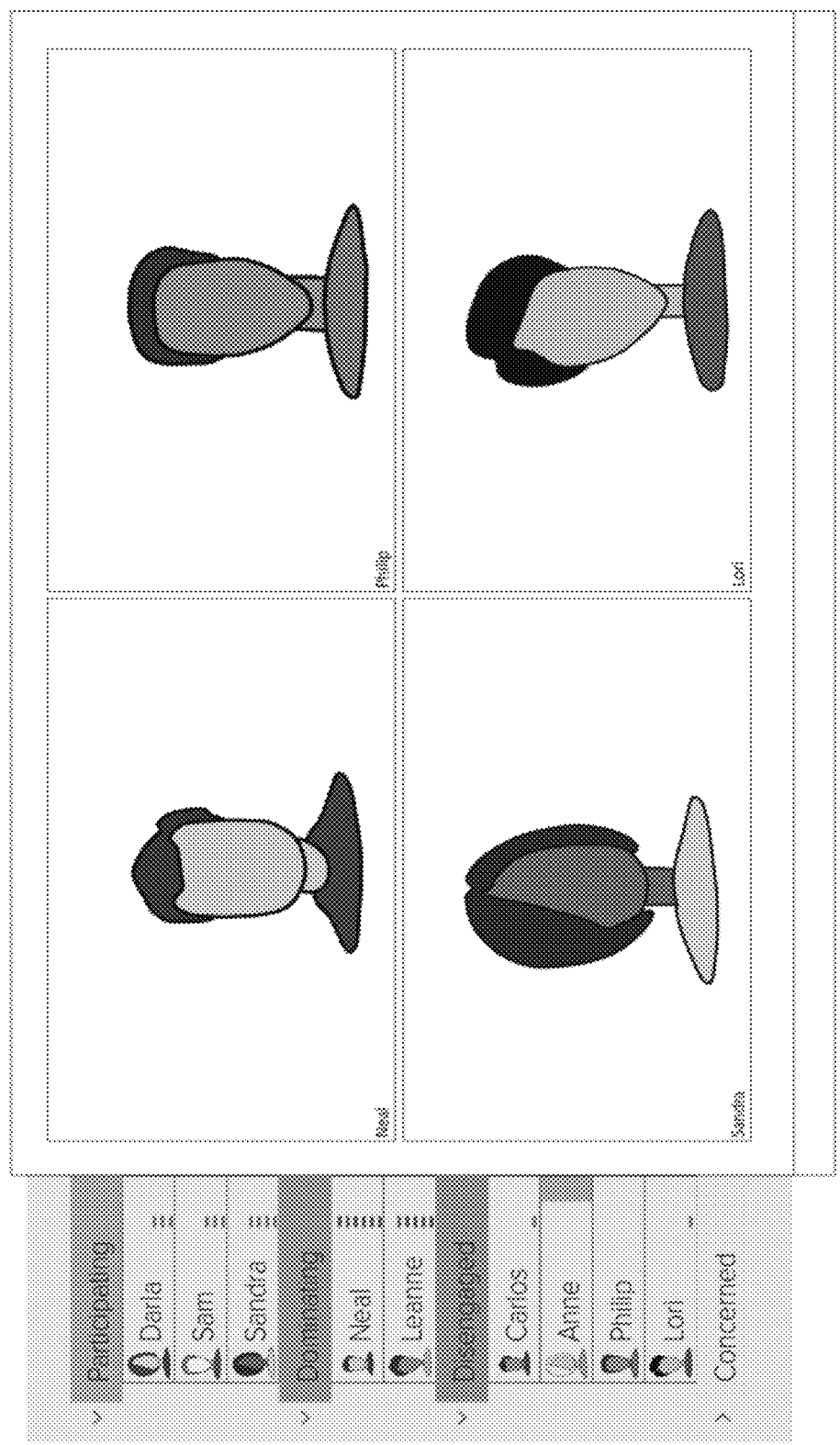

FIG. 9B shows an outline detail view that groups participants into groups or clusters based on the analysis results determined by the system, e.g., emotion, engagement, attention, participation, speaking time, and/or other factors. In this example, the interface provides a collapsible outline showing all participants, grouped by overall level of participation in meeting. Alternate groupings could also be created for other metrics, e.g., speaking time, attention, sentiment level, etc., or combinations of multiple metrics.

Besides the groupings or group assignments for individuals, additional information can be optionally displayed, such as a "volume bar" (e.g., a bar-chart-like indicator that varies over the course of the session) to indicate how much speaking time a participant has used. Optional color indicators can flash by each name if that person should be addressed in the meeting in some way at a particular moment. For example, one color or a message can be shown to indicate that a person has a question, another color or message can show that a person is angry, another if a person is confused, etc. This layout lends itself to being able to display many different kinds of information. However, with more information it may be more difficult for the user to take in the information quickly. The groupings and information pane shown in FIG. 9B can easily be combined with other views. For example, the basic dashboard view of FIG. 9A and the outline view of FIG. 9B may be could be shown simultaneously, together in a single user interface.

Figure 9C:
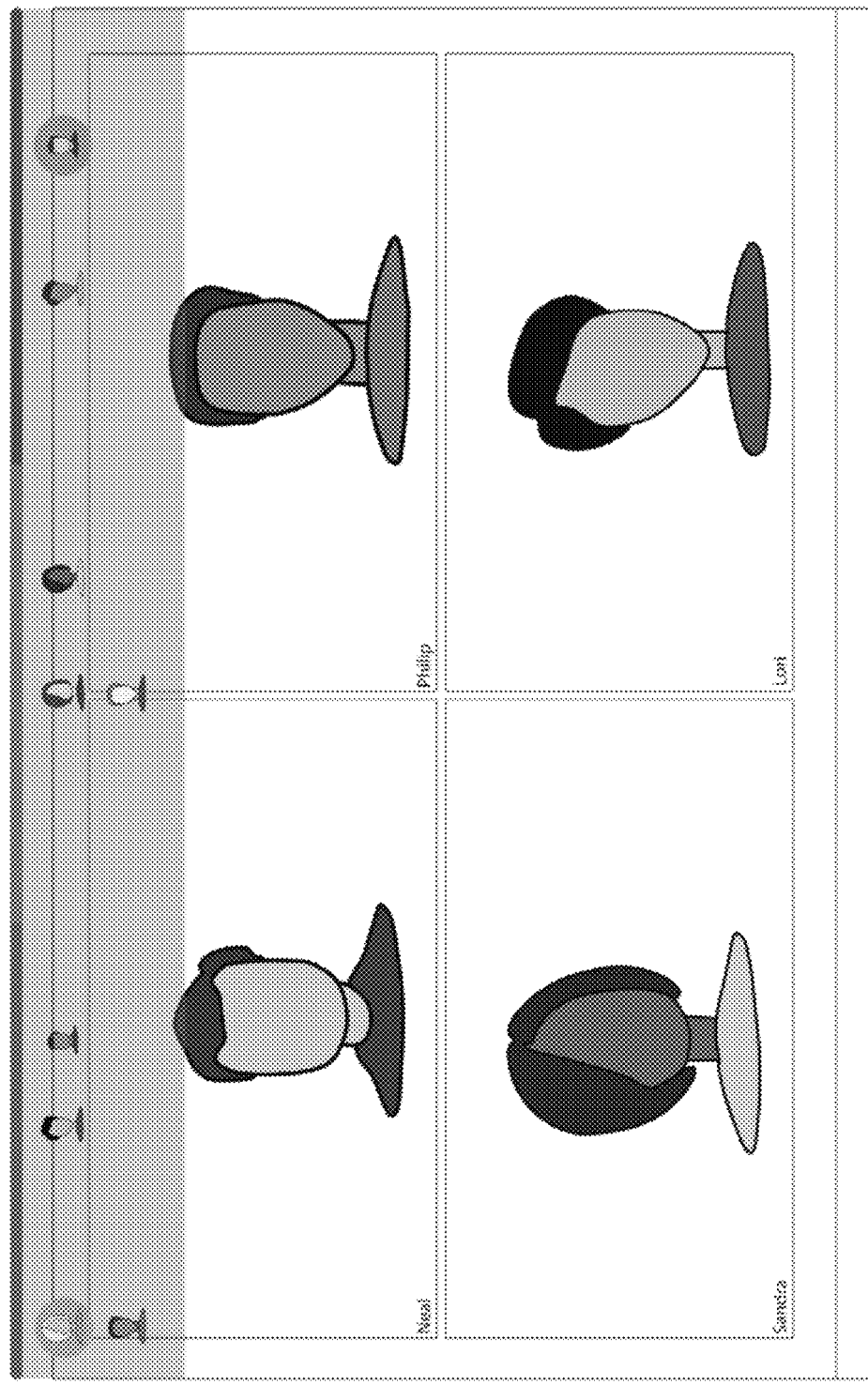

FIG. 9C shows a timeline theme view that arranges indicators of different participants (in this case face images or icons) according to their speaking time. This view, focused on speaking time, shows the relative amounts of time that each participant has used. The video shows faces or icons ordered along a scale from low speaking time to high speaking time, from right to left. On the left, there is a group of individuals that have spoken very little. Then, moving progressively to the right, there are icons representing users that have spoken more and more. In this case, there are three clusters, one on the left that have spoken very little, a middle cluster that have spoken a moderate amount, and a third group on the right that have spoken the most—potentially more than their allotted share.

The timeline at the top could be minimized, hiding the drop-down gray region and only showing summary information. Other information can be provided. For example, by flashing colored circles over the contact photos of people who need to be addressed, the viewer can also receive hints about how best to facilitate the conversation. The length of the timeline and the coloration of the regions can be dynamic throughout the meeting so that early on in the meeting, no one is shown as too dominant or too disengaged at a point in the meeting when there has only been time for 1-2 speakers.

Figure 9D:
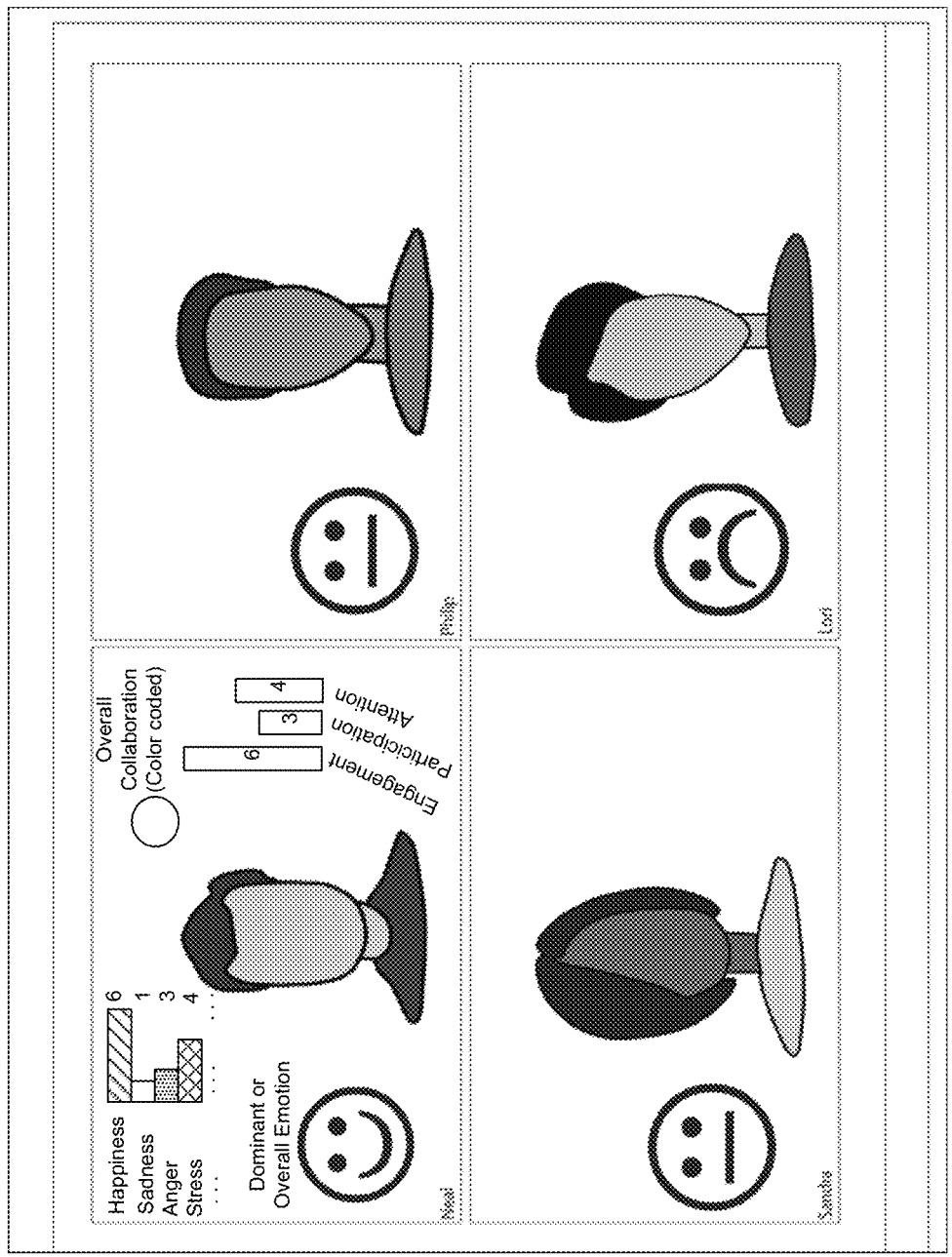

FIG. 9D shows various examples of indicators that may be provided on or near a participant's face image, name, or other representation. For example, indicators of emotions (e.g., happiness, sadness, anger, etc.), mood, more complex feelings (e.g., stress, boredom, excitement, confusion, etc.), engagement, collaboration, participation, attention, and so on may be displayed. The indicators may take any of various forms, such as icons, symbols, numerical values, text descriptions or keywords, charts, graphs, histograms, color-coded elements, outlines or borders, and more.

FIGS. 10A-10D illustrate examples of user interface elements showing heat maps or plots of emotion, engagement, sentiment, or other attributes. These summary plots are useful for getting an "at a glance" summary of the sentiment and engagement level of a large audience and has the added advantage of being able to identify subgroups within the audience. For example, a presenter may be talking to a group of dozens, hundreds, or thousands of people or more. Each individual's position on the engagement/sentiment chart can be plotted to show where the audience is emotionally at the current time. As the presentation continues, the system continues to monitor engagement and sentiment and adjusts the plots dynamically, in real-time. The plot will respond in real-time so that presenters can respond to shifts and splits in the collective response of the audience. This data will be most useful in large group settings such as classrooms or large scale webinars. The size and density of a region indicates a large number of audience members experiencing that combination of sentiment and engagement. Higher engagement is shown in more vivid colors, while apathy is expressed through more muted colors.

Figures 10A, 10B, 10C:
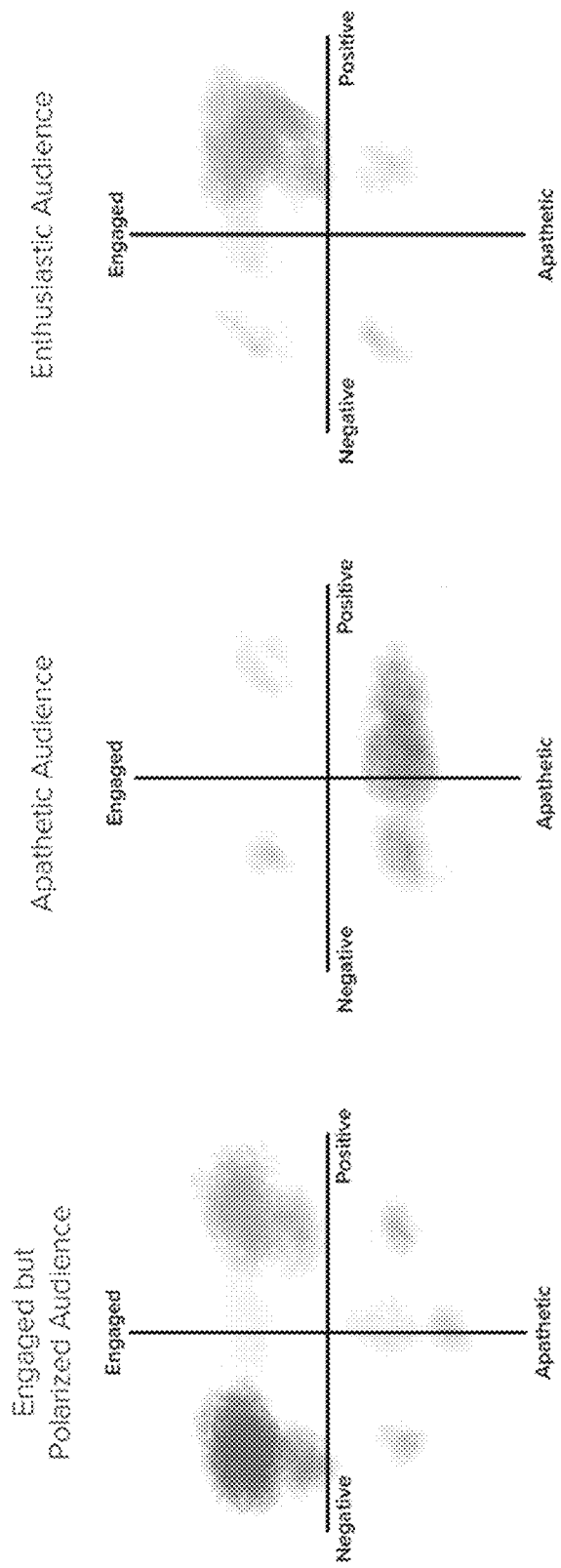
FIGS. 10A-10D illustrate examples of user interface elements showing heat maps or plots of emotion, engagement, sentiment, or other attributes.
Figure 10D:
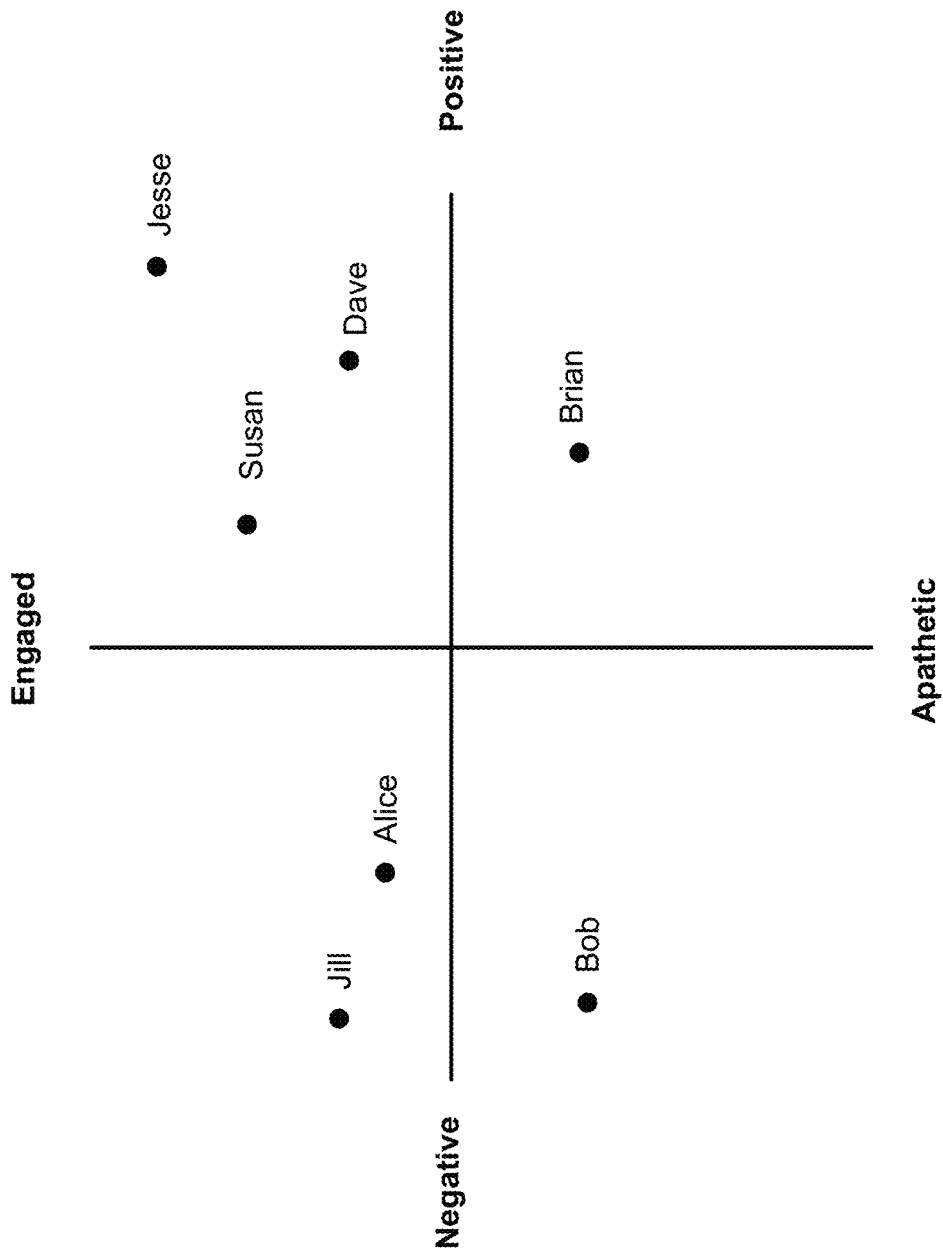

FIG. 10D shows that the same type of plot can also be used in smaller groups, such as a classroom or business meeting, and the names of individual participants can be labeled to show where individuals are in the chart.

Figure 11B:
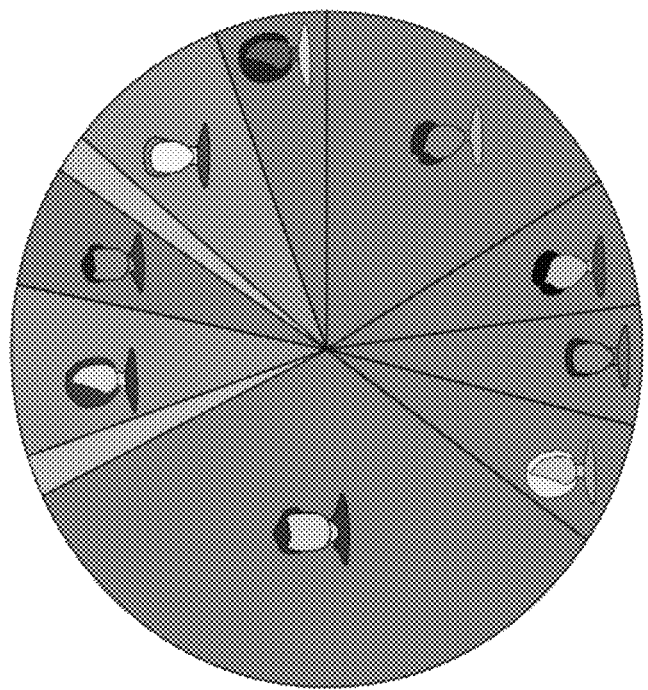
FIGS. 11A-11B illustrate examples of user interface elements showing charts of speaking time.
Figure 11A:
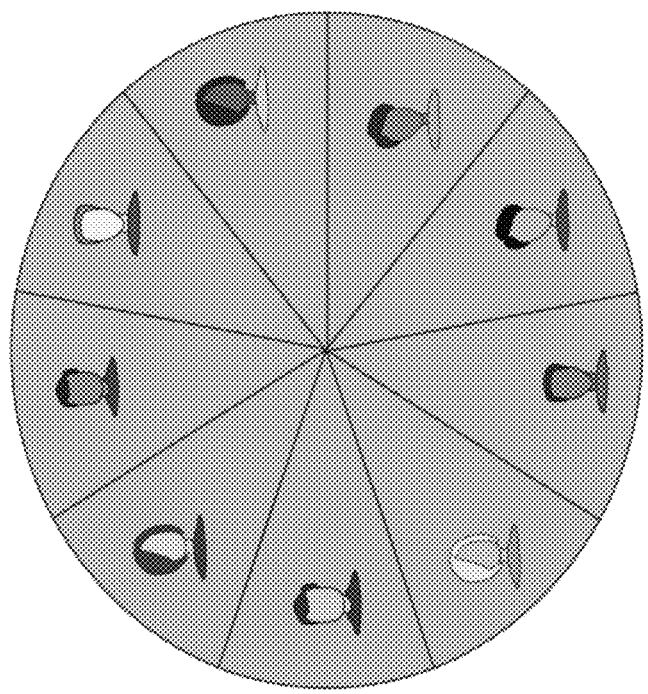

FIGS. 11A-11B illustrate examples of user interface elements showing charts of speaking time. These charts can be provided during a meeting and can be updated as the meeting progresses. At the beginning of the meeting, all participants have an expected or allotted speaking time. The view in FIG. 11A shows that speaking time is allotted equally to start for this meeting. Any time a speaker start going over their allotted time, their slice of the pie grows. Other members are visibly shows as being "squeezed out." After the meeting has progressed (e.g., 30 minutes later), the view in FIG. 11B shows that two people have dominated the conversation. The names of the people may be provided in the pie chart in addition to or instead of face images or icons. This speaking time graphic gives a clear visual of who may be dominating and who is not participating. In this example, all meeting attendees are given equal time, but they system could be altered to give varying amounts of time to each speaker as their allotted values. If members have not spoken at all during the meeting, their "slices" turn a certain color, e.g. purple, indicating that they have not used any of their allotted time. Attendees who have used part of their allotted time, but have time remaining may have this shown in the interface, such as with slices that are partly green and partly gray, indicating that the green portion of their allotted time that has been used and the gray remains.

Figure 12A:
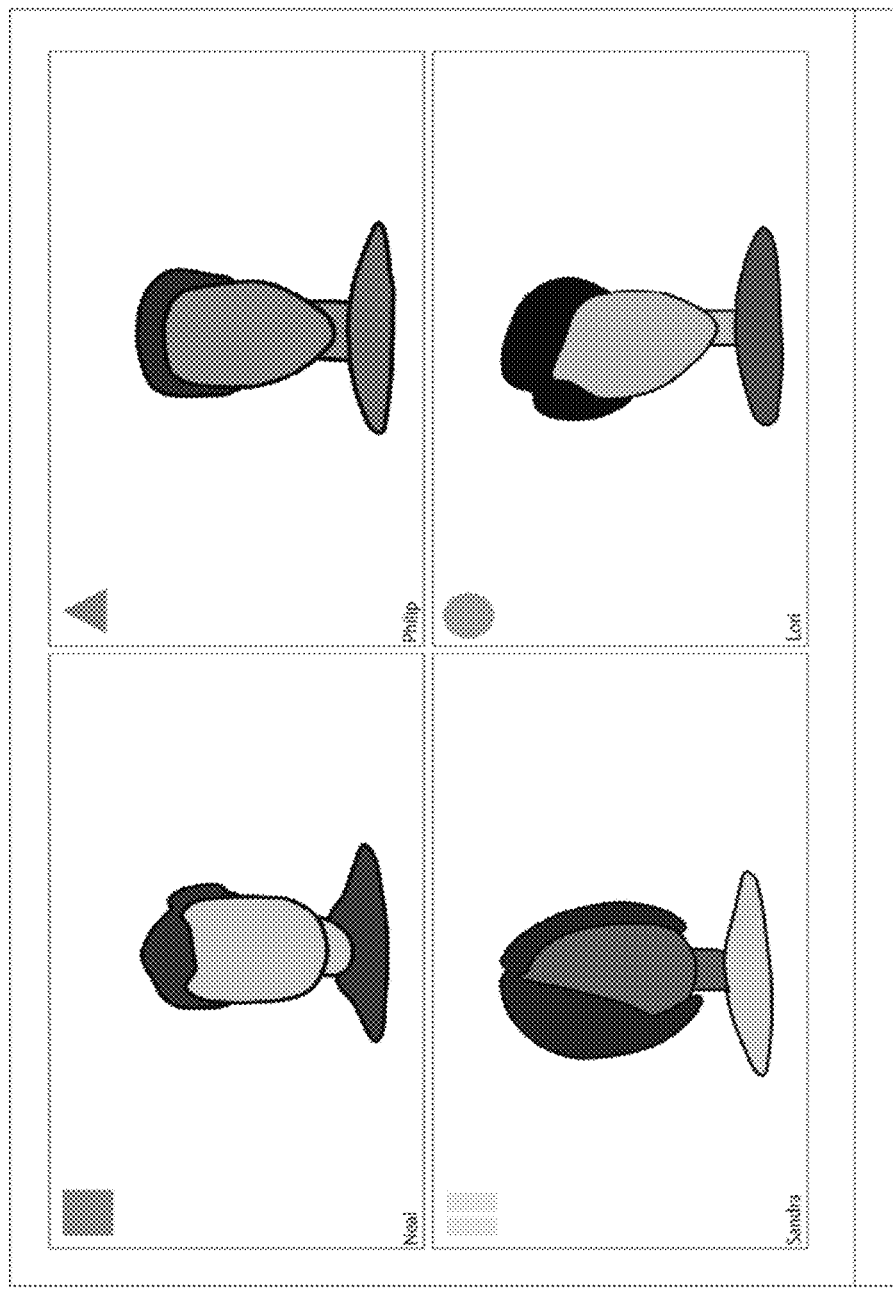
FIGS. 12A-12C illustrate example user interfaces showing insights and recommendations for video conferences.
Figure 12B:
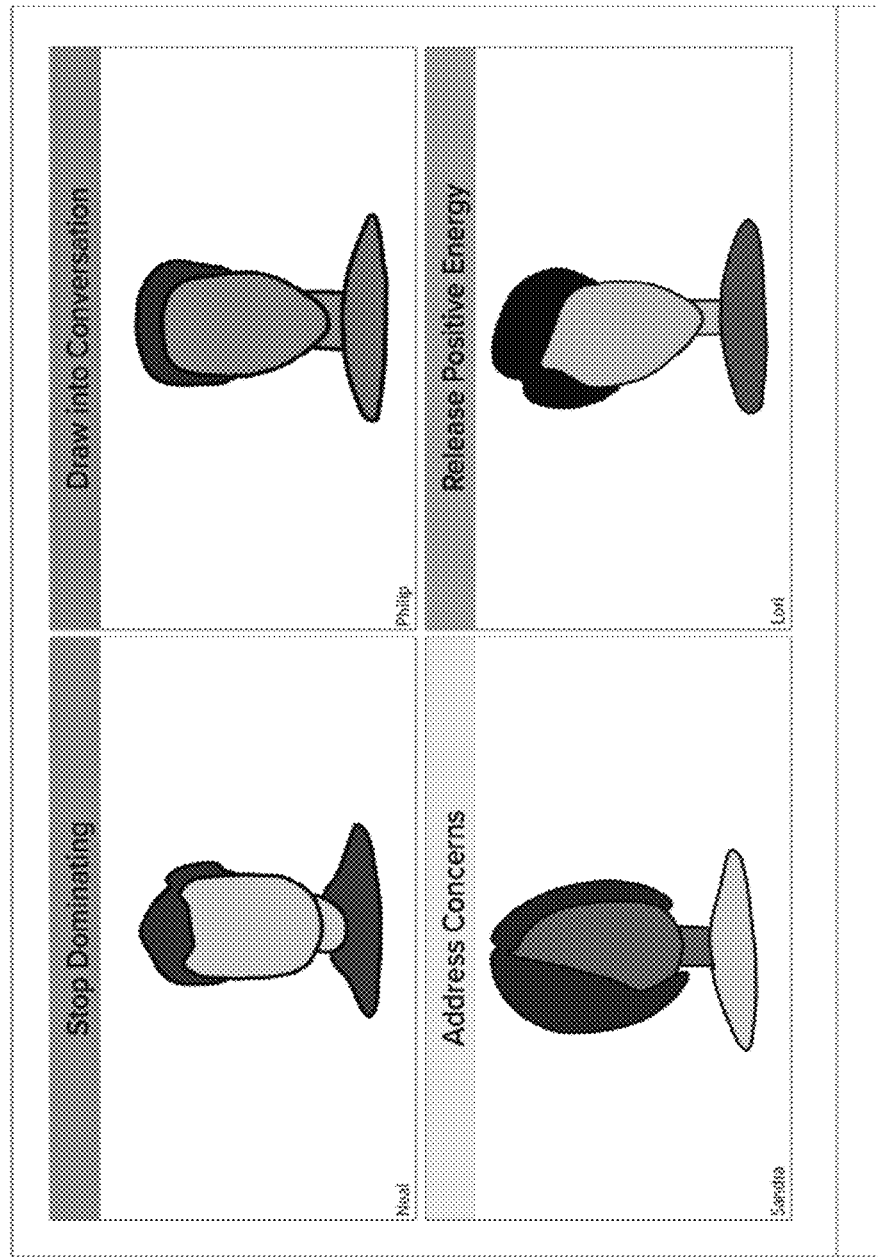
Figure 12C:
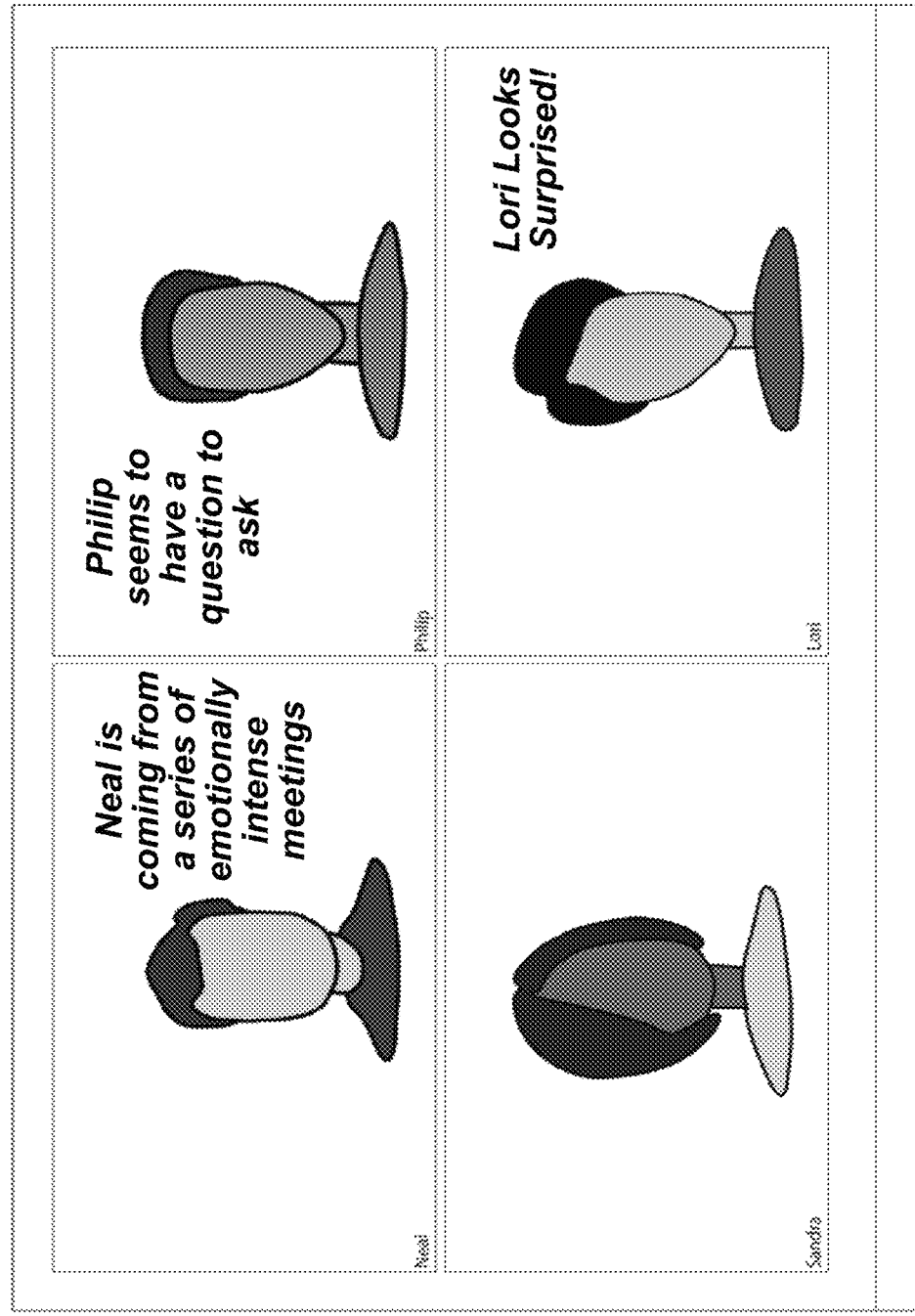

FIGS. 12A-12C illustrate example user interfaces showing insights and recommendations for video conferences. These interfaces show a few examples how the system can prompt a user about how he might better engage specific people or use information about a certain person to enhance collaboration in the meeting.

FIG. 12A shows recommendations for conversation management with icons in the upper left corner. The different shapes and/or colors can signal different needs. This view shows icons associated with actions that should be taken to address the needs of team members or to facilitate overall collaboration. For example, the square may indicate that the person needs to talk less (e.g., they are dominating the conversation or having a negative effect on others), a triangle may indicate that the person needs to be drawn into the conversation, etc. While there may be many more participants than can be comfortably displayed on the screen, the software can choose participants who should be addressed most urgently to be displayed. Participants who are performing well may not need to be displayed at the current moment. The data shown in this view may best be suited to be displayed only to the meeting facilitator. On an individual participant's screen, they would be shown an icon indicating the type of action they should take to maximize the group's success.

FIG. 12B show conversation management recommendations with banners above a person's video feed in the video conference. This view shows colored banners and text based suggestions of actions that should be taken to address the needs of team members or to facilitate overall collaboration. While there may be many more participants than can be comfortably displayed on the screen, the software can choose participants who should be addressed most urgently to be displayed. Participants who are performing well may not need to be displayed at the current moment. The data shown in this view may best be suited to be displayed only to the meeting facilitator. On an individual participant's screen, they would be shown an icon indicating the type of action they should take to maximize the group's success.

FIG. 12C shows a more general approach for facilitating conversations, where indicators from the system are provided and removed in real time with the flow of the conversation and detected events. For example, if the system detects that Philip has a question, the system can indicate "Philip seems to have a question to ask." If the system detects a micro-expression from a user, the system may indicate that and the indication can persists for some time (e.g., 30 seconds, one minute), much longer than the duration of the micro-expression (e.g., less than a second) so the person can address it. In the example detecting a brow raise can cause the system to indicate that the user Lori appears to be surprised.

Figure 13:
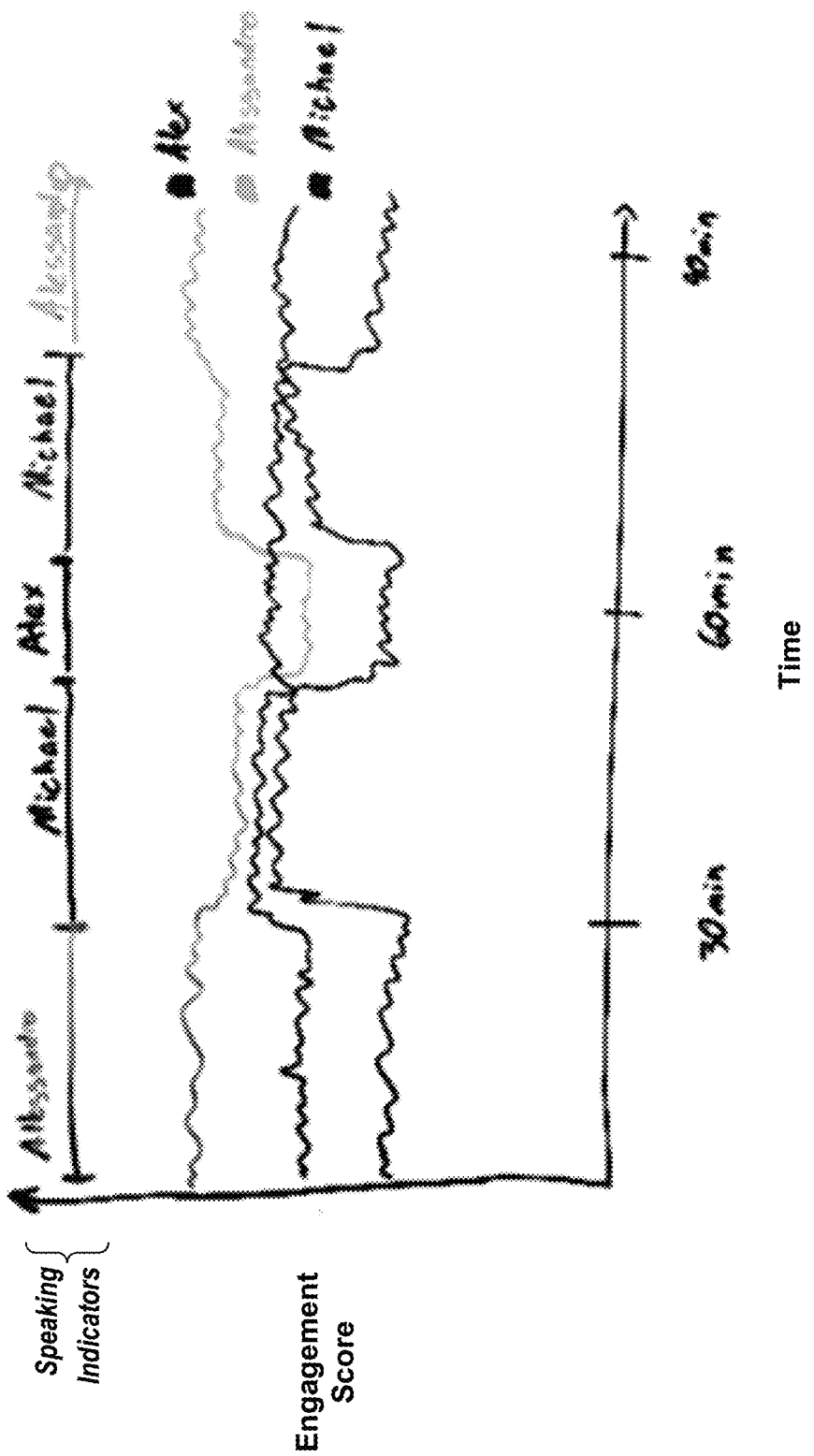
FIG. 13 shows a graph of engagement scores over time during a meeting, along with indicators of the periods of time in which different participants were speaking.

FIG. 13 shows a graph of engagement scores over time during a meeting, along with indicators of the periods of time in which different participants were speaking. This can be a real-time running chart that is shown and updated over the course of a video conference or other communication session. In the example, the horizontal axis shows time since the beginning of the meeting, the vertical axis shows the collaboration score or engagement score (or any other metric or analysis result of interest). Across the top of the graph, or in another chart, there can be an indicator of who was speaking at each time (e.g., the speaking indicators).

Figure 14A:
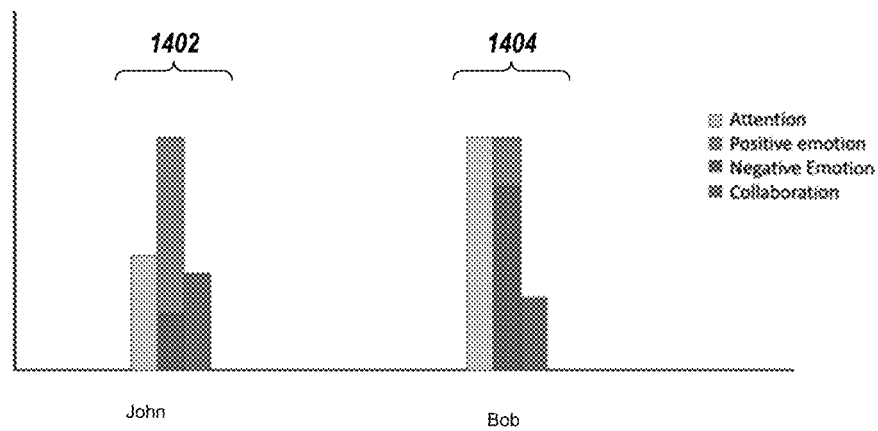
FIGS. 14A-14B illustrate examples of charts showing effects of users' participation on other users.
Figure 14B:
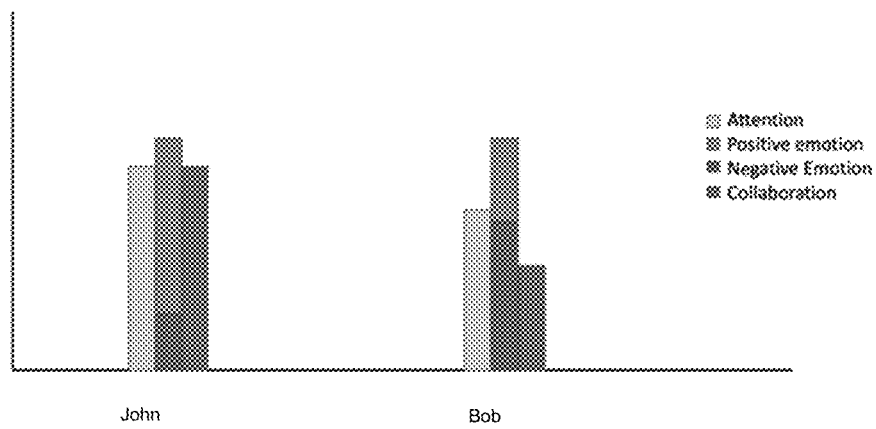

FIGS. 14A-14B illustrate examples of charts showing effects of users' participation on other users. Reports about a collaboration session can be provided after the session is over.

One example is a group collaboration report, which provides an overview of the total performance of the group and summary information for each individual. This report can include a final completed version of the real-time report (e.g., FIG. 13) from meeting beginning to meeting end. Another item is a pie chart indicating percentage of speaking time used by each participant (e.g., similar to FIG. 11B) including the data for the number of minutes spoken by each participant. Another item is a group average collaboration score for the entire meeting. Another example item for the report is a listing of individual participants and their average collaboration scores for the session with accompanying bar chart.

An individual detailed report can include how a specific user interacted with other users in a collaboration session. This can include the charts of FIGS. 14A-14B for each participant. The individual report is intended to give additional details on an individual participant's performance. In general, the report for an individual can include: (1) a report similar to the real-time report but with only the collaboration score for the individual user being reported on, (2) total speaking time for the individual, (3) average collaboration score for the individual, and (4) an indication of the individual's response to other participants. This should be expressed as a bar chart including Attention, Positive Emotion, Negative Emotion, and Collaboration. The data shown will be the average data for the participant being analyzed during the times that various other participants were speaking. FIG. 14A shows this type of chart, with indicators for the amount of attention, positive emotion, negative emotion, and collaboration that the individual (e.g., "Alex") expressed when John was speaking (section 1402), and also the levels expressed when a different user, Bob, was speaking (section 1404).

The report for an individual can include information about other participants' responses to the individual. In other words, this can show how other people reacted when the user Alex was speaking. This chart, shown in FIG. 14B, has the same format as the chart in FIG. 14A, but instead of summarizing data about how the individual being analyzed reacted, it summarizes the data about reactions of the other participants, filtered to reflect the times that the individual being analyzed (e.g., Alex) was speaking.

Figure 15:
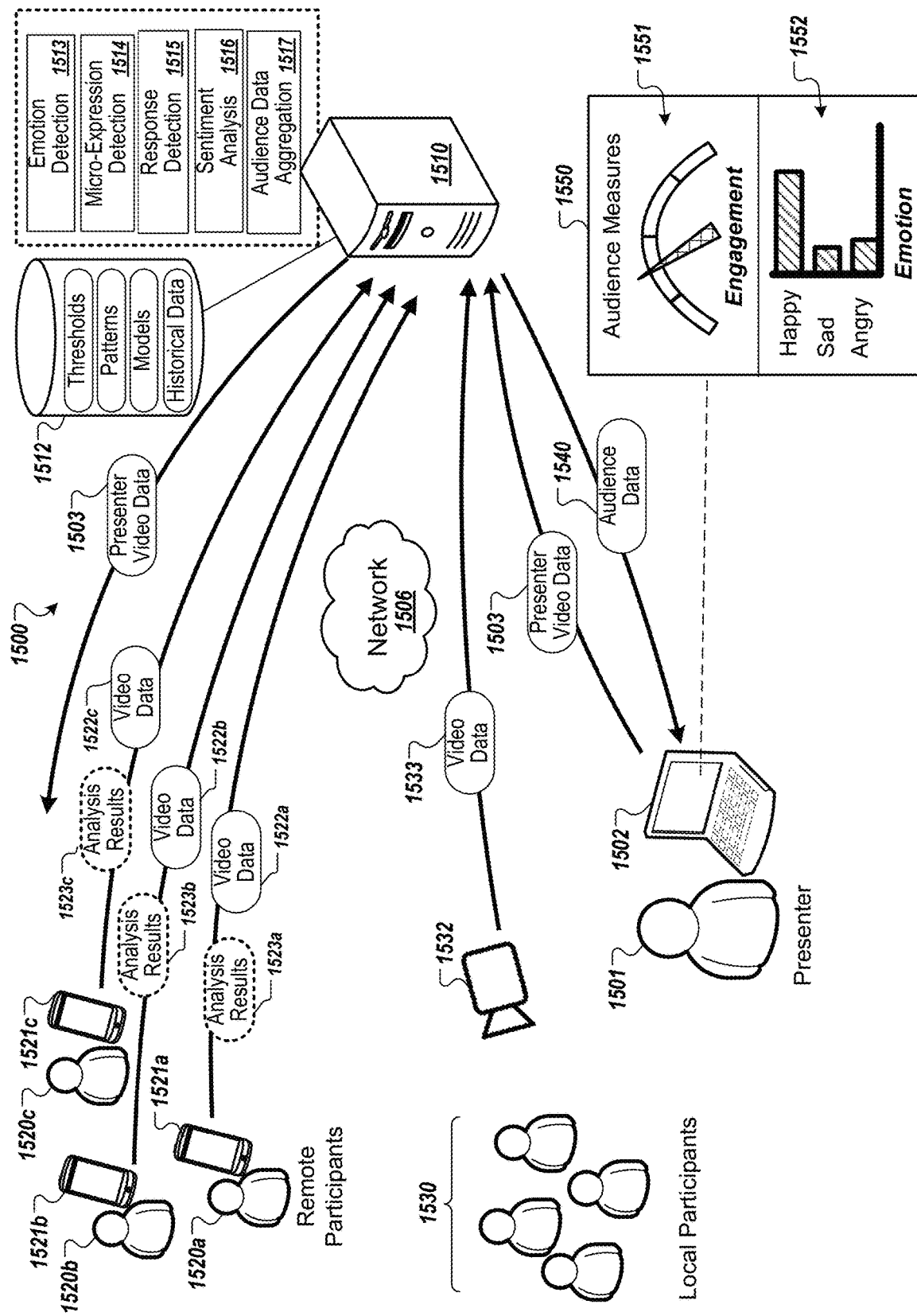
FIG. 15 illustrates a system that can aggregate information about participants in a communication session and provide the information to a presenter during the communication session.

FIG. 15 illustrates a system 1500 that can aggregate information about participants in a communication session and provide the information to a presenter during the communication session. For example, the system 1500 can provide indicators that summarize the engagement, emotions, and responses of participants during the communication session. The system 1500 can determine and provide indicators in a status panel, a dashboard, or another user interface to show the overall status of an audience that includes multiple participants, even dozens, hundreds, thousands of participants, or more. The system 1500 can add emotional intelligence to the communication session, giving a clear indication of the way the audience is currently feeling and experiencing the communication session.

In many cases, it is helpful for a presenter, teacher, speaker, or other member of a communication session to have information to gauge the state of the audience, e.g., the emotions, engagement (e.g., attention, interest, enthusiasm, etc.), and other information. In many situations, including remote interactions in particular, it is difficult for a presenter to understand the engagement and emotional responses of people in the audience. This is the case even for video interactions, where the small size of video thumbnails and large numbers of participants make it difficult for a presenter to read the audience. Even when the presenter and audience are in the same room, the presenter cannot always assess the audience, especially when there are large numbers of people (e.g., dozens of people, hundreds of people, etc.).

The system 1500 provides a presenter 1501 information about the emotional and cognitive state of the audience, aggregated from information about individual participants. During the communication session, a device 1502 of the presenter 1501 provides a user interface 1550 describing the state of the audience (e.g., emotion, engagement, reactions, sentiment, etc.). This provides the presenter 1501 real-time feedback during the communication session to help the presenter 1501 determine the needs of the audience and adjust the presentation accordingly. The information can be provided in a manner that shows indications of key elements such as engagement and sentiment among the audience, so the presenter 1501 can assess these at a glance. The information can also show how the audience is responding to different portions of the presentation. In an educational use, the information can show which topics or portions of a lesson are received. For example, low engagement or high stress may indicate that the material being taught is not being effectively received.

The communication session can be any of various types of interactions which can have local participants 1530, remote participants 1520a-1520c, or both. Examples of communication sessions include meetings, classes, lectures, conferences, and so on. The system 1500 can be used to support remote interactions such as distance learning or distance education, web-based seminars or webinars, video conferences among individuals, video conferences among different rooms or groups of participants, and so on. The system 1500 can also be used for local meetings, such as interactions in a conference room, a classroom, a lecture hall, or another shared-space setting. The system 1500 can also be used for hybrid communication sessions where some participants are in a room together, potentially with the presenter 1501 (e.g., in a conference room, classroom, lecture hall or other space), while other participants are involved remotely over a communication network 1506.

The system 1500 includes the endpoint device 1502 of the presenter 1501, a server system 1510, a communication network 1506, endpoint devices 1521a-1521c of the remote participants 1520a-1520c, and one or more cameras 1532 to capture images or video of local participants 1530. In the example, the presenter 1501 is in the same room with the local participants 1530 and additional remote participants 1520a-1520c each participate remotely from separate locations with their own respective devices 1521a-1521c.

In the example of FIG. 15, the presenter 1501 has an endpoint device 1502. The endpoint device 1502 may be, for example, a desktop computer, a laptop computer, a tablet computer, a mobile phone, a video conference unit, or other device. The presenter 1501 can provide any a variety of types of content to participants in the communication session, such as video data showing the presenter 1501, audio data that includes speech of the presenter 1501, image or video content, or other content to be distributed to participants. For example, the presenter may use the device 1502 to share presentation slides, video clips, screen-share content (e.g., some or all of the content on screen on the device 1502), or other content.

In some implementations, the presenter 1501 is an individual that has a role in the communication session that is different from other participants. In some implementations, the presenter 1501 is shown a different user interface for the communication session than other participants who do not have the presenter role. For example, the presenter 1501 may be provided a user interface 1550 that gives information about the emotional and cognitive state of the audience or group of participants as a whole, while this information is not provided to other participants 120a-120c, 130.

The presenter 1501 may be a person who is designated to present content to the rest of the participants in the communication session. The presenter 1501 may be, but is not required to be, an organizer or moderator of the communication session, or may be someone who temporarily receives presenter status. The presenter 1501 may be a teacher or a lecturer who has responsibility for the session or has a primary role to deliver information during the session. The presenter role may shift from one person to another through the session, with different people taking over the presenter role for different time periods or sections of the session. In some implementations, a moderator or other user can designate or change who has the presenter role, or the presenter role may be automatically assigned by the system to a user that is speaking, sharing their screen, or otherwise acting in a presenter role.

The device 1502 captures audio and video of the presenter 1501 and can send this audio and video data to the server system 1510, which can distribute the presenter video data 1503 to endpoint devices 1521a-1521c of the remote participants 1520a-1520c where the data 1503 is presented. The presenter video data 1503 can include audio data (such as speech of the presenter 1501). In addition to, or instead of, audio and video of the presenter 1501 captured by the device 1502, other content can be provided, such as images, videos, audio, screen-share content, presentation slide, or other content to be distributed (e.g., broadcast) to devices of participants in the communication session.

As the communication session proceeds, the system 1500 obtains information characterizing the emotional and cognitive states of the participants 1530, 1520a-1520c as well as reactions and actions of the participants. For example, one or more devices in the system 1500 perform facial expression analysis on video data or image data captured for the various participants.

The endpoint devices 1521a-1521c of the remote participants 1528-1520c can each capture images and/or video data of the face of the corresponding participant. The devices 1521a-1521c can provide respective video data streams 1522a-1522c to the server system 1510, which can perform facial image analysis and facial video analysis on the received video data 1522a-1522c. For example, the analysis can include emotion detection, micro-expression detection, eye gaze and head position analysis, gesture recognition, or other analysis on the video.

In some implementations, the endpoint devices 1521a-1521c may each locally perform at least some analysis on the video data they respectively generate. For example, each device 1521a-1521c may perform emotion detection, micro-expression detection, eye gaze and head position analysis, gesture recognition, or other analysis on the video it captures. The devices 1521a-1521c can then provide the analysis results 1523a-1523c to the server system 1510 in addition to or instead of the video data 1522a-1522c. For example, in some cases, such as a web-based seminar with many participants, video of participants may not be distributed and shared among participants or even to the presenter 1501. Nevertheless, each of the devices 1521a-1521c can locally process its own captured video and provide scores indicative of the emotional or cognitive state of the corresponding participant to the server system 1510, without needing to provide the video data 15221-1522c.

The local participants 1530 are located together in a space such as a room. In the example, they are located in the same room (such as a classroom or lecture hall) with the presenter 1501. One or more cameras 1532 can capture images and/or video of the local participants 1530 during the communication session. Optionally, a computing device associated with the camera(s) 1532 can perform local analysis of the video data 1533, and may provide analysis results in addition to or instead of video data 1533 to the server system 1510.

The server system 1510 receives the video data 1522a-1522c, 1533 from the participants, and/or analysis results 1523a-1523c. The server system 1510 can perform various types of analysis on the video data received. For each video stream, the server system 1510 may use techniques such as emotion detection 1513, micro expression detection 1514, response detection 1515, sentiment analysis 1516, and more.

The server system 1510 has access to a data repository 1512 which can store thresholds, patterns for comparison, models, historical data, and other data that can be used to assess the incoming video data. For example, the server system 1510 may compare characteristics identified in the video to thresholds that represent whether certain emotions or cognitive attributes are present, and to what degree they are present. As another example, sequences of expressions or patterns of movement can be determined from the video and compared with reference patterns stored in the data storage 1512. As another example, machine learning models can receive image data directly or feature data extracted from images in order to process that input and generate output indicative of cognitive and emotional attributes. The historical data can show previous patterns for the presenter, the participants, for other communication sessions, and so on, which can personalize the analysis for individuals and groups.

The results of the analysis can provide participant scores for each of the participants 1520a-1520c, 1530. The participant scores can be, but are not required to be, collaboration factor scores 140 as discussed above. The participant scores can measure emotional or cognitive attributes, such as indicating the detected presence of different emotions, behaviors, reactions, mental states, and so on. In addition, or as an alternative, the participant scores can indicate the degree, level, or intensity of attributes, such as a score along a scale that indicates how happy a participant is, how angry a participant is, how engaged a participant is, the level of attention of a participant, and so on. The system 1500 can be used to measure individual attributes or multiple different attributes. The analysis discussed here may be performed by the devices of the respective participants 1520a-1520c or by the endpoint device 1502 for the presenter 1501 in some implementations. For example, the analysis data 1523a-1523c may include the participant scores so that the server system 1510 does not need to determine them, or at least determines only some of the participant scores.

The participant scores provide information about the emotional or cognitive state of each participant 1520a-1520c, 1530. The server system 1510 uses an audience data aggregation process 1517 to aggregate the information from these scores to generate an aggregate representation for the group of participants (e.g., for the audience as a whole, or for groups within the audience). This aggregate representation may combine the information from participant scores for many different participants. The aggregate representation may be a score, such as an average of the participant scores for an emotional or cognitive attribute. One example is an average engagement score across the set of participants 1520a-1520c, 1530. similar scores can be determined for other attributes, to obtain and aggregate score or overall measure across multiple participants for happiness, for sadness, for anger, for attention, for boredom, or for any other attributes measured. In general, the emotional or cognitive state of a participant can include the combination of emotional and cognitive attributes present for that participant at a given time, although the participant scores may describe only one or more aspects or attributes for the overall state.

The server system 1510 may determine other forms of aggregate representations. For example, the server system may determine scores or measures for subjects within the audience, such as groups were clusters having similar characteristics. For example, the server system 1510 can use the participant scores for different emotional and cognitive attributes to determine groups of participants having similar overall emotional or cognitive states. As another example, the server system 1510 may determine a representation of the states of local participants 1530 and another representation for the states of remote participants 1520a-1520c.

The aggregate representation can include data for a visualization such as a chart, graph, plot, animation, or other visualization. In some cases, the aggregate representation may provide more than a simple summary across the entire audience, and may instead show the characteristics of groups within the audience, such as to show the number of people in each of different emotional or cognitive state categories. As a simple example, the aggregate representation may indicate the number of participants in each of three categories respectively representing high engagement, moderate engagement, and low engagement. In another example, the representation may include indications of the individuals in different groups or states, such as by grouping names, face images, video thumbnails, or other identifying information for participants in a group.

When the server system 1510 has aggregated the data for the participants, the server system 1510 provides audience data 1540 that includes the aggregated information to the presenter's device 1502. This audience data 1540 can include a score to be indicated, such as an engagement score for the audience, a sentiment score for the audience, a happiness score, etc. The audience data 1540 may include other forms of an aggregate representation, such as data for charts, graphs, animations, user interface elements, and other displayable items that describe or indicate the emotional or cognitive states of participants, whether for individual emotional or cognitive attributes or for a combination of attributes. The presenter's device 1502 uses the audience data 1540 to present a user interface 1550 that displays the aggregate representation to indicate the state of the audience.

The user interface 1550 can provide various indications of the state of the audience. For example, one element 1551 shows a dial indicating the level of engagement for the audience as a whole. Another user interface element 1552 shows a chart including indicators of the average levels of different emotions across the set of participants in the communication session. The user interface elements 1551 and 1552 are based on aggregate information for the participants in the communication session. As a result, the user interface 1550 shows overall measures of the state of the participants and their overall current response to the presentation. The system 1500 adjusts the measures indicated in the user interface 1550 over the course of the presentation, so that the user interface 1550 is updated during the communication session, substantially in real time, to provide an indication of the current state of the audience.

While the example of FIG. 15 shows current measures of emotional or cognitive states of participants, the system can be used to additionally or alternatively provide indicators of prior or predicted future emotional or cognitive states. For example, the system can track the levels of different emotional or cognitive attributes and show a chart, graph, animation, or other indication of the attributes previously during the communication session, allowing the presenter 1501 to see if and how the attributes have changed. Similarly, the system can use information about how the communication session is progressing, e.g., the patterns or trends in emotional and cognitive attributes, to give a prediction regarding the emotional or cognitive states in the future. For example, the system may detect a progression of the distribution of emotional or cognitive states from balanced among various categories toward a large cluster of low-engagement states, and can provide an alert or warning that the audience may reach an undesirable distribution or engagement level in the next 5 minutes if the trend continues. More advanced predictive techniques can use machine learning models trained based on examples of other communication sessions. The models can process audience characteristics, current emotional and cognitive states, progressions of the emotional and cognitive states during the communication session, and other information to predict the likely outcomes, such as the predicted aggregate scores for the audience, for upcoming time periods, e.g., 5 minutes or 10 minutes in the future.

Many other types of interfaces can be used to provide information about the current state of the audience. For example, the interfaces of FIG. 9A-9C and FIGS. 10A-10D each provide information about aggregate emotional and cognitive states of the participants, e.g., with indicators showing: attribute levels for the audience as a whole (FIG. 9A); groups of participants organized by their cognitive or emotional states (FIG. 9B); showing ranking or ordering of participants, or assigning them to categories, according to a measure (FIG. 9C), which may be based on the detected cognitive or emotional states; and charting or graphing one or more emotional or cognitive attributes of participants, potentially showing clusters of participants (FIGS. 10A-10D). Other types of user interface elements to provide aggregate representations for an audience are also shown in FIG. 16.

Figure 16:
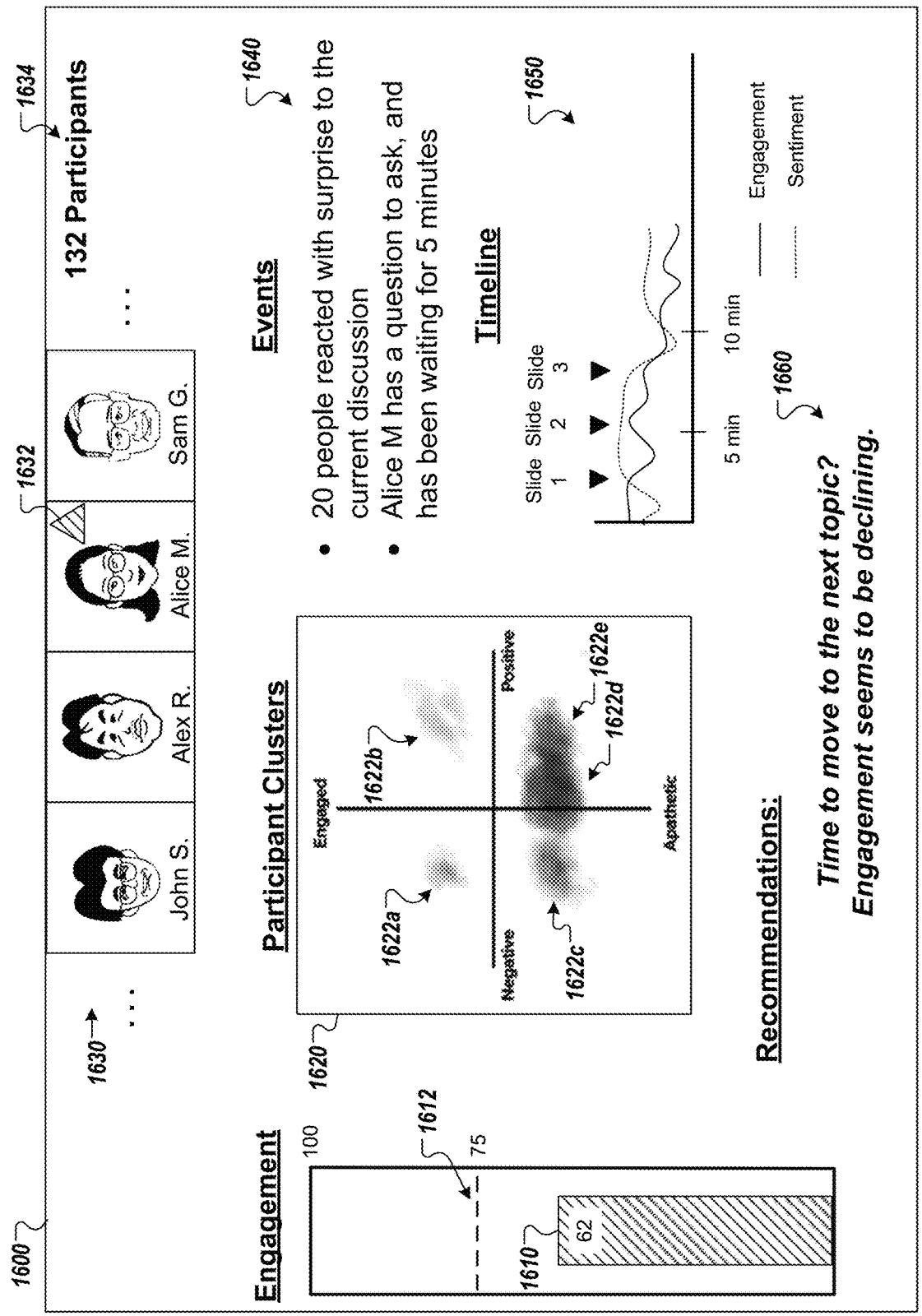
FIG. 16 shows an example of a user interface that displays information for various aggregate representations of emotional and cognitive states of participants in a communication session.

FIG. 16 shows an example of a user interface 1600 that displays information for various aggregate representations of emotional and cognitive states of participants in a communication session, such as a lecture, class, web-based seminar, video conference, or other interaction. The information in the user interface 1600 can provide information about the audience as a whole, for subsets or groups within the audience, and/or for individual participants.

The user interface 1600 includes an engagement indicator 1610, which shows a level of engagement determined for the set of participants in the communication session as a whole. In the example, the indicator 1610 is a bar chart with the height of the rectangle indicating the level of engagement on a scale from 0 to 100. The system may also set the color of the indicator 1610 to indicate the level of engagement. In this case, the engagement score for the set of participants as a whole has a value of 62, and so the height of the indicator 1610 is set to indicate this level of engagement. In addition, the value of the engagement score for the audience, e.g., 62, is displayed.

The indicator 1610 is also provided with a corresponding reference 1612 for comparison. The reference 1612 can be, for example, a target level of engagement that is desired, a recommended level of engagement, a goal to reach, an average value or recent value of the engagement score for the current communication session, an average for a prior communication session (such as for the presenter or class), a high-water mark level of engagement for the current communication session showing the highest level achieved so far, and so on. The reference level 1612 provides an easy-to-see reference for how the engagement level compares to an objective measure. This can inform a presenter whether engagement is at or near a target level, if engagement has declined, or if another condition is present.

Another type of aggregate representation can provide information about clusters of participants. For example, an example graph 1620 plots the positions of many different participants with respect to axes respectfully representing engagement and sentiment (e.g., emotional valance). In this case, the chart 1620 shows various clusters 1622a-1622e of participants, where each cluster represents a group of participants having a generally similar emotional or cognitive state. In this case, the clusters are naturally occurring results of plotting the states of participants in the chart 1620. In other implementations, the system may actively group or cluster the participants according to their states, such as by determining which states are most common and defining clusters based on certain combinations of characteristics or ranges of scores.

Region 1630 shows identifying information, such as images, video streams, names, etc., for a subset of the participants in the communication session. In some cases, the set of participants shown can be selected to be representative of the emotional and cognitive states present among the audience. As a result, the information identifying participants in region 1630 can itself be an aggregate representation of the state of the audience. For example, if there are 100 participants and 80 of them are happy and engaged while 20 are bored and disengaged, the region 1630 may show 4 video streams of participants in the "happy and engaged" category along with one video stream selected from the "board and disengaged" category. As a result, the region 1630 can show a group of people that provides a representative sampling of emotional or cognitive states from among the participants.

The region 1630 maybe used to show other types of information. For example, the system may choose the participants to show based on the reactions of participants, such as showing examples of faces that the system determines to show surprise, delight, anger, or another response. Responses can be determined by, for example, detection of the occurrence of a gesture, such as a micro-expression, or a change in emotional or cognitive state of at least a minimum magnitude over a period of time. As another example the system may show people that the system determines may need attention of the presenter, such as people that the system determines are likely to have a question to ask, people who are confused, people who are ready to contribute to the discussion if called on, and so on. In some cases, indicators such as the indicator 1632 may be provided along with identifying information for a participant to signal to the presenter (e.g., the viewer of the user interface 1600) the condition of that participant.

The indicator 1634 indicates the number of participants currently in the communication session.

An events region 1640 shows actions or conditions that the system determined to have occurred during the communication session. For example, in this case the events region 1640 shows that a group of people reacted with surprise to a recent statement, and that a person has a question to ask and has been waiting for 5 minutes. The events region 1640, as well as the other indicators and information presented in the user interface 1600, is updated in an ongoing manner during the communication session.

A region 1650 shows a how certain characteristics are states of the audience have progressed over time during the communication session. For example, the region 1650 shows a timeline graph with two curves, one showing engagement for the audience as a whole and another showing sentiment for the audience as a whole. As the communication session proceeds, those curves are extended, allowing the presenter to see the changes over time and the trends in emotional or cognitive states among the audience. In the example, the graph also includes indicators of content or topics provided are shown on the graph, e.g., with indicators marking the times that different presentation slides (e.g., "slide one," "slide two," and "slide three") were initially displayed. As a result, the user interface 1600 can show how the audience is responding to, and has responded to, different content of the communication session, whether spoken, as presenter video, media, broadcasted text or images, and so on.

Other types of charts, graphs, animations, and other visualizations may be provided. For example, a bar chart showing the number of participants in each of different groups may be presented. The groups may represent participants grouped by certain participant characteristics (e.g., being from different organizations; being in different offices or geographical areas; different ages, different genders, or other demographic attributes, etc.). As another example, a line graph may show the changes in and progression in one or more emotional or cognitive attributes among different groups or clusters in the audience. The grouping of clustering of participants may be done based on the participation or emotional or cognitive state in the communication session or may be based on other factors, such as demographics, academic performance, etc. For example, one line may show engagement among men in the audience and another line may show engagement and among women in the audience.

As another example, a chart may show the average level of engagement of students in a high-performing group of students and the average level of engagement of students in a low-performing group.

The region 1660 shows recommendations that the system makes based on the emotional or cognitive state of the participants. In this case, the system determines that engagement is low and/or declining (which can be seen from the low-engagement clusters 1622c-1622e of element 1620, engagement indicator 1610, and the chart in region 1650), based on the distribution of emotional or cognitive states among the participants, and potentially on other factors such as the pattern of change in emotional or cognitive attributes and the composition of the audience, the system selects a recommendation. In this case, the recommendation is for the presenter to move to another topic. The recommendation can be based on results of analysis of prior communication sessions, output of a machine learning model trained based on prior sessions, or other data that can help the system recommend actions that have achieved a target result. The recommendation can be based on results of analysis of prior communication sessions, output of a machine learning model trained based on prior sessions, or other data that can help the system recommend actions that have achieved a target result, such as increasing and overall level of engagement, in similar situations or contexts (e.g., similar types and sizes of participant clusters, similar emotional or cognitive state distributions, similar progressions of one or more attributes over time, etc.) for other communication sessions. The recommendations are another example of the way that the system enhances the emotional intelligence of the presenter. The system, through the user interface 1600, inform the presenter of the emotional context and state of the audience. The system can also provide recommendations for specific actions, customized or selected for the particular emotional context and state of the audience, that allow the presenter to act in an emotionally intelligent way. In other words, the system guides the presenter to appropriately respond to and address the needs of the audience due to the emotions and experience at the current time, even if the presenter does not have the information or capability perceive and address those needs.

While various of the indicators in the user interface 1600 show aggregate information for the entire audience as a whole, her user interface may optionally show information for subsets or even individual participants.

Figure 17:
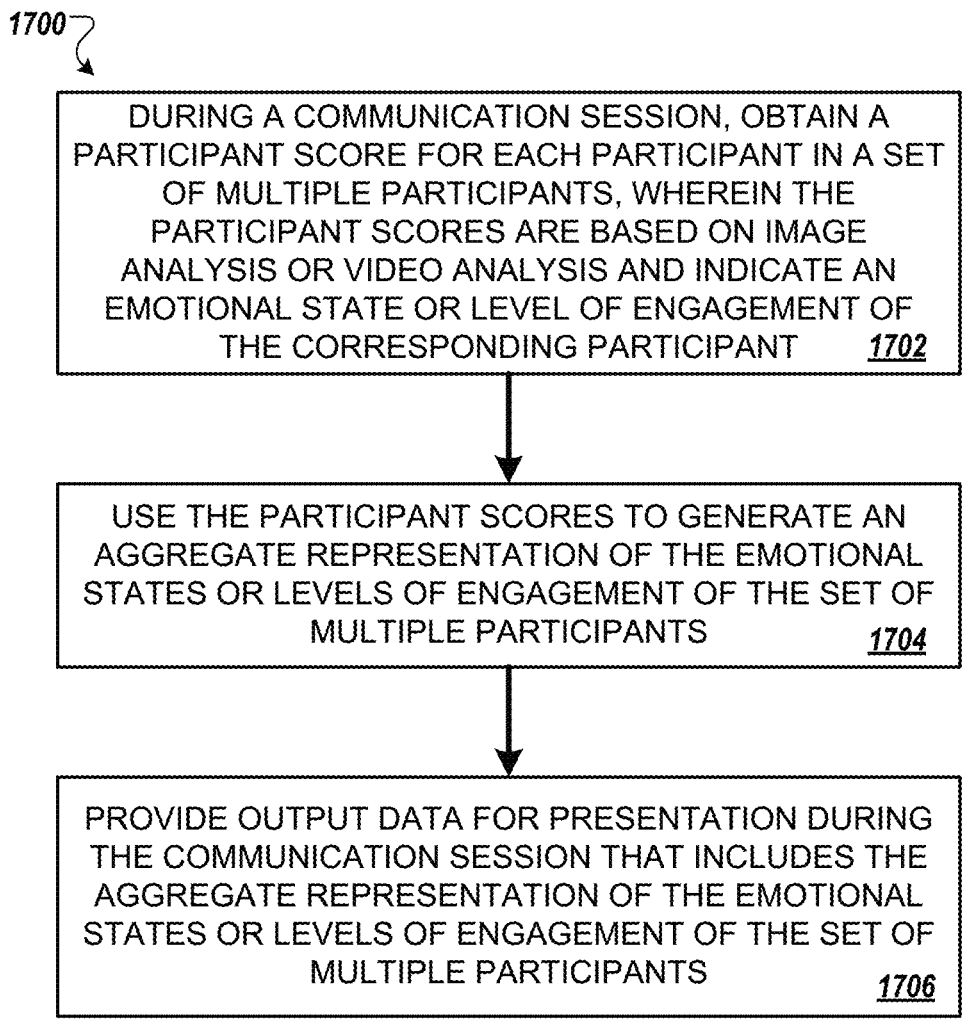
FIG. 17 is a flow diagram describing a process of providing aggregate information about the emotional or cognitive states of participants in a communication session.

FIG. 17 is a flow diagram describing a process 1700 of providing aggregate information about the emotional or cognitive states of participants in a communication session. The method can be performed by one or more computing devices. For example, the process 1700 can be performed by a server system, which can combine information about multiple participants and generate and send an aggregate representation of the state of the participants to an endpoint device for presentation. As another example, the process 1700 can be performed by an endpoint device, which can combine information about multiple participants and generate and present an aggregate representation of the state of the participants. In some implementations, the operations are split among a server system and a client device.

The process 1700 includes obtaining a participant score for each participant in a set of multiple participants in a communication session (1702). The participant scores can be determined during the communication session based on image data and/or video data of the participants captured during the communication session. The participant scores can each be based on facial image analysis or facial video analysis performed using image data or video data captured for the corresponding participant.

The participant scores can each indicate characteristics of an emotional or cognitive state of the corresponding participant. In general, the term emotional or cognitive state is used broadly to encompass the feelings, experience, and mental state of a person, whether or not consciously recognized by the person. The participant score can be indicative of emotions, affective states, and other characteristics of the person's perception and experience, such as valence (e.g., positive vs. negative, pleasantness vs. unpleasantness, etc.), arousal (e.g., energy, alertness, activity, stimulation, etc.). For example, the participant score can indicate the presence of, or a level or degree of, a particular emotion, such as anger, fear, happiness, sadness, disgust, or surprise. A participant score may indicate the presence of, or a level or degree of, a more complex emotion such as boredom, confusion, frustration, annoyance, anxiety, shock, contempt, contentment, curiosity, or jealousy. A participant score may similarly indicate the presence of, or a level or degree of, cognitive or neurological attributes such as engagement, attention, distraction, interest, enthusiasm, and stress. Some aspects of the state of the person, such as participation and collaboration, may include emotional, cognitive, and behavioral aspects.

Depending on the implementation, a participant score may be obtained to describe a single aspect of a participant's emotional or cognitive state, or multiple participant scores may be determined for multiple aspects of the participant's emotional or cognitive state. For example, a vector can be determined that provides a score for each of various different emotions. In addition, or as an alternative, a score for each of engagement, attention, and stress can be determined.

The participant scores can be determined through analysis of individual face images and/or a series of face images in video segment (e.g., showing facial movements, expressions, and progression over time). The participant scores can be determined by providing face image data and/or feature values derived from face image data to trained machine learning models. The model can be trained to classify or score aspects of the emotional or cognitive state of a person from one or more face images, and can output a score for each of one or more aspects of the state of the person (e.g., a score for happiness, fear, anger, engagement, etc.). The models may also receive information input information such as an eye gaze direction, a head position, and other information about the participant.

The scores may be expressed in any appropriate way. Examples of types of scores include (1) a binary score (e.g., indicating whether or not an attribute is present with at least a threshold level); (2) a classification (e.g., indicating that an attribute is in a certain range, such as low happiness, medium happiness, or high happiness); (3) a numerical value indicating a level or degree of an attribute (e.g., a numerical value along a range, such as a score for happiness of 62 on a scale from 0 to 100). Other examples include probability scores or confidence scores (e.g., indicating a likelihood of an attribute being present or being present with at least a threshold level of intensity or degree), relative measures, ratios, and so on.

The participant scores can be determined by any of various computing devices in a system. In some implementations, the device that captures the video of a participant may generate and provide the scores, which are then received and used by a server system or the endpoint device of a presenter. In other implementations, devices of participants provide image data or video data to the server system, and the server system generates the participant scores. In other implementations, video data may be provided to the endpoint device of the presenter, and the presenter's device may generate the participant scores. As discussed above, the techniques for generating the participant scores include pattern matching, processing image or video data (or features derived therefrom) using one or more machine learning models, and so on The process 1700 includes using the participant scores to generate an aggregate representation of the emotional or cognitive states of the set of multiple participants (1704). In other words, the representation can combine information about the emotional or cognitive states of a group of multiple people, such as to summarize or condense the information into a form that describes one or more emotional or cognitive characteristics for the group. For example, the representation can provide an overall description of the state of an audience (e.g., the set of participants), whether the audience is local, remote, or both. The representation can indicate a combined measure across the set of participants. As another example, the representation can indicate a representative state (e.g., a typical or most common state) present among the participants. The representation may describe a single aspect of the emotional or cognitive states of the participants (e.g., a measure of enthusiasm, attention, happiness, etc.) or may reflect multiple aspects of the emotional or cognitive states.

The representation can be a score, such as an average of the participant scores for an attribute (e.g., an average engagement score, and average happiness score, etc.). The score can be a binary score, a classification label, a numerical value, etc. An aggregate score may be determined in any of various ways, such as through an equation or function, a look-up table, a machine learning model (e.g., that receives the participant scores or data about the set of participant scores and outputs a score as a result), and so on.

The representation may be another type of information based on the participant scores, such as a measure of central tendency (e.g., mean, median, mode, etc.), a minimum, a maximum, a range, a variance, a standard deviation or another statistical measure for the set of participant scores. As another example, the aggregate score can be a measure of participant scores that meet certain criteria, such as a count, ratio, percentage, or other indication of the amount of the participant scores that satisfy a threshold or fall within a range. The representation can indicate a distribution of the participant scores, such as with percentiles, quartiles, a curve, or a histogram. The representation can be a score (e.g., a value or classification) of the distribution of the participant scores, such as whether the distribution matches one of various patterns or meets certain criteria. The representation can include a chart, a graph, a table, a plot (e.g., scatterplot), a heatmap, a treemap, an animation, or other data to describe the set of participant scores. In some cases, the representation can be text, a symbol, an icon, or other that describes the set of participant scores.

When providing output data that includes or indicates the aggregate representation, this can be done as providing data that, when rendered or displayed, provides a visual output of the chart, graph, table, or other indicator. The data may be provided in any appropriate form, such as numerical values to adjust a user interface element (e.g., such as a slider, dial, chart, etc.), markup data specifying visual elements to show the aggregate representation, image data for an image showing an aggregate representation, and so on. In some cases, the system can cause the presenter to be notified of the aggregate representation (e.g., when it reaches a predetermined threshold or condition) using an audio notification, a haptic notification, or other output.

The aggregate representation can include a ranking or grouping of the participants. For example, the participants may be ranked or ordered according to the participant scores. In addition or as an alternative, the participants can be grouped or clustered together according to their participant scores into groups of people having similar or shared emotional or cognitive attributes. A group of 100 participants may have 20 in a low engagement group, 53 in a medium engagement group, and 27 in a high engagement group. An aggregate representation may indicate the absolute or relative sizes of these groups (e.g., a count of participants for each group, a ratio for the sizes of the groups, a list of names of people for each group, etc.). The groups or clusters that are indicated may be determined from the emotional or cognitive states indicated by the participant scores rather than simply showing measures for each of various predetermined classifications. For example, analysis of the set of participant scores may indicate that there is a first cluster of participants having high engagement and moderate happiness levels, a second cluster of participants having moderate engagement and low fear levels, and a third cluster with low engagement and low anger levels. The representation can describe these clusters, e.g., their size, composition, relationships and differences among the groups, etc., as a way to demonstrate the overall emotional and cognitive characteristics of the set of participants.

The technology can be used with communication sessions of various different sizes, e.g., just a few participants, or 10 or more, or 100 or more, or 1000 or more. As a result, the aggregate representation can be based on any number of participants (e.g., 10 or more, 100 or more, 1000 or more, etc.).

Various features of the technology discussed herein facilitate the data of large and even potentially unlimited numbers of participants being aggregated and provided. For example, when participants send their video feeds to a server system such as the server system 1510, the server system 1510 can use processes to examine the video streams in parallel to detect and measure emotion, engagement and other attributes of the state of each participant. The server system 1510 may use many different processors or computers to do this, including using scalable cloud-computing computing resources to dynamically expand the number of computers or central processing units (CPUs) tasked for processing the video streams, as may be needed. Similarly, the server system 1510 may coordinate the video streams to be sent to different servers or network addresses to increase the total bandwidth to receive incoming video streams. Other techniques can be used to reduce the bandwidth and computation used for large communication sessions. For example, participant devices can send compressed and/or downscaled video streams to reduce bandwidth use. In addition, or as an alternative, the emotion detection does not need to process every frame of each video stream, and may instead analyze a sampling of frames from each video stream (e.g., analyzing one out of every 5 frames, or one out of every 30 frames, etc.) or cycle through different video streams (e.g., in a round robin fashion) to reduce the computational demands of the detection and measurement of emotional or cognitive states from the video streams.

As another example, the use of distributed processing also allows data for large numbers of participants to be monitored and aggregated with low computational and bandwidth requirements for the server system 1510 and the presenter's device 1502. As shown in FIG. 15, the devices 1521a-1521c of remote participants 1520a-1520c can each perform analysis locally on the video streams of their respective remote participants, and the analysis results 1523a-1523c can include participant scores indicating detected levels of emotion, engagement, attention, stress, and other attributes or components of a participant's emotional or cognitive state. Because the video analysis is distributed and handled by each participant's own device, the marginal computational cost to add another participant's data to the data aggregation is small or even negligible. The server system 1510, or even a presenter's device 1502, may aggregate hundreds, thousands, or even millions of scores without being overburdened, especially if done periodically (e.g., once every second, every 5 seconds, every 10 seconds, etc.). For example, determining an average of a hundred, a thousand, or a million integer scores for an emotional or cognitive attribute (e.g., happiness, sadness, engagement, attention, etc.) is very feasible in this scenario.

As a result, whether the number of participants being monitored is in the range of 2-9 participants, 10-99 participants, 100-999 participants, or 1000-9,999 participants, or 10,000+ participants, the techniques herein can be effectively used to generate, aggregate, and provide indications of the emotional or cognitive states for individuals, groups, and the audience as a whole.

The process 1700 includes providing, during the communication session, output data for display that includes the aggregate representation of the emotional or cognitive states of the set of multiple participants (1706). For example, a server system can provide output data for the aggregate representation to be sent over a communication network, such as the Internet, to an endpoint device. As another example, if the aggregate representation is generated at an endpoint device, that device may provide the data to be displayed at a screen or other display device. The output data can be provided for display by an endpoint device of a speaker or presenter for the communication session. As another example, the output data can be provided for display by an endpoint device of a teacher, and the set of multiple participants can be a set of students.

The aggregate representation can be provided and presented in various different ways. For example, if the representation is a score, such as an overall level of engagement among the set of participants (e.g., an average of participant scores indicating engagement levels), the score itself (e.g., a numerical value) may be provided, or an indicator of the level of engagement the score represents can be provided, e.g., a symbol or icon, text (e.g., "high," "medium," "low," etc.), a graphical element (e.g., a needle on a dial, a marked position along a range or scale, etc.), a color for a color-coded indicator, a chart, a graph, an animation, etc.

A few examples include indicators for sentiment, engagement, and attention as shown in FIG. 9A. Another example includes grouping the participants into categories or classifications (e.g., participating, dominating, disengaged, concerned, etc.) and showing the membership or sizes of each group as shown in FIG. 9B. Another example is the ranking of participants along a scale or showing groupings of them as shown in FIG. 9C. Additional examples are shown in FIGS. 10A-10D, where a scatterplot shows the positions of different participants with respect to different emotional or cognitive attributes, allowing multiple dimensions of attributes to be indicated as well as showing clusters of users having similar emotional or cognitive states.

During the communication session, the representation of the emotional or cognitive states of the audience (e.g., for the set of participants a whole or for different subsets of the audience) can be updated in an ongoing basis. For example, as additional image data or video data captured for the respective participants during the communication session, one or more computing devices can repeatedly (i) obtain updated participant scores for the participants, (ii) generate an updated aggregate representation of the emotional states or levels of engagement of the set of multiple participants based on the updated participant scores, and (iii) provide updated output data indicative of the updated aggregate representation. The participant scores are recalculated during the communication session based on captured image data or video data so that the aggregate representation provides a substantially real-time indicator of current emotion or engagement among the set of multiple participants. For example, depending on the implementation, the representation can be based on data captured within the last minute, or more recently such as within 30 seconds, 10 seconds, 5 seconds, or 1 second. Different measures may be refreshed with different frequency.

In some cases, the process 1700 can include tracking changes in emotional or cognitive attributes among the set of multiple participants over time during the communication session. For example, the aggregate representation can include scores for emotional or cognitive attributes, and a computing device can store these scores. This can provide a time series of scores, for example, with a new score for the set of participants being determined periodically (e.g., every 30 seconds, every 10 seconds, etc.). During the communication session, the computing device can provide an indication of a change in emotional or cognitive attributes of the set of multiple participants over time. This can be provided as, for example, a graph showing the a level of emotion or engagement over time. As another example, the computing device can determine a trend in emotional or cognitive attributes among the participants and indicate the trend (e.g., increasing, decreasing, stable, etc.). Similarly, the computing device can determine when the change in emotional or cognitive attributes meets predetermined criteria, such as at least one of reaching a threshold, falling inside or outside a range, changing by at least a minimum amount, changing in a certain direction, and so on.

A computing device can assess the participant scores or the aggregate representation to determine when a condition has occurred. For example, a device can evaluate the participant scores or the aggregate representation with respect to criteria (e.g., thresholds, ranges, etc.) and determine when the average level of an emotional or cognitive attribute satisfies a threshold, when a number of participants showing an emotional or cognitive attribute satisfies a threshold, and so on. The conditions can relate to different situations or conditions of the conference, such as most of the people being engaged in the communication session, overall engagement falling by 25%, at least 10 people appearing confused, and so on. As a result, the computing device can inform a presenter when the audience appears to gain or lose interest, to have a particular emotional response, of to have other responses to the presentation. An indication that the detected condition has occurred may then be provided for display during the communication session.

In some implementations, recommendations are provided based on the participant scores, the aggregate representation, or other data. One example is a for improving a level of engagement or emotion of the participants in the set of multiple participants. For example, if engagement has declined, the system can cause a recommendation to change topic, take a break, use media content, or to vary a speaking style. The specific recommendation can be selected based on the various of emotional and cognitive attributes indicated by the participant scores. For example, different patterns or distributions of attributes may correspond to different situations or general states of audiences, which in turn may have different corresponding recommendations in order to reach a target state (e.g., high engagement and overall positive emotion).

For example, the chart of FIG. 10A shows an engaged but polarized audience, and based on the scores represented by the plot in the chart, the system may recommend a less divisive topic or trying to find common ground. The chart of FIG. 10B shows an apathetic audience, and so the system may recommend asking questions to encourage participation, showing media content, telling a story to provide more emotional resonance, and so on. For FIG. 10C, the audience is engaged and with a positive overall sentiment, and so the system may recommend continuing the current technique or may decide no recommendation is necessary.

The appropriate recommendation(s) for a given pattern or distribution of participant scores and/or aggregate representation may be determined through analysis of various different communication sessions. For different communication sessions, the scores at different points in time can be determined and stored, along with time-stamped information about the content of the communication session, e.g., presentation style (e.g., fast, slow, loud, soft, whether slides are shown or not, etc.), topics presented (e.g., from keywords from presented slides, speech recognition results for speech in the session, etc.), media (e.g., video, images, text, etc.), and so on. Audience characteristics (e.g., demographic characteristics, local vs. remote participation, number of participants, etc.) can also be captured and stored. This data about how participants' emotional and cognitive states correlate with and change in response to different presentation aspects can show, for example, which actions are likely to lead to different changes in emotional or cognitive states. A computer system can perform statistical analysis to identify, for each of multiple different situations (e.g., different profiles or distributions of participant scores), which actions lead to desired outcomes such as increase in engagement, increase in positive emotions, or reduction of negative emotions. As another example, the data can be used as training data to train a machine learning model to predict which of a set of potential actions to recommend is likely to achieve a target result or change in the emotional or cognitive states of the audience.

In some implementations, the recommendations can be context-dependent, varying the recommendations according to which techniques work best at different times during a session (e.g., the beginning of a session vs. the end of a session), with sessions of different sizes (e.g., many participants vs. few participants), for audiences of different ages or backgrounds, and so on. For example, the examples of communication sessions may show that taking a 5-minute break and resuming afterward does not increase engagement in the first 20 minutes, has a moderate benefit from 20-40 minutes, and has a large benefit for sessions that have gone on for 40 minutes or longer. The system can use the current duration of the communication session, along with other factors, to select the recommendation most appropriate for the current situation. Thus, the recommendations provided can help guide the presenter to techniques that are predicted, based on observed prior communication sessions, to improve emotional or cognitive states given context of, e.g., the current emotional or cognitive profile or distribution of the audience, the makeup of the audience (e.g., size, demographics), the type or purpose of the communication session (e.g., online class, lecture, videoconference, etc.), and so on.

The process 1700 can be used to determine and provide feedback about reactions to particular events or content in the communication session. In response to detecting changes in the participant scores or the aggregate representation, a computing system can determine that the change is responsive to an event or condition in the communication session, such as a comment made by a participant, a statement of the presenter, content presented, etc. Reactions during the communication session can also be detected thorough microexpression detection based on video segments of participants. Information about reactions of individual participants can be provided for display to the presenter (e.g., "John and Sarah were surprised by the last statement"). Similarly, information about reactions collectively in the group can be provided (e.g., "20 people became confused viewing the current slide" or "overall engagement decreased 20% after showing the current slide").

The process 1700, as with other discussions above, may take actions to adjust the delivery of data based on the aggregate representation for the participants. For example, just as the description above describes video conference management actions that can be taken for collaboration factors determined from media streams, the same or similar actions can be taken in the communication session. For example, the system can alter the way media streams are transmitted, for example, to add or remove media streams or to mute or unmute audio. In some instances, the size or resolution of video data is changed. In other instances, bandwidth of the conference is reduced by increasing a compression level, changing a compression codec, reducing a frame rate, or stopping transmission a media stream. The system can change various other parameters, including the number of media streams presented to different endpoints, changing an arrangement or layout with which media streams are presented, addition of or updating of status indicators, and so on. These changes can be done for individuals, groups of participants, or for all participants, and can help address situations such as low engagement due to technical limitations, such as jerky video, network delays and so on. For example, if the system detects that undesirable emotional or cognitive attributes or patterns coincide with indicators of technical issues (such as delays, high participant device processor usage, etc.), then the system can adjust the configuration settings for the communication session to attempt to improve engagement and emotion among the participants and facilitate more effective communication.

It shall be known that all the advantageous features and/or advantages do not need to be incorporated into every implementation of the invention.

Although several example implementations of the invention have been described in detail, other implementations of the invention are possible.

All the features disclosed in this specification may be replaced by alternative features serving the same, equivalent or similar purpose unless expressly stated otherwise. Thus, unless stated otherwise, each feature disclosed is one example only of a generic series of equivalent or similar features.

A number of implementations have been described. Nevertheless, various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

The invention claimed is:

1. A method performed by one or more computing devices, the method comprising:
    during a communication session, obtaining, by the one or more computing devices, a participant score for each participant in a set of multiple participants in the communication session, wherein each of the participant scores is based on at least one of facial image analysis or facial video analysis performed using image data or video data captured for the corresponding participant during the communication session, wherein each of the participant scores is indicative of an emotional or cognitive state of the corresponding participant;
    determining, by the one or more computing devices, amounts of speaking time in which different participants have spoken during the communication session;
    selecting, by the one or more computing devices, an action to improve a level of engagement or emotion of the participants based on the participant scores and the amounts of speaking time, the selected action being selected from among set of multiple candidate actions;
    using, by the one or more computing devices, the participant scores to generate an aggregate representation of the emotional or cognitive states of the set of multiple participants; and
    providing, by the one or more computing devices, output data to devices of one or more of the participants during the communication session, the output data comprising the aggregate representation of the emotional or cognitive states of the set of multiple participants and a recommendation of the selected action to improve the level of engagement or emotion of the participants.

2. The method of claim 1, wherein the one or more computing devices comprise a server system;
    wherein at least some of the multiple participants participate in the communication session using respective endpoint devices, the endpoint devices each providing image data or video data over a communication network to the server system; and
    wherein the server system obtains the participant scores by performing at least one of image facial image analysis or facial video analysis on the image data or video data received from the endpoint devices over the communication network.

3. The method of claim 1, wherein at least some of the multiple participants participate in the communication session using respective endpoint devices; and
    wherein obtaining the participant scores comprises receiving, over a communication network, participant scores that the respective endpoint devices determined by each end point device performing at least one of facial image analysis or facial video analysis using image data or video data captured by the endpoint device.

4. The method of claim 1, wherein the one or more computing devices comprise an endpoint device for a person participating in the communication session; and
wherein obtaining the participant score, using the participant scores to generate the aggregate representation, and providing the output data for display are performed by the endpoint device, the aggregate representation being displayed at the endpoint device.

5. The method of claim 1, wherein the aggregate representation characterizes or indicates the emotional or cognitive states or levels of engagement among the set of multiple participants using at least one of a score, a graph, a chart, a table, an animation, a symbol, or text.

6. The method of claim 1, comprising, during the communication session, repeatedly (i) obtaining updated participant scores for the participants as additional image data or video data captured for the respective participants during the communication session, (ii) generating an updated aggregate representation of the emotional or cognitive states or levels of engagement of the set of multiple participants based on the updated participant scores, and (iii) providing updated output data indicative of the updated aggregate representation.

7. The method of claim 1, wherein the participant scores are varied during the communication session based on captured image data or video data such that the aggregate representation provides a substantially real-time indicator of current emotion or engagement among the set of multiple participants.

8. The method of claim 1, wherein the output data is provided for display by an endpoint device of a speaker or presenter for the communication session.

9. The method of claim 1, wherein the output data is provided for display by an endpoint device of a teacher, and wherein the set of multiple participants is a set of students.

10. The method of claim 1, wherein the set of participants comprises remote participants that are located remotely from each other during the communication session, each of the remote participants having image data or video data captured by a corresponding endpoint device.

11. The method of claim 1, wherein the set of participants comprises local participants that are located in a same room as each other during the communication session.

12. The method of claim 1, comprising:
tracking changes in emotion or engagement of the set of multiple participants over time during the communication session; and
providing during the communication session an indication of a change in the emotion or engagement of the set of multiple participants over time.

13. The method of claim 1, comprising grouping the participants in the set of multiple participants into different groups based on the participant scores; and
wherein the aggregate representation comprises an indication of characteristics of the different groups.

14. The method of claim 1, comprising determining, for each participant of a plurality of the multiple participants, a different action for the participant to improve a level of collaboration among the set of multiple participants during the communication session; and
providing different recommendations to devices of each of the plurality of participants, the different recommendations respectively indicating the different actions determined for the participants in the plurality of the multiple participants.

15. The method of claim 1, comprising accessing information describing characteristics of the communication session or the set of multiple participants; and
using the characteristics of the communication session or the set of multiple participants to select the action.

16. The method of claim 15, wherein the characteristics include a number of participants in the communication session, a duration of the communication session, or a communication session type for the communication session.

17. The method of claim 1, wherein the action is selected based on a pattern or distribution of the participant scores determined for the communication session.

18. The method of claim 1, comprising determining, based on the amounts of speaking time, that a particular participant has an excessive proportion of the speaking time;
wherein the action includes limiting speaking time of the particular participant; and
wherein the recommendation is provided to a device associated with the particular participant or to a participant having a role as host or moderator for the communication session.

19. A system comprising:
one or more computers; and
one or more computer-readable media storing instructions that are operable, when executed by one or more computing devices, to cause the one or more computing devices to perform operations comprising:
during a communication session, obtaining, by the one or more computing devices, a participant score for each participant in a set of multiple participants in the communication session, wherein each of the participant scores is based on at least one of facial image analysis or facial video analysis performed using image data or video data captured for the corresponding participant during the communication session, wherein each of the participant scores is indicative of an emotional or cognitive state of the corresponding participant;
determining, by the one or more computing devices, amounts of speaking time in which different participants have spoken during the communication session;
selecting, by the one or more computing devices, an action to improve a level of engagement or emotion of the participants based on the participant scores and the amounts of speaking time, the selected action being selected from among set of multiple candidate actions;
using, by the one or more computing devices, the participant scores to generate an aggregate representation of the emotional or cognitive states of the set of multiple participants; and
providing, by the one or more computing devices, output data to devices of one or more of the participants during the communication session, the output data comprising the aggregate representation of the emotional or cognitive states of the set of multiple participants and a recommendation of the selected action to improve the level of engagement or emotion of the participants.

20. One or more non-transitory computer-readable media storing instructions that are operable, when executed by one or more computing devices, to cause the one or more computing devices to perform operations comprising:
during a communication session, obtaining, by the one or more computing devices, a participant score for each participant in a set of multiple participants in the communication session, wherein each of the participant scores is based on at least one of facial image analysis or facial video analysis performed using image data or video data captured for the corresponding participant during the communication session, wherein each of the participant scores is indicative of an emotional or cognitive state of the corresponding participant;

determining, by the one or more computing devices, amounts of speaking time in which different participants have spoken during the communication session;

selecting, by the one or more computing devices, an action to improve a level of engagement or emotion of the participants based on the participant scores and the amounts of speaking time, the selected action being selected from among set of multiple candidate actions;

using, by the one or more computing devices, the participant scores to generate an aggregate representation of the emotional or cognitive states of the set of multiple participants; and providing, by the one or more computing devices, output data to devices of one or more of the participants during the communication session, the output data comprising the aggregate representation of the emotional or cognitive states of the set of multiple participants and a recommendation of the selected action to improve the level of engagement or emotion of the participants.

* * * * *